ENVIRONMENTAL SYSTEM

FIG. 12

THRU

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

FIG. 59

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

FIG. 60 CHECK STOP TIMING

FIG. 61

THRU

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

FIG. 67

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

FIG. 68 I UNIT SCAN

```
    THIS FIGURE IS ILLUSTRATIVE OF A
LIKE-NUMBERED FIGURE WHICH IS SHOWN
IN DETAIL IN SAID ENVIRONMENTAL SYSTEM,
  LARGE SCALE DATA PROCESSING SYSTEM,
          SERIAL NO. 609,238
    FILED ON JANUARY 13, 1967
```

FIG. 71

```
    THIS FIGURE IS ILLUSTRATIVE OF A
LIKE-NUMBERED FIGURE WHICH IS SHOWN
IN DETAIL IN SAID ENVIRONMENTAL SYSTEM,
  LARGE SCALE DATA PROCESSING SYSTEM,
         SERIAL NO. 609,238
    FILED ON JANUARY 13, 1967
```

FIG. 73  E UNIT DATA FLOW (2)

I UNIT

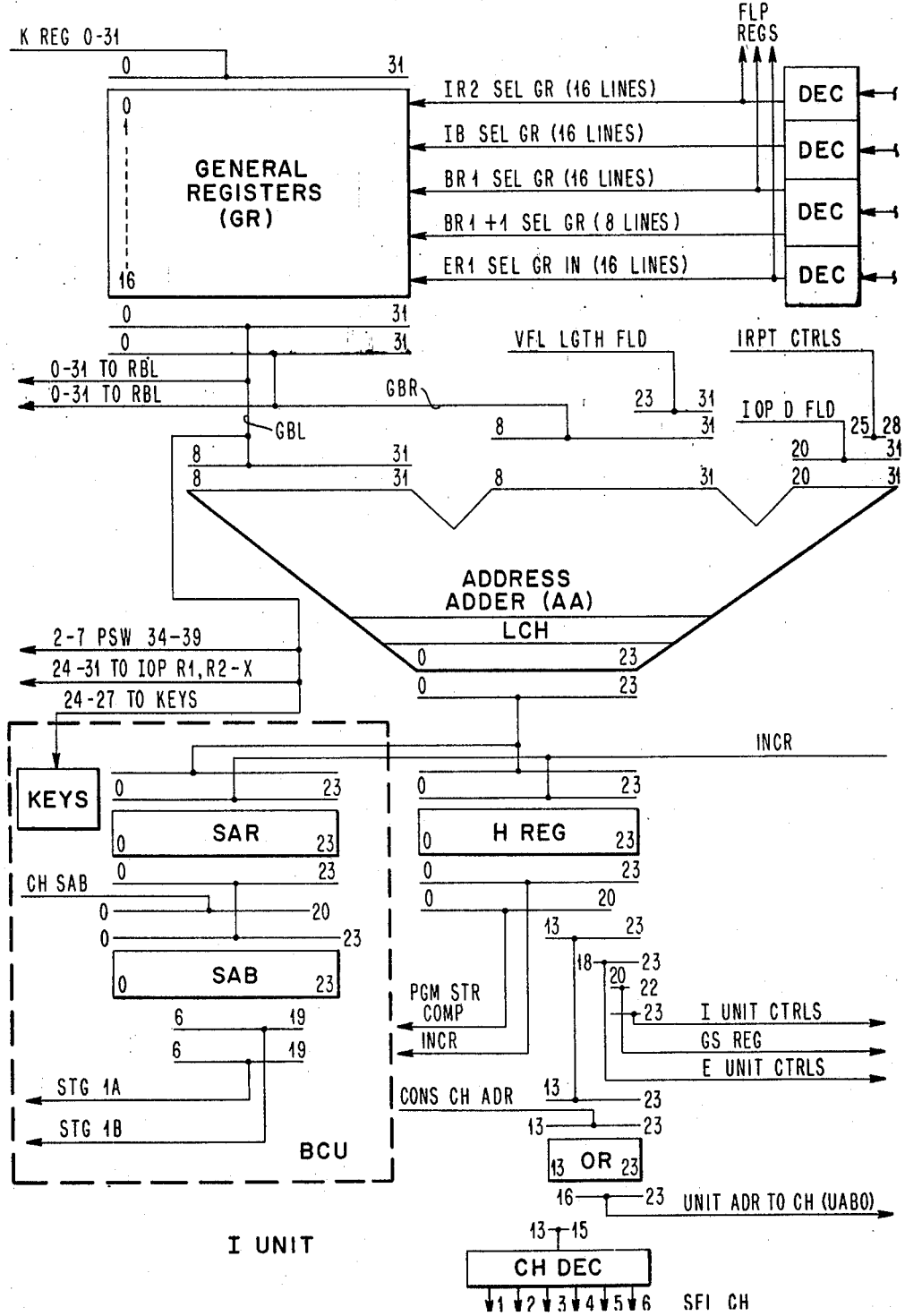

Oct. 21, 1969   R. G. ALLEN ET AL   3,474,239
ADDER, SHIFTER AND LOGICAL APPARATUS
Filed Jan. 13, 1967   45 Sheets-Sheet 18

FIG. 76

THRU

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

FIG. 372

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

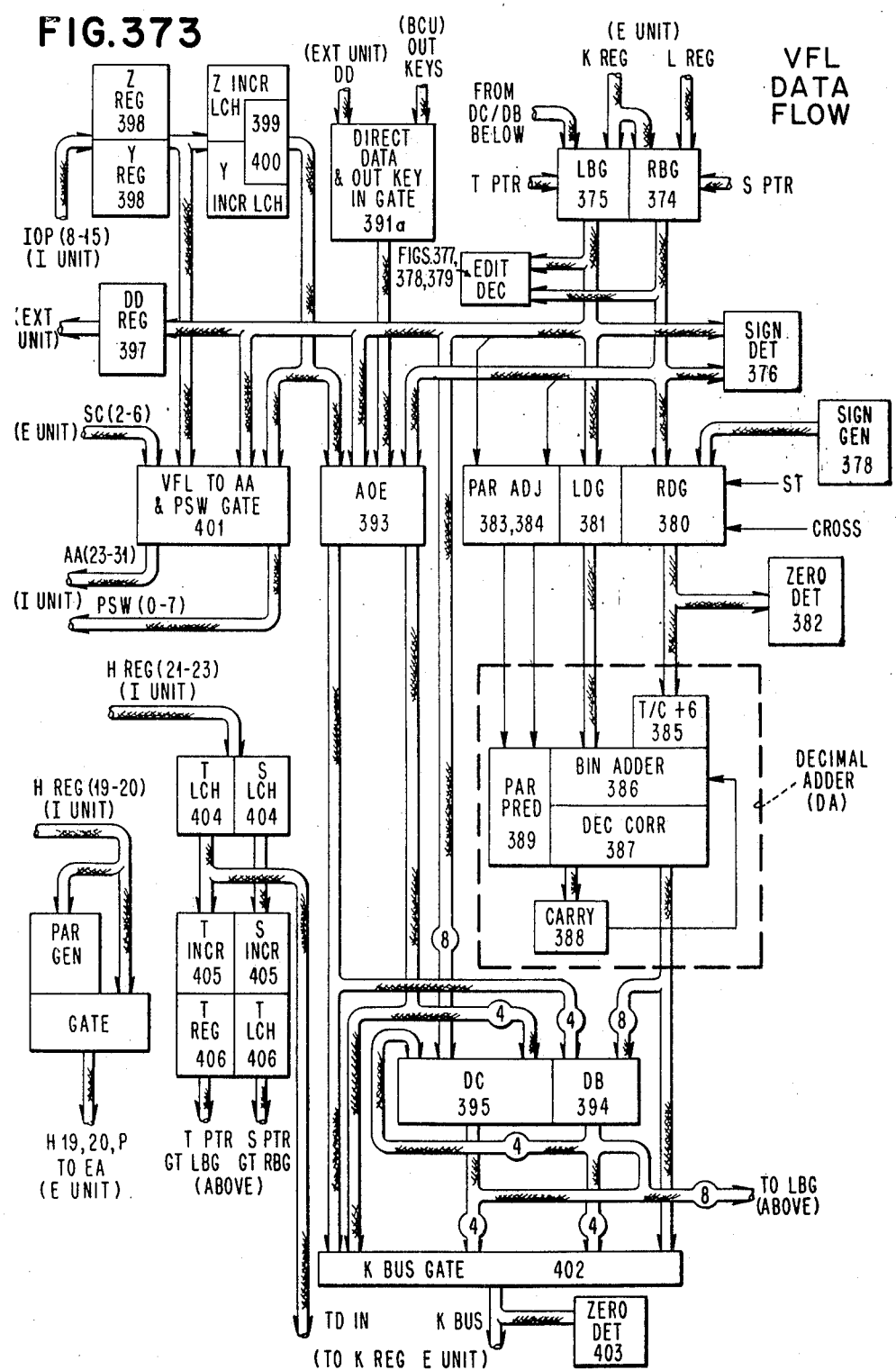

FIG. 374

THRU

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609, 238
FILED ON JANUARY 13, 1967

FIG. 534

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609, 238
FILED ON JANUARY 13, 1967

FIG. 535    E UNIT DATA FLOW (BINARY)

FIG. 536  E UNIT DATA FLOW (BINARY)

FIG. 537

THRU

> THIS FIGURE IS ILLUSTRATIVE OF A
> LIKE-NUMBERED FIGURE WHICH IS SHOWN
> IN DETAIL IN SAID ENVIRONMENTAL SYSTEM,
> LARGE SCALE DATA PROCESSING SYSTEM,
> SERIAL NO. 609,238
> FILED ON JANUARY 13, 1967

FIG. 620

> THIS FIGURE IS ILLUSTRATIVE OF A
> LIKE-NUMBERED FIGURE WHICH IS SHOWN
> IN DETAIL IN SAID ENVIRONMENTAL SYSTEM,
> LARGE SCALE DATA PROCESSING SYSTEM,
> SERIAL NO. 609,238
> FILED ON JANUARY 13, 1967

FIG. 621 — MAIN ADDER

SECTION CARRIES

FIG. 623 GROUP FUNCTIONS

Oct. 21, 1969   R. G. ALLEN ET AL   3,474,239
ADDER, SHIFTER AND LOGICAL APPARATUS
Filed Jan. 13, 1967   45 Sheets-Sheet 29

GROUP CARRIES - MA

FIG. 628
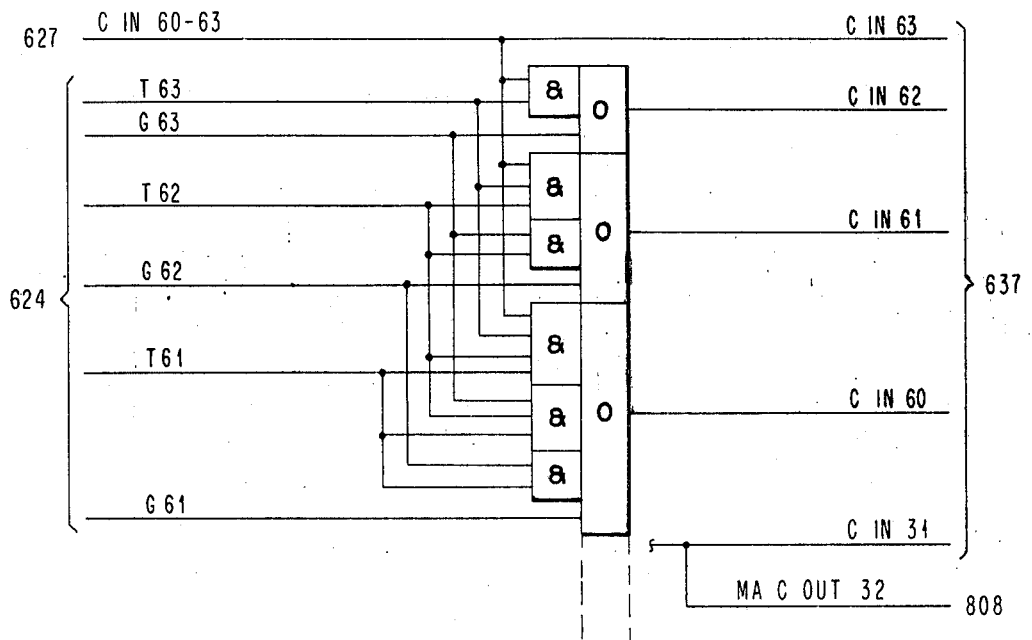
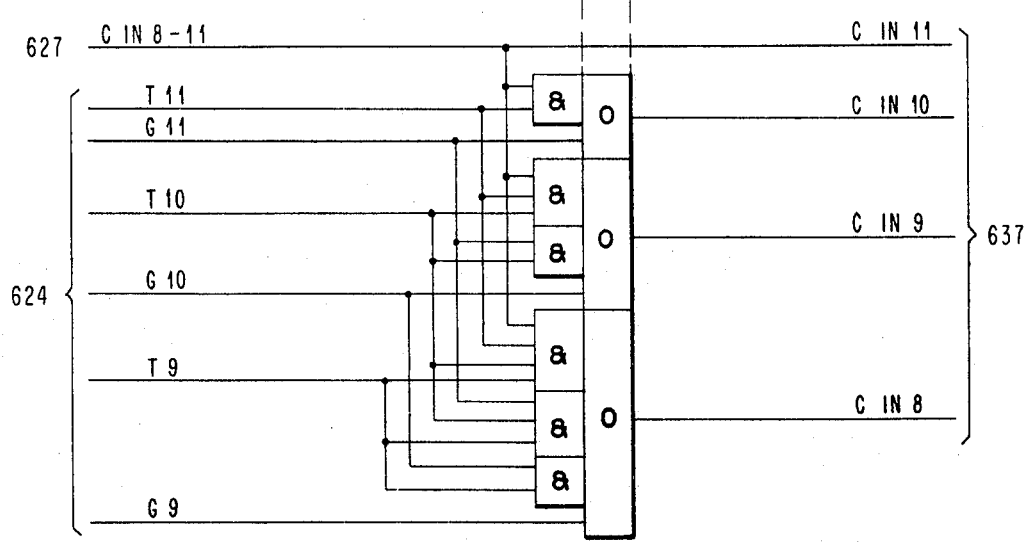

INTERNAL C IN BITS 0-6

C IN BITS 4-6

Oct. 21, 1969          R. G. ALLEN ET AL          3,474,239
              ADDER, SHIFTER AND LOGICAL APPARATUS
Filed Jan. 13, 1967                           45 Sheets-Sheet 32

MA LEFT EXT

SHIFTER IN

MAIN ADDER LATCH PARITY

PRED HS PARITY

HS PARITY CHK

BIT FUNCTION CHK

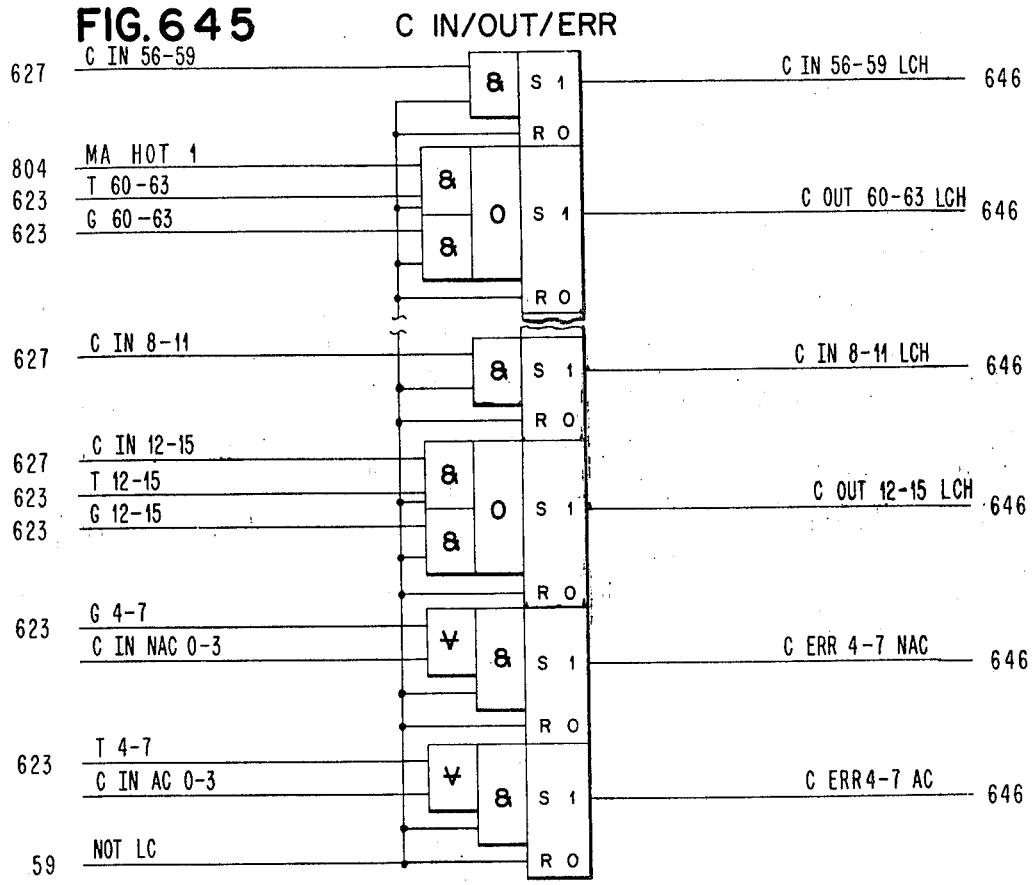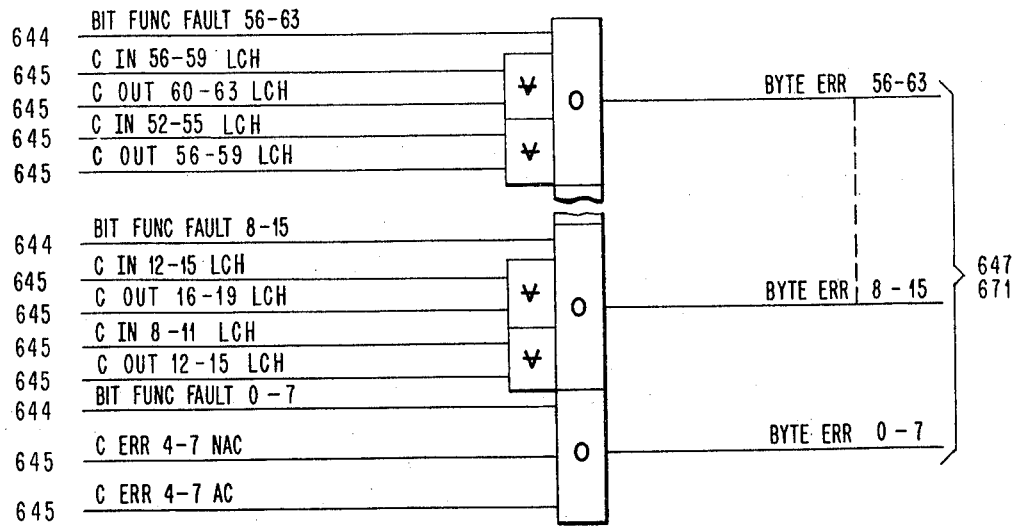

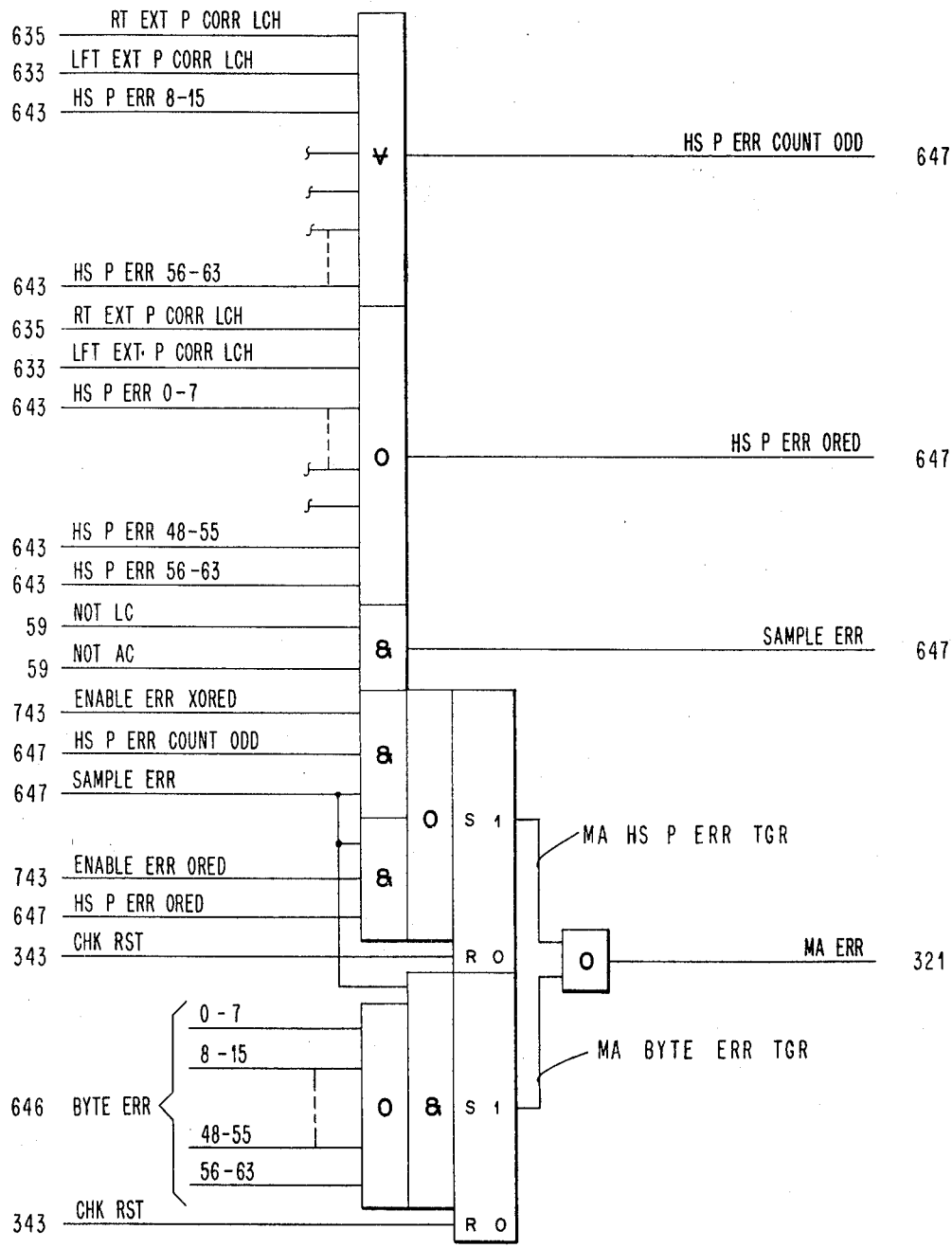

Oct. 21, 1969   R. G. ALLEN ET AL   3,474,239
ADDER, SHIFTER AND LOGICAL APPARATUS
Filed Jan. 13, 1967   45 Sheets-Sheet 45

FIG. 648

THRU

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

FIG. 876

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

United States Patent Office 3,474,239
Patented Oct. 21, 1969

3,474,239
ADDER, SHIFTER AND LOGICAL APPARATUS
Richard G. Allen, Hyde Park, Clark Kurtz, Highland, Olin L. MacSorley, Lake Katrine, and Dana R. Spencer and Wesley C. Stetler, Poughkeepsie, N.Y., assignors to International Business Machines Corporation, Armonk, N.Y., a corporation of New York
Continuation-in-part of application Ser. No. 445,312, Apr. 5, 1965. This application Jan. 13, 1967, Ser. No. 609,253
Int. Cl. G06f 5/02, 7/385, 7/42
U.S. Cl. 235—175                    4 Claims

ABSTRACT OF THE DISCLOSURE

The specification discloses an illustrative embodiment for the invention comprising a large scale data processing system of the type which is composed of a plurality of quasi-independent units. The environmental data processing system includes a central processing unit or portion, which is herein referred to as a CPU, a plurality of storage units, a plurality of input/output control devices referred to herein as channels, as well as control and maintenance facilities which are found in a power distribution unit, herein referrred to as a PDU. The CPU of the environmental system includes a control or instruction unit hereinafter referred to as an I unit, and an arithmetic and logic or execution unit, hereinafter referred to as an E unit. The I unit includes controls for instruction fetching, branching, interruption handling, communications with the input/output channels, and other related functions. The E unit of the environmental system can perform algebraic and logical operations, moving, shifting, and other functions. A partial combination of the hardware of a main adder, the shifter and a logical unit is provided. A plurality of input circuits are utilized to generate inputs to the main adder. The inputs to the main adder are utilized to generate bit functions. The bit functions generate half-sums which are then either utilized to perform logical operations, or as a data path to a shifter which is connected between the bit function generator and the output circuit of the main adder.

---

Figure 1:
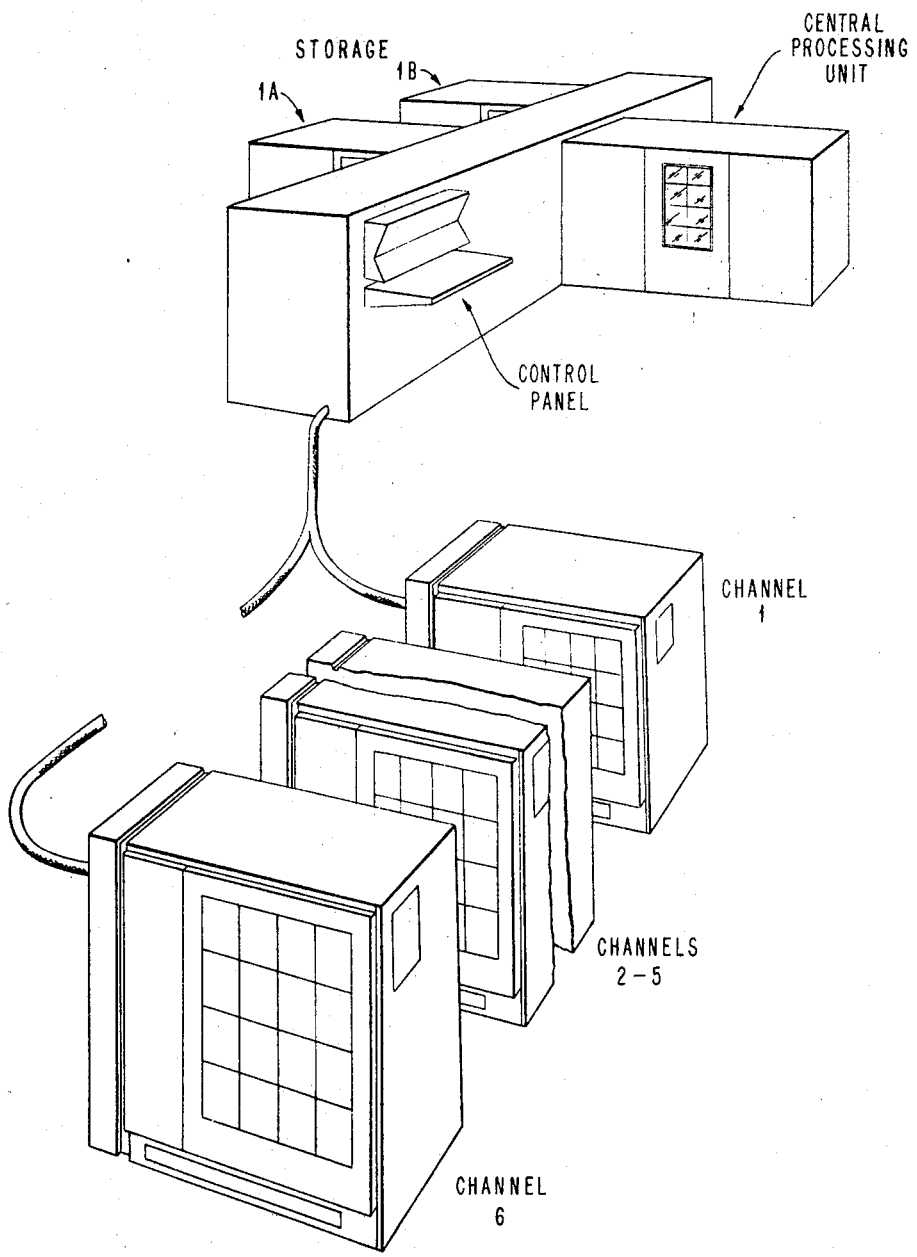

This application is a continuation-in-part of application Ser. No. 445,312, filed Apr. 5, 1965, now abandoned, entitled "Adder, Shifter and Logical Apparatus."

TABLE OF CONTENTS

| | Column |
|---|---|
| (1.0) Background of the Invention | 3 |
| (2.0) References | 5 |
| (3.0) Nomenclature | 6 |
| (4.0) Brief Description of Environmental System (FIG. 2) | 7 |
| (5.0) Component Circuits (FIG. 3 Through FIG. 8) | 8 |
| (6.0) Basic Bus Control Unit | 10 |
| (7.0) Clock Circuit | 10 |
| (7.4) Clock Circuit (FIG. 59) | 10 |
| (8.0) Scan | 11 |
| (8.1) Scanning into the I Unit (FIG. 68) | 11 |
| (8.2) Scanning into the E Unit (FIG. 69) | 12 |
| (9.0) Instruction Unit Data Flow | 12 |
| (9.1) General Introduction to I Unit Data Flow | 13 |
| (9.1.1) Instruction Selection (FIG. 72) | 13 |
| (9.1.2) Instruction Input Paths (FIG. 73) | 13 |
| (9.1.3) Instruction Decoding (FIG. 74) | 14 |
| (9.1.4) Instruction Utilization (FIG. 75) | 15 |
| (10.0) Instruction Sequencing | 15 |
| (10.1) Introduction | 15 |
| (11.0) Instruction Counter Controls (FIG. 72 Through FIG. 75) | 16 |
| (11.1) Introduction | 16 |
| (12.0) Branching | 17 |
| (12.1) Branch Operations | 17 |
| (12.1.1) Introduction to Branch Controls | 17 |
| (13.0) I Unit Execution | 18 |
| (14.0) Interruptions | 18 |
| (14.1) Interruption Handling | 18 |
| (15.0) Variable Field Length Data Flow | 18 |
| (15.1) Brief Description of VFL Data Flow (FIG. 373) | 18 |
| (16.0) Variable Field Length Controls | 19 |
| (17.0) Variable Field Length Operations | 19 |
| (18.0) Binary Data Flow (E Unit) | 19 |
| (18.1) Introduction to E Unit Data Flow (FIG. 535 and FIG. 536) | 19 |
| (18.2) E Unit Operation Decoders | 20 |
| (18.2.1) EOP Register (FIG. 537) | 20 |
| (18.2.2) LCOP Register (FIG. 538) | 20 |
| (18.2.3) E Decode Circuits | 20 |
| (18.2.4) L Decode Circuits | 20 |
| (18.3) Floating Point Registers (FIGS. 581-586) | 21 |
| (18.4) Register Bus Latch (FIG. 587-FIG. 589) | 21 |
| (18.5) J Register | 21 |
| (18.6) K Register (FIG. 595 Through FIG. 598) | 21 |
| (18.7) L Register (FIG. 599 Through FIG. 601) | 21 |
| (18.8) M Register (FIG. 602 Through FIG. 606) | 21 |
| (18.9) Exponent Register (FIG. 614 Through FIG. 616) | 21 |
| (18.10) Shift Counter (FIG. 617 Through FIG. 620) | 21 |
| (18.11) FIGS. 607–613 and FIGS. 621–658 | 21 |
| (18.11.1) Main Adder Input Circuits | 21 |
| (18.11.1.1) MA Input Gates (FIG. 607) | 21 |
| (18.11.1.2) MA T/C in Gates (FIG. 608) | 22 |
| (18.11.1.3) Standard Main Adder Gating Triggers (FIGS. 609 and 610) | 22 |
| (18.11.1.4) CVB Compacter (FIG. 611 and FIG. 612) | 22 |
| (18.11.1.5) CVD Corrector (FIG. 613) | 23 |
| (18.11.2) Main Adder Circuits (FIG. 621) | 23 |
| (18.11.2.1) Introduction to Divide Decoder | 23 |
| (18.11.2.2) Sum Generation | 23 |
| (18.11.2.3) Divide Decoder | 23 |
| (18.11.2.4) Multiple Resolution | 24 |
| (18.11.2.2) Main Adder-Shifter | 25 |
| (18.11.3) Data Paths and Control | 25 |
| (18.11.4) Data Flow and Timing, Example | 25 |
| (18.11.5) Bit Functions and the Add Operation | 25 |
| (18.11.6) Look Ahead for the Full Adder | 26 |
| (18.11.7) Variations of the Add Operation | 27 |
| (18.11.7.1) Complement Add | 27 |
| (18.11.7.2) Adder as a Straight Data Path | 27 |
| (18.11.8) Parity Generation | 27 |
| (18.11.9) Input Parity Checking (Byte HS Parity Error) | 28 |
| (18.11.10) Bit Function Error | 28 |
| (18.11.11) Look-Ahead Check | 29 |
| (18.11.12) Shifting and Logical Connectives | 29 |
| (18.11.12.1) Data Shifting | 29 |
| (18.11.12.2) Shifter Parity Generation | 29 |
| (18.12) Exponent Adder | 30 |
| (18.12.1) Introduction | 30 |
| (18.12.2) Data Flow (FIG. 536) | 30 |
| (18.12.3) Binary Adder | 30 |
| (18.12.4) Bit Functions | 31 |
| (18.12.5) Carry-Look-Ahead | 31 |
| (18.12.6) End Around Carry | 31 |
| (18.12.7) Sum Generation | 32 |
| (18.12.8) Sum Parity | 32 |
| (18.12.9) Checking | 32 |
| (18.12.10) Sign Control | 33 |
| (18.12.11) Complement Gates | 33 |
| (18.12.12) Output Signals | 33 |
| (19.0) Binary Controls | 34 |
| (19.1) Introduction to Binary Controls | 34 |
| (19.1.1) Control Triggers | 34 |
| (19.1.1.1) Gating Triggers | 34 |
| (19.1.1.2) Status Triggers | 35 |
| (19.1.1.3) Sequence Triggers | 35 |
| (19.1.2) Functional OR's | 35 |
| (19.1.3) Timing | 35 |
| (19.1.3.1) Generally | 35 |
| (19.1.3.2) Timing Example: FLP LOAD (LD, LE) | 36 |
| (19.1.4) Starting of an Instruction | 36 |
| (19.1.5) Prefetch | 37 |
| (19.1.5.1) Fixed Point Instructions | 37 |
| (19.1.5.2) Floating Point Instructions | 37 |
| (19.1.5.3) Flush Path | 37 |
| (19.1.6) J Loaded Trigger | 38 |
| (19.1.7) Register Release | 38 |
| (19.1.7.1) General Registers | 38 |
| (19.1.7.2) Floating Point Registers | 38 |
| (19.1.7.3) Block PA TGR | 38 |
| (19.1.7.4) Timing | 38 |
| (19.1.8) Instruction Ending | 38 |
| (19.1.9) Resets | 39 |
| (19.1.10) Single Cycle Mode | 39 |
| (19.1.11) Modar | 39 |
| (19.1.12) Operand Formats | 40 |
| (19.1.12.1) Fixed Point Format | 40 |
| (19.1.12.2) Floating Point Format | 40 |
| (19.1.1.3) Binary Control Circuits | 40 |
| (19.2) Introduction to Fixed Sequence Instructions | 40 |
| (19.2.1) I to E Transfer-Initial Operand Location | 40 |
| (19.2.3) FXP Full-Word Instructions | 41 |
| (19.2.3.1) Load | 41 |
| (19.2.3.2) Load Type Instructions | 41 |
| (19.2.3.3) Add/Subtract (Algebraic & Logical) | 41 |
| (19.2.3.4) Compare (Algebraic & Logical) | 42 |
| (19.2.3.5) Store | 42 |
| (19.2.4) FXP Halfword Instructions | 43 |
| (19.2.4.1) Halfword Expansion | 43 |
| (19.2.4.2) Load | 43 |
| (19.2.4.3) Add/Subtract | 44 |
| (19.2.4.4) Compare | 44 |
| (19.2.4.5) Store | 45 |
| (19.2.5) Logical Connectives | 45 |
| (19.2.6) Shift Instructions—Single, Double | 46 |
| (19.2.7) Branch Instructions | 48 |
| (19.2.7.1) Branch on Count | 48 |
| (19.2.7.2) Branch and Link | 49 |
| (19.2.7.3) Branch on Index (BXH and BXLE) | 49 |
| (19.3) Introduction to Floating Point Instructions | 50 |
| (19.3.1) I to E Transfer | 50 |
| (19.3.2) Interrupts and Condition Code | 50 |
| (19.3.3) Floating Point Add/Subtract | 50 |
| (19.3.3.1) Initial Operand Locations | 50 |

| | Column |
|---|---|
| (19.3.3.2) Instruction Sequencing | 50 |
| (19.3.3.3) Characteristic Comparison | 51 |
| (19.3.3.5) Termination | 52 |
| (19.3.3.6) Sign Handling | 53 |
| (19.3.3.7) Supplementary Description | 53 |
| (19.3.4) Floating Point Compare | 53 |
| (19.3.4.1) Initial Operand Locations | 54 |
| (19.3.4.2) Instruction Sequencing | 54 |
| (19.3.4.3) Termination | 54 |
| (19.3.5) Floating Point Load | 54 |
| (19.3.6) Floating Point Load Type | 54 |
| (19.3.7) Floating Point Halve | 55 |
| (19.3.8) Floating Point Store | 55 |
| (20.0) Binary Operations | 56 |
| 20.1) Binary Division | 56 |
| (20.1.1) Division Methods | 56 |
| (20.1.2) Division with Uniform Shift of Two Bits | 58 |
| (20.1.1.3) Divide Positioning | 59 |
| (20.1.1.4) Divide Termination | 60 |
| (20.2) Fixed and Floating Point Multiplication | 60 |
| (20.2.1) Binary Multiplication | 60 |
| (20.2.2) Fixed Point Multiply (MR-M-MH) | 63 |
| (20.2.3) Fixed Point Put-Away | 65 |
| (20.2.4) Floating Point Multiply (MER, ME, MDR, MD) | 65 |
| (20.2.5) Floating Point Multiply Prenormalization | 65 |
| (20.2.6) Floating Point Multiply First Iteration Preparation Cycle | 66 |
| (20.2.7) Floating Point Multiply Iteration | 67 |
| (20.2.8) Floating Point Multiply Put Away | 67 |
| (20.3) Multiple Load Executions | 67 |
| (20.3.1) Timer Update | 68 |
| (21.0) Manual Controls and Maintenance | 68 |
| (21.1) Control Panel (FIG. 812 Through FIG. 820) | 69 |
| (21.2) Pushbutton Network (FIG. 821) | 69 |
| (21.3) Indicator Control Network (FIG. 815) | 69 |
| (21.1.1.4) The Starting, Stopping and Reset Circuits (FIG. 822–FIG. 829) | 70 |
| (21.5) Miscellaneous PDU Circuits (FIG. 830 Through FIG. 841) | 70 |
| (21.6) Maintenance Control Word and Diagnose Circuits (FIG. 842 Through FIG. 854) | 70 |
| (21.7) PDU Data Flow (FIG. 855–FIG. 858) | 70 |
| (22.0) Storage | 71 |

(1.0) BACKGROUND OF THE INVENTION

This invention relates to data processing, and more particularly to apparatus for providing adding, shifting and logical operations therein.

In modern computers, there is usually provided a main arithmetic unit which includes facility for addition and subtraction, which together with other arithmetic controls also performs multiplication and division. This may be considered to be a main adder in most computers. Another primary portion of an arithmetic and logic unit is a shifter which provides shifting by selected amounts so as to permit iterations such as divide and multiply, as well as the gross movement of data. A further main unit in an arithmetic and logic section of a computer may include the facility for providing logical functions such as logical AND, OR, and EXCLUSIVE OR.

The implementation of these devices poses several problems. The units must either be connected in parallel or in series with one another; in other words, either a main bus must be capable of reaching each of the units, in which case each of the units requires input and output control means. Alternatively, the units can be connected in series so that but a single input and output control means is required, in which case the data must flow through all three units in order to achieve the functions performed by any one of them. In either case, cost must be balanced against performance in accordance with the design requirements of the particular system. If parallel units are used, problems of excessive loading of certain circuits, and large amount of gating hardware are involved; on the other hand, the data path through a plurality of serial units might be prohibitively long to permit required performance in terms of a number of iterations which are obtainable in a given number of machine cycles.

Therefore, a primary object of the present invention is to provide improved means for performing arithmetic, logic and shifting operations in a data processing system.

Another object of the present invention is improved data in a data processing system.

A further object of the present invention includes the elimination of hardware and long data paths while achieving multiple performances in the arithmetic and logic portions of a data processing system.

In accordance with the present invention, a partial combination of the hardware of a main adder, the shifter and a logical unit is provided. A plurality of input circuits are utilized to generate inputs to the main adder. The inputs to the main adder are utilized to generate bit functions, as is well known in carry propagate adders. The bit functions generate half-sums which are then either utilized to perform logical operations, or as a data path to a shifter which is connected between the bit function generator and the output circuit of the main adder. When logical operations are to be performed, the half sums and the generate function are utilized to perform the logical AND, OR and EXCLUSIVE OR, selectively. If a shifting operation is called for, any one of the shifting lines will generate a signal which gates the shifter to the adder output; in the absence of that signal, the final arithmetic sum is gated to the adder output circuit. In the event that logical operations are to be performed, the data path includes the shifter, for which a fixed shift amount is automatically gated in response to any one of the logical functions; however, this amount is compensated for at a different point in the data flow by re-shifting back to the original position.

This invention has achieved a quasi-combination of the adder, the shifter, and the logical unit of a data processing system. This permits a single input control and single output control to perform the functions which otherwise would be effected by three such sets of hardware. Additionally, since the shifter is in parallel with the purely arithmetic portions of the adder, no increase in data path results from this arrangement.

Other objects, features and advantages of the present invention will become more apparent in the light of the following detailed description of an illustrative embodiment thereof, as shown in the accompanying drawings.

The drawings are illustrative block diagrams, schematic block diagrams, timing diagrams, charts, and illustrations of an embodiment of the present improvement, as set forth in a Large Scale Data Processing System which is referred to as "said environmental systems," as set forth in the following list:

TABLE OF FIGURES

Figure 9:
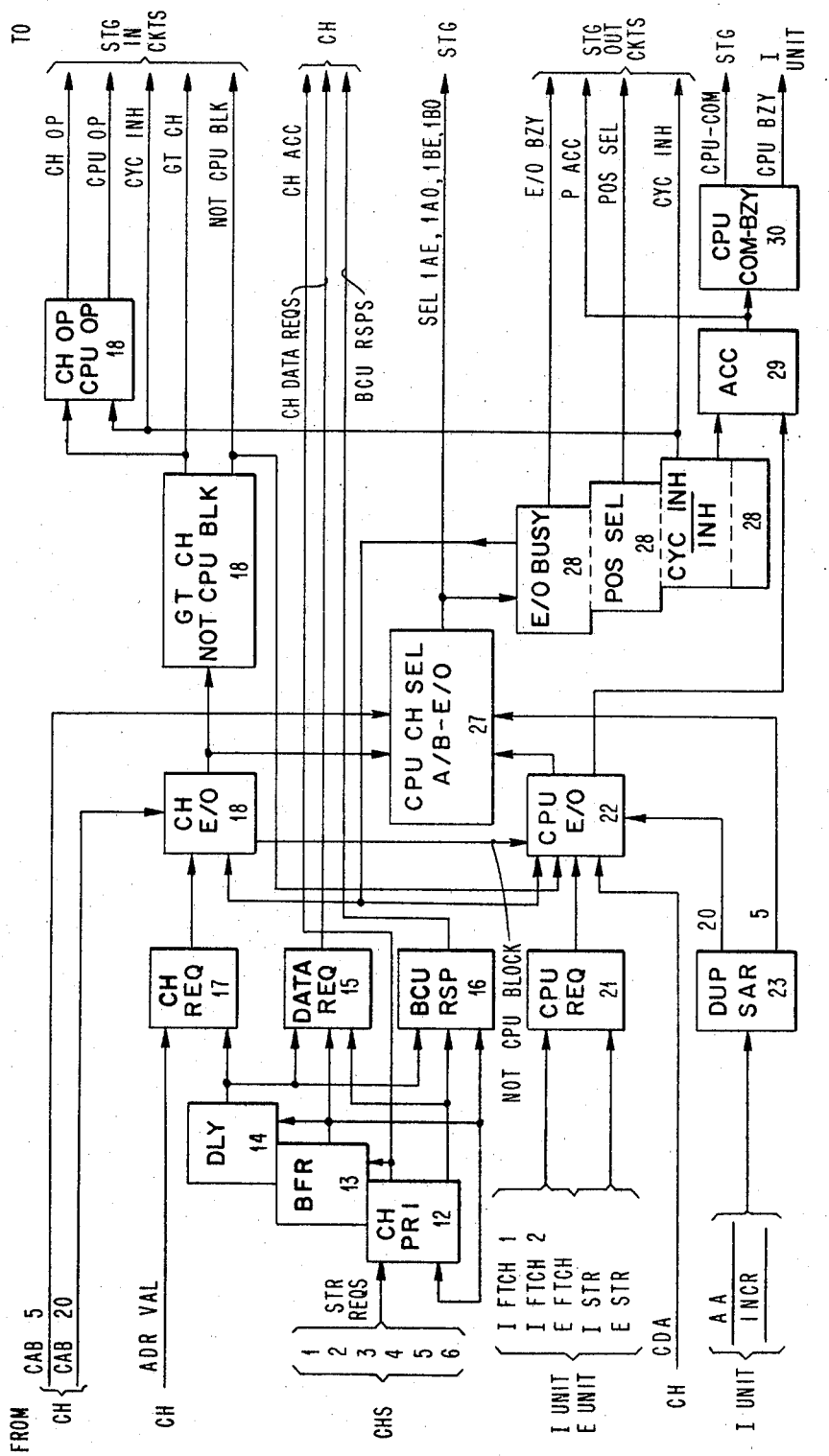
Figure 10:
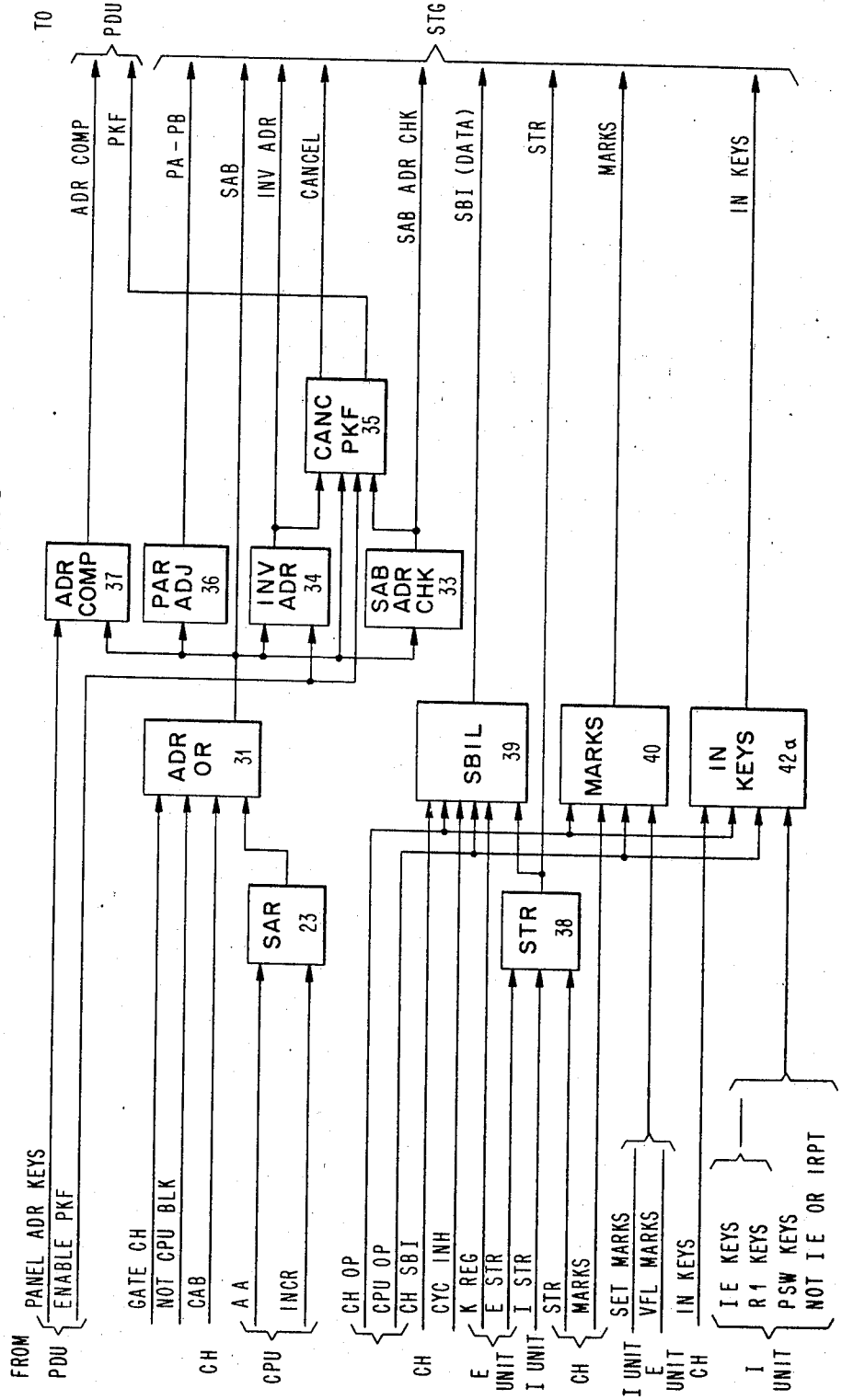
Figure 11:
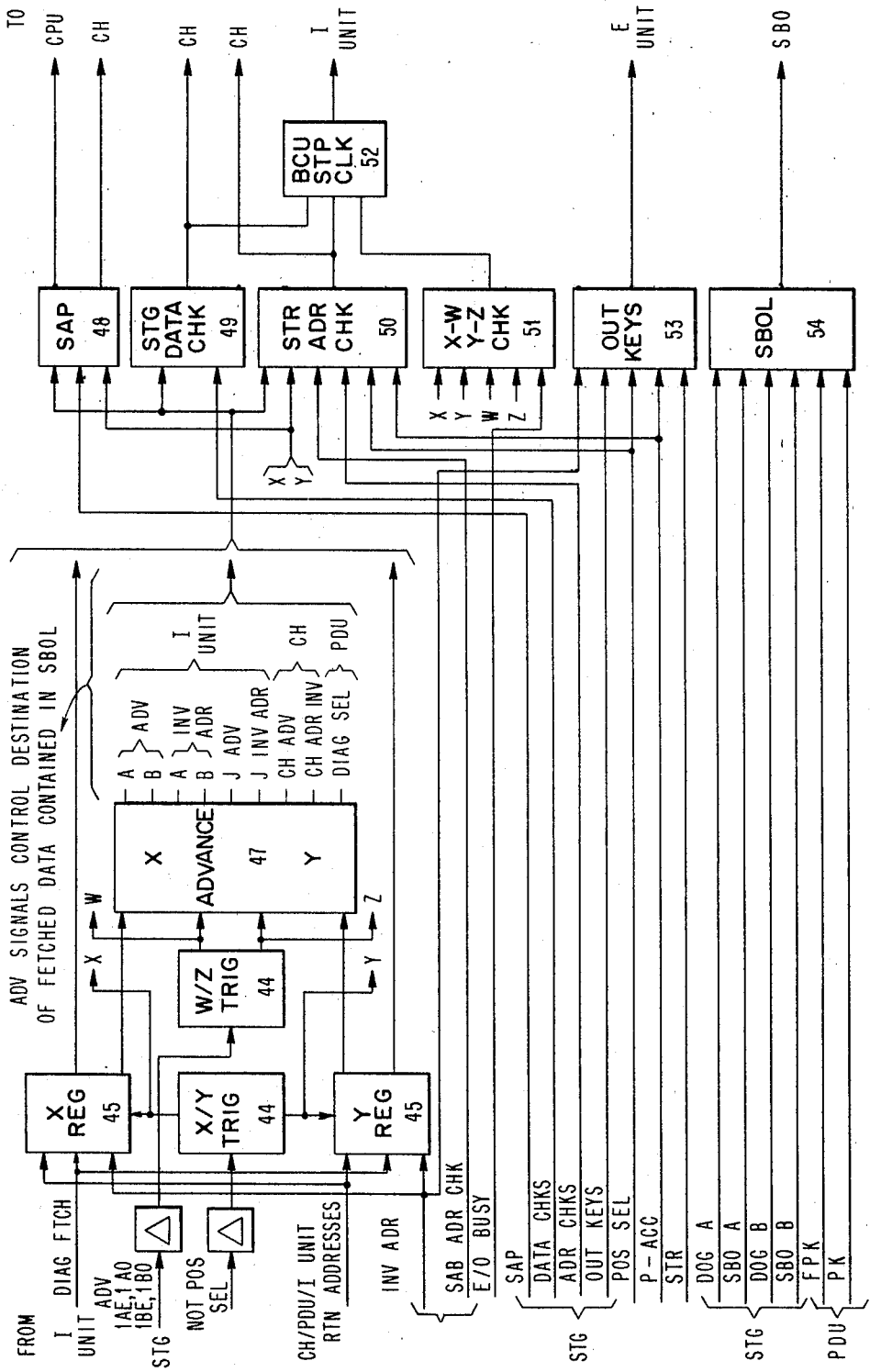

| | Sheet |
|---|---|
| (FIG. 1) System Illustration | 1 |
| (FIG. 2) Environmental System | 2 |
| (FIGS. 3a–5b) Component Circuits | 3 |
| (FIGS. 6a–8b) Component Circuits | 4 |
| (FIG. 9) Selection Circuits | 5 |
| (FIG. 10) Storage Input Circuits | 6 |
| (FIG. 11) Storage Output Circuits | 7 |
| FIGS. 12–59 are illustrative of said environmental system | 8–38 |
| (FIG. 60) Check Stop Timing | 39 |
| FIGS. 61–67 are illustrative of said environmental system | 40–43 |
| (FIG. 68) I Unit Scan | 44 |
| (FIG. 69) E Unit Scan | 45 |
| FIGS. 70–71 are illustrative of said environmental system | 46–47 |
| (FIG. 72) E Unit Data Flow (1) | 48 |
| (FIG. 73) E Unit Data Flow (2) | 49 |
| (FIG. 74) I Unit | 50 |
| (FIG. 75) GR+ADR | 51 |
| FIGS. 76–372 are illustrative of said environmental system | 52–258 |
| (FIG. 373) VFL Data Flow | 259 |
| FIGS. 374–534 are illustrative of said environmental system | 260–382 |
| (FIG. 535) E Unit Data Flow (Binary) | 383 |
| (FIG. 536) E Unit Data Flow (Binary) | 384 |
| FIGS. 537–620 are illustrative of said environmental system | 385–449 |
| (FIG. 621) Main Adder | 450 |
| (FIG. 622) Section Carries | 451 |
| (FIG. 623) Group Functions | 452 |
| (FIG. 624) Bit Functions (T & G) | 453 |
| (FIG. 625) Half Sums+MA | 453 |
| (FIG. 626) Section Functions | 454 |
| (FIG. 627) Group Carries-MA | 455 |
| (FIG. 628) C in Bits (8–63) | 456 |
| (FIG. 629) Internal C in Bits 0–6 | 457 |
| (FIG. 630) C in Bits 4–6 | 457 |
| (FIG. 631) C in Bits 0–3 | 458 |
| (FIG. 632) Sum | 459 |
| (FIG. 633) MA Left EXT | 460 |
| (FIG. 634) Shifter IN | 460 |
| (FIG. 635) MA Right EXT | 461 |
| (FIG. 636) Shifter | 462 |
| (FIG. 637) MA Latch | 463 |
| (FIG. 638) MA P IN | 464 |
| (FIG. 639) P INT C | 465 |
| (FIG. 640) MA & HS P | 466 |
| (FIG. 641) Main Adder Latch Parity | 467 |
| (FIG. 642) PRED HS Parity | 468 |
| (FIG. 643) HS Parity CHK | 468 |
| (FIG. 644) Bit Function CHK | 468 |
| (FIG. 645) C IN/OUT/ERR | 469 |
| (FIG. 646) Byte ERR | 469 |
| (FIG. 647) MA ERR | 470 |
| FIGS. 648–876 are illustrative of said environmental system | 471–643 |

(2.0) REFERENCES

A primary reference in understanding the full environment of the present invention is an architectural description, or definition, of a system in which the present invention is embodied. This comprises a manual entitled "IBM System/360 Principles of Operation," a copy of which is available in the Scientific Library of the U.S. Patent Office, "IBM Form No. A22-6821."

Another reference, which discloses a small system in accordance with the architecture of said System/360 Manual is found in a copending application of the same assignee entitled Data Processing System, Ser. No. 357,372, filed on Apr. 6, 1964, by G. M. Amdahl, et al.

An input/output channel device which is adapted for use in said environmental system is disclosed in a copending application of the same assignee entitled Automatic Channel Apparatus, Ser. No. 357,369, filed Apr. 6, 1964, by L. E. King, et al.

A core storage device is shown in a copending application of the same assignee entitled Storage Drive Sense System, Ser. No. 445,306, filed Apr. 5, 1965, by Anatol Furman.

A bipolar latch, used throughout said environmental system, is described in detail in an article by O. J. Bedrij, entitled Gated Trigger with Bipolar Set, IBM Technical Disclosure Bulletin, Vol. 2, No. 6, April 1960, Page 50 (a copy of which is available in the Scientific Library of the U.S. Patent Office).

A binary trigger is referred to in particular in section 5. This trigger is described in detail in section 11b of a copending application of the same assignee entitled Parallel Memory, Multiple Processing, Variable Word Length Computer, Ser. No. 332,648, filed Dec. 23, 1963, by R. S. Carter and W. W. Welz now Patent No. 3,270,325 issued on Aug. 30, 1966.

Binary-decimal addition is described in a copending application of the same assignee, Ser. No. 223,431, entitled Byte Processing Unit, filed Sept. 13, 1962 by Robert Keslin. A shifter is described in a copending application of the same assignee, Ser. No. 162,477, Proportional Space Matrix Printer, filed Dec. 27, 1961 by Richard L. Taylor now Patent No. 3,174,427 issued on Mar. 23, 1965.

Additional references include the following copending applications of the same assignee as in this case, each of which forms a part of, and is illustrated in, the environmental system, which is entitled Large Scale Data Processing System:

Large scale data processing system, Ser. No. 445,326, filed Apr. 5, 1966, by O. L. MacSorley et al., now abandoned.

Large scale data processing system, Ser. 609,238, filed on Jan. 13, 1967 by O. L. MacSorley et al. said application being a continuation-in-part of Ser. No. 445,326.

Storage reference priority in a data processing system, Ser. No. 445,316, filed Apr. 5, 1965, by L. J. Hasbrouck et al., now abandoned.

Storage reference priority in a data processing system, Patent No. 3,376,556 filed on Jan. 13, 1967 by L. J. Hasbrouck et al., said patent being a continuation-in-part of Ser. No. 445,316.

Unit unavailability detector for a data processing system, Ser. No. 445,318, filed Apr. 5, 1965, by W. P. Wissick et al. now Patent No. 3,341,824, issued on Sept. 12, 1967.

Rate control in an asynchronous device storage accessing apparatus, Ser. No. 445,319, filed Apr. 5, 1965, by W. P. Wissick et al. now abandoned.

Rate control in an asynchronous device storage accessing apparatus, Patent No. 3,377,579 issued on Apr. 9, 1968 by W. P. Wissick et al.

Storage cancellation and panel data key fetching in a data processing system, Ser. No. 445,311, filed Apr. 5, 1965, by W. P. Wissick et al., now abandoned.

Storage cancellation and panel data key fetching in a data processing system, Patent No. 3,374,472 filed on Jan. 13, 1967 by W. P. Wissick et al. said patent being a continuation-in-part of now abandoned application Ser. No. 455,311, filed Apr. 5, 1965.

(3.0) NOMENCLATURE

The nomenclature of the present embodiment is almost entirely consistent with that shown in said System/360 Manual. A few exceptions do exist however. One of these is the instruction Execute and is herein referred to in abbreviated form as XEQ, whereas said Manual refers to this instruction in abbreviated form as EX. Another example is the instruction Edit; it is referred to in abbreviated form herein as EDT whereas said Manual refers to same as ED. In order to avoid confusion with "execution," "E decode," and other similar functions in the present embodiment, these changes have been made. However, a good definition of each of the instructions which may be performed by the present embodiment is found in said Manual. Additionally, the functions of a data processing system in accordance with the architectural definition within said Manual are applicable to this embodiment, with the exception of the fact that the present embodiment does not provide for: sharing of storage by more than one system, a multiplex channel, direct coupling between computers, large capacity storage, and certain other features which could be available on an embodiment of the system described in said manual. However, said environmental system is readily adapted for the achievement of these functions.

In the present embodiment, a bit means a binary unit of intelligence, which can be either a one or a zero. A byte comprises eight bits, two bytes comprise a syllable or a half-word. Two syllables, or two half-words comprise a word, which includes thirty-two bits. A storage word is two words or sixty-four bits in the environmental system of the present embodiment. In storage, and within the data flow of the environmental system, there is one parity bit for each eight bits of data; at certain points in a data flow this is altered; for instance, at the output of an adder, it is possible that parity may be carried to several stages of logic on a four bit basis, and then combined on an eight bit basis.

In the detailed descriptions herein, the signals which propagate between various figures are all identified by unique lines which are referred to in the upper case (such as SAR meaning the output of the storage address register, CPU RST being the line that causes a computer reset of a particular type). As is discussed more fully in section 5, hereinafter, the use of positive and negative signals as inputs to positive and negative-type circuits is so customary, that it no longer has any significance to consider signals in actual circuitry as being either the true or the complement of an event; for instance, if a signal is generated in a positive sense when the event occurs, a minus signal may nonetheless be required to indicate that event due to the fact that the circuit which is utilizing the signal requires a negative input. For that reason, complementary functions (such as NOT LC, meaning the complement of the LC signal) are referred to as inputs even though they may not be explicitly generated in the circuit where the event is manifested by the true signal.

In block diagrams which comprise a plurality of blocks, each block being represented by one or more figures, the figure or figures within which the details of the particular block are shown may be identified in that block by figure number only, without the word "FIG." actually being printed within that block. This allows a simpler block configuration which is easier to read.

In the description of the detail figures, the various circuit elements are referred to by reference numerals, the reference numerals being applicable only in the particular figure number. However, in any case where a particular item is referred to in more than one place, it would have the same reference numeral wherever it is referred to. On the other hand, reference numerals between 1 and 30 are used repetitively throughout the environmental system due to the fact that the size of the environmental system would require reference numerals having four or five digits if completely sequential reference numerals were used for the entire environmental system. Therefore, any possible tendency toward confusion is alleviated by also specifying the figure number along with the reference numeral; additionally, the description itself is patently clear insofar as the precise element to which reference is being made.

When terms such as "storage cycle" or "last E cycle" are used, machine cycles as such are not necessarily involved. For instance, a storage cycle requires five machine cycles in the embodiment of said environmental system; last cycle triggers may be set from the start of NOT L time to the start of the following NOT L time, a period equal to a 200 nanosecond machine cycle, but displaced therefrom by approximately 65 nanoseconds since the basic machine cycle is defined to be from the start of A time to the end of A time, as is described in section 7. The duration or phase of any specially-referred to cycle often differs from a basic machine cycle. The terms, when used, refer to the latched condition or even being described, as is apparent in the context where used.

In order to facilitate cross referencing between the various copending applications, and most particularly, to facilitate cross referencing of embodiments in said copending applications of portions of said environmental system with the embodiment of a full environment system, constant sequential figure numbers are used in all of said copending applications, whereby all figure numbers are identical in all of the cases. In order to reduce the cost of printing, figure numbers which relate to circuits not required in smaller embodiments are shown in an illustrative manner only. Any reference to a figure which is shown in an exemplary form in one of said copending applications should be interpreted as a reference to that same figure in the embodiment of said environmental system.

In certain instances, control lines comprising a particular combination of operational decoding or other status indications may not be shown in detail; that is, a line called "BR OR STATUS SWX" may be utilized, as an input to a circuit, but may not be generated, as an output from a circuit. However, there are innumerable examples of generated decode lines such that the generation of any other one would be well within the skill of the art. As an example, a line called "VFL T1 OR Y≠0" could be generated by the OR of "VFL T1" with "Y≠0," or with "NOT Y EQ 0," or by OR'ing the bits of the Y REG to see that Y does indeed equal other than zero.

(4.0) BRIEF DESCRIPTION OF ENVIRONMENTAL SYSTEM (FIG. 2)

Figure 2:
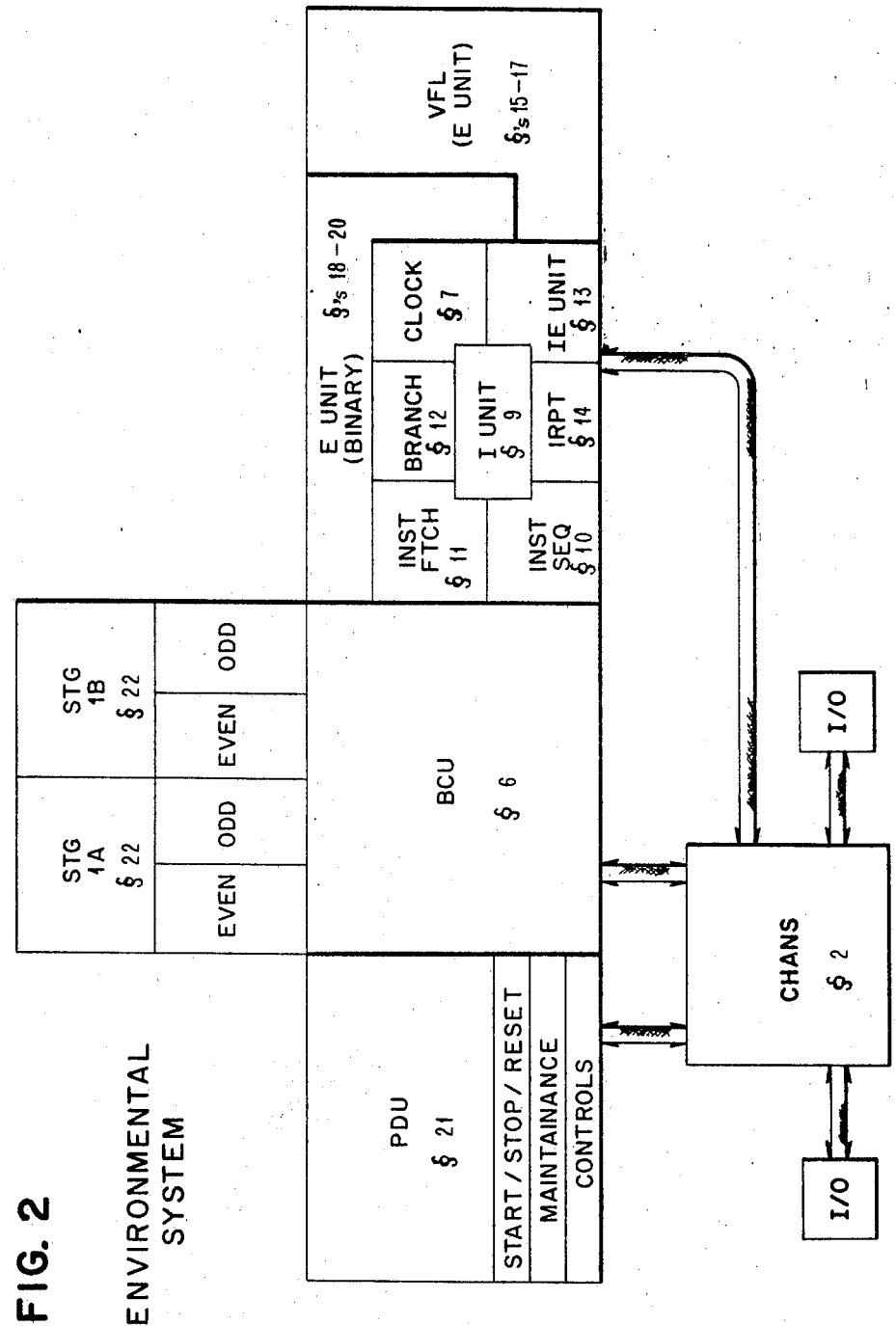

In FIG. 2, a block representation of said environmental system is shown to include a bus control unit (BCU) which is described in section 6, and which provides data flow communication between the various units of the system, and provides controls for the storage devices. The operator controls, certain maintenance controls, and basic stop start and reset controls are provided in the power distribution unit (PDU) described in section 21. The system also includes an I unit, the data flow portion of which is described in section 9, the main other functions of the unit being described in separate sections. The clock is shown in section 7, and includes the main timing pulses which are utilized throughout the system so as to synchronize operations. In section 10, instruction sequencing is described, and instruction fetching is described in section 11. Branching operations, and their effect on the remainder of the system are all described in section 12. Communication with channels, and perfomance of certain supervisory type instructions, inter alia, are described with respect to an I execution unit (IE UNIT) in section 13. Interruption handling, and functions which, although not interruptions, are handled by the interruption circuitry, are described in section 14 of said environmental system. The E unit of said environmental system includes a binary portion and a VFL portion, which are referred to in a compound fashion; both the binary and VFL portion are considered part of the E unit, and E unit controls can come from either portion. However, the binary portion is generally not referred to as such, but is referred to merely as the E unit, and the VFL (variable field length) portion is usually referred to as the "VFL." Storage devices are not completely described herein, but the logical control thereover as it relates to the bus control unit is described in section 22.

(5.0) COMPONENT CIRCUITS (FIG. 3 THROUGH FIG. 8)

In FIG. 3 through FIG. 8, component circuits of the type which may be utilized in said environmental system are illustrated. These are not exhaustive, and merely illustrate types of circuits which might be utilized, and the manner in which they are illustrated in the detailed description of said environmental system.

Figure 3A:
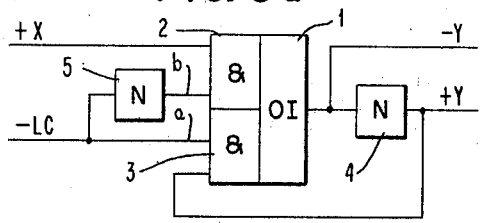

In FIG. 3a, a simple latch is shown. This comprises an "AND-OR-INVERTER" combination which includes an OR circuit 1 and two AND circuits 2, 3 as well as two inverters 4, 5. In normal operation, whenever the LC line is positive, the inverter 5 will provide a signal "b" to the AND circuit 2 so that a +X signal, whenever it may arrive, will cause the AND circuit 2 to activate the OR-INVERT circuit 1 thereby generating a —Y signal. If the +X signal is removed, then the —Y signal will disappear. The —Y signal causes the inverter 4 to generate the +Y signal which is fed back to an AND circuit 3; however, so long as the —LC pulse is present, the AND circuit 3 will not operate, so that the circuit of FIG. 3a is essentially an AND circuit whereby a +X signal and the signal from the inverter 5 pass through the AND circuit 2, becomes inverted in the OR circuit 1, and no latching takes place.

When the LC signal turns positive (at NOT L time) then any +X signal will cause a +Y signal to be gated through the AND circuit 3 thereby causing the circuit of FIG. 3a to become latched for the duration of the +LC signal. When the LC signal returns to a negative condition (at L time) then the state of the latch can again be changed. During the time that the circuit is latched, the AND circuit 3 will be passing a signal through the OR circuit 1 provided the latch was on at the time that the latching condition commenced, and the AND circuit 2 is blocked by the inverter 5. When the LC line returns to a negative condition, the AND circuit 3 will be immediately blocked, and the inverter 5, having about a seven nanosecond delay, will later cause the unblocking of the AND circuit 2. Thus, there is a short period of about seven nanoseconds (as illustrated in FIG. 3d) when the circuit of FIG. 3a will have no output whatever. This is of too short a duration to be illustrated in FIG. 3c which shows the operation of the latch of FIG. 3a in general terms.

Figure 3B:
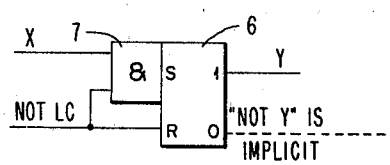
Figure 3C:
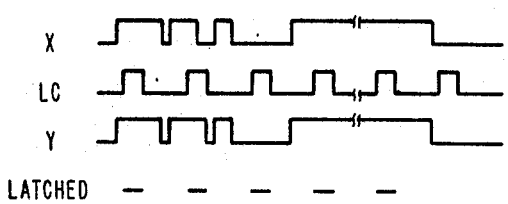
Figure 3D:
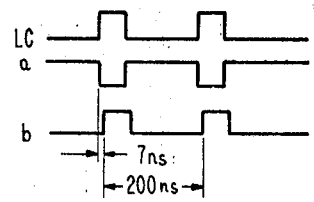

The circuit of FIG. 3a is illustrated herein as shown in FIG. 3b. Thus, the circuit of FIG. 3a can be considered to be a latch circuit 6 settable by an AND circuit 7 at NOT L time, to be reset at L time.

Figure 4A:
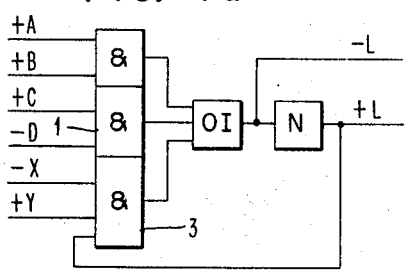
Figure 4B:
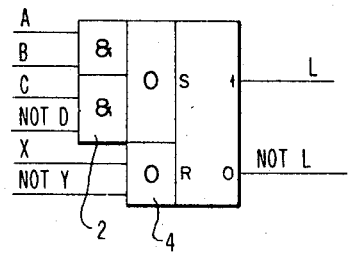
Figure 5A:
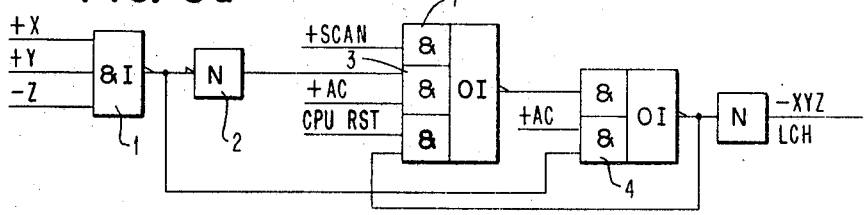

In FIG. 4a is shown a variation of a latch having a combined reset condition which, as shown in FIG. 4b includes X or NOT Y. Notice that the AND circuit 1 in FIG. 4a has a minus D signal applied thereto which represents a NOT D as illustrated by the AND circuit 2 in FIG. 4b. Also notice that the AND circuit 3 in FIG. 4a has both —X and applied Y signals thereto so that the latched effect will be ended by the disappearance of —X or by the disappearance of +Y. This is illustrated as resetting in response to either X or NOT Y by the OR circuit 4 in FIG. 4b. A still further complicated latch is illustrated in FIG. 5a. This includes an AND-INVERT circuit 1 which passes a signal through an inverter 2 (the output of which then would be positive when the conditions to the AND invert circuit 1 are met) so as to cause an AND circuit 3 to operate when the +AC signal appears. +AC means a positive controlled clock signal having the A time duration. The "C" within "AC" stands for "controlled," in contrast with "running," as is the case when an AR signal is involved. The AR signal would be of the same duration and timing as the AC signal, but could run even through single cycle operations, whereas the AC signal would be stopped during single cycle operations.

Figure 5B:
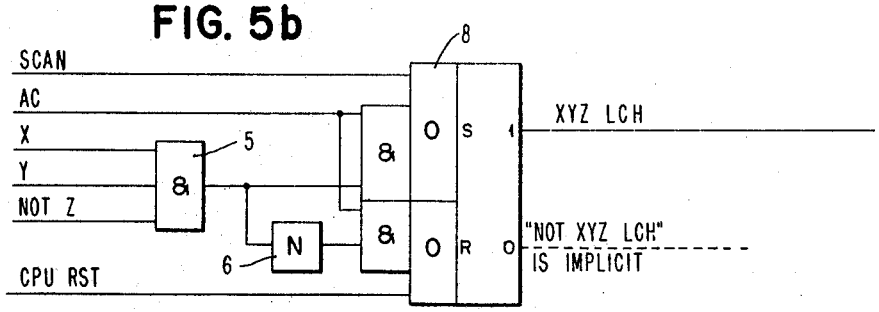

The latch of FIG. 5a can be reset by the CPU RST signal, or by the raw output of the AND INVERT circuit 1 as applied to an AND circuit 4. The circuit of FIG. 5a would be illustrated herein as shown in FIG. 5b, wherein an AND circuit 5 will either set or reset the latch in dependence upon whether the conditions are met, due to the assistance of an inverter 6. Notice also that single-input AND circuits such as the AND circuit 7 in FIG. 5a actually represents merely an input to the OR INVERT circuit, as illustrated by the direct application of the scan signal to the OR circuit 8 in FIG. 5b.

Figure 6A:
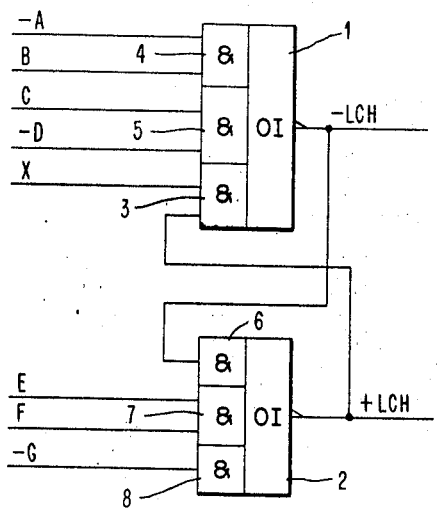
Figure 6B:
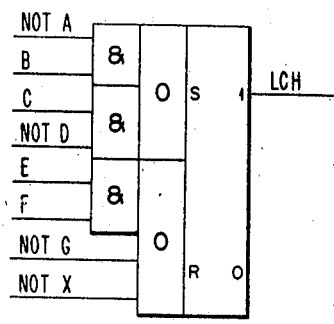

A variation in the circuit of FIG. 5a is shown in FIG. 6a, wherein a first OR INVERT circuit 1 operates when the latch is in the on condition, and a second OR INVERT circuit 2 operates when the latch is in the reset condition. When the OR circuit 2 operates, it has a negative output, thereby locking an AND circuit 3. However, a negative output from the OR circuit 2 does not preclude an output from the latch inasmuch as either one of two AND circuits 4, 5 could supply an input to the OR circuit 1. If either of the AND circuits 4, 5 do operate, then there will be a minus signal out of the OR circuit 1 which will block a single-input AND circuit 6 at the input to the OR circuit 2 so that the OR circuit 2 will normally have no output unless inputs applied to either an AND circuit 7 or a single input AND circuit 8. With the OR circuit 2 locked, its positive output will be applied to an AND circuit 3, and if there is an X signal at the AND circuit 3, then the latch will remain on even though either of the OR circuits 4, 5 which turn the latch on in the first place no longer has inputs thereto. This is illustrated more clearly in the circuit shown in FIG. 6b, which represents the manner of illustrating this circuit herein. As seen in FIG. 6b, the latch can be turned on by NOT A and B, or by C and NOT D. If turned on, it will latch up provided that E and F are not both present, and provided that G and X are both present. If the latch turns on and becomes latched in an on condition, then the appearance of E and F together or the appearance of NOT G or NOT X will cause the latch to turn off.

Figure 7A:
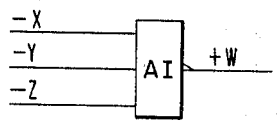
Figure 7B:
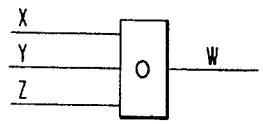

In FIG. 7a, an AND INVERT circuit with minus inputs is shown to create a +W signal. This is fully equivalent to the circuit of FIG. 7b wherein a positive, non-inverting OR circuit responds to positive XYZ signals to generate a positive W signal.

Figure 8A:
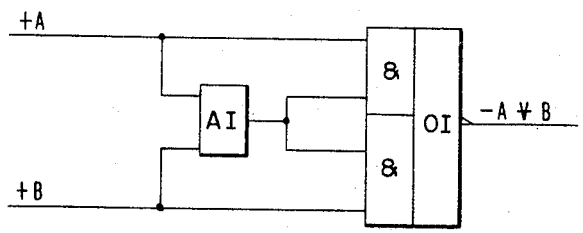
Figure 8B:
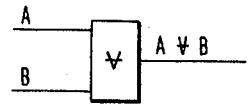

FIG. 8a is a simple illustration of a two input EXCLUSIVE OR circuit, which is represented herein as shown in FIG. 8b. It should be understood that the EXCLUSIVE OR function with only two inputs is a test for oddness: that is, one and only one input must be present; if no inputs or two inputs are present, then there will be no output. Thus, an odd number of inputs are required. In the embodiment described herein, a term "EXCLUSIVE OR circuits" is utilized to mean a complex of EXCLUSIVE OR circuits which test for oddness and evenness of the inputs thereto. These may be actually manifested in two input EXCLUSIVE OR circuits as shown in FIG. 8a, or may be represented with EXCLUSIVE OR circuits actually responding to more inputs. To the extent that more than two inputs are shown, it can be assumed that a three input EXCLUSIVE OR circuit or a two input EXCLUSIVE OR circuit or combinations thereof are utilized in a well-known "tree" fashion so as to provide an EXCLUSIVE OR complex which gives an output whenever the inputs thereto are odd in number.

From the foregoing description, it can be seen that the presence of a plus or a minus signal has no significance in and of itself, due to the way in which a plus or a minus signal may be utilized. For instance, when applied to a +AND circuit of a reset side of a latch as shown in FIG. 6a it may be a NOT signal, as illustrated by the NOT G signal shown in FIG. 6b. Similarly, when applied to a resetting AND circuit such as the AND circuit 3 in FIG. 4a, a −X signal really becomes an X signal in terms of its logical connotation as illustrated in FIG. 4b. Also, the minus signals applied to the circuit of FIG. 7a in fact are plus signals when the function of that circuit is considered to be an OR circuit. For that reason, the simplified showing of the present embodiment (such as illustrated in FIGS. 3b, 4b, 5b, 6b, 7b and 8b) do not consider whether a plus or minus signal may be generated in true or complement form, since such considerations have no bearing on the way in which the signal may be utilized. However, at the input to any particular circuit (such as the input to FIG. 6b) the affirmative or negative function which the signal represents does have logical connotation and is shown. To the extent that a "NOT SIGNAL" is required but not generated, it is implied that one with orbinary skill in the art could obtain the opposite phase thereof from the source of the "SIGNAL." This is illustrated, for instance, in FIGS. 3a and 3b where both phases are generated in 3a, and only the affirmative phase is generated in 3b, the complement thereto being implied.

(6.0) BASIC BUS CONTROL UNIT

The BCU (bus control unit) acts as a buffering traffic control for data, address, control, and checking signals between the storage devices and the rest of the system. In this embodiment, the CPU (including the I unit, the IE unit, the BE unit, and the E unit) is considered to be a single device with respect to the accessing of storage, and it must share storage with the channels. Each of the I/O channels 1–6 has a priority rating corresponding to its number (1–6), and the MC (maintenance channel, including panel keys and panel indicators) comprises a seventh, lowest-priority channel for storage reference purpose. In accessing storage, priority is determined as between channels, and then priority is determined between the selected channel and the CPU. Stated alternatively, the CPU may reference storage unless it is prevented from doing so by a prior outstanding request for an available storage device initiated from one of the channels; which one of the channels will be permitted to reference storage is determined independently by a channel priority circuit. For purposes of completeness and simplicity, the embodiment of a bus control unit described in this section does not include provisions for handling a large capacity storage, nor for the sharing of a single storage device by more than one data processing system. The BCU comprises three general portions, shown in FIG. 9, FIG. 10 and FIG. 11, and described in Sections 6.1, 6.2 and 6.3, respectively, of previously referred to Application Ser. No. 609,238.

(7.0) CLOCK CIRCUIT

(7.4) Clock circuit

Figure 60:
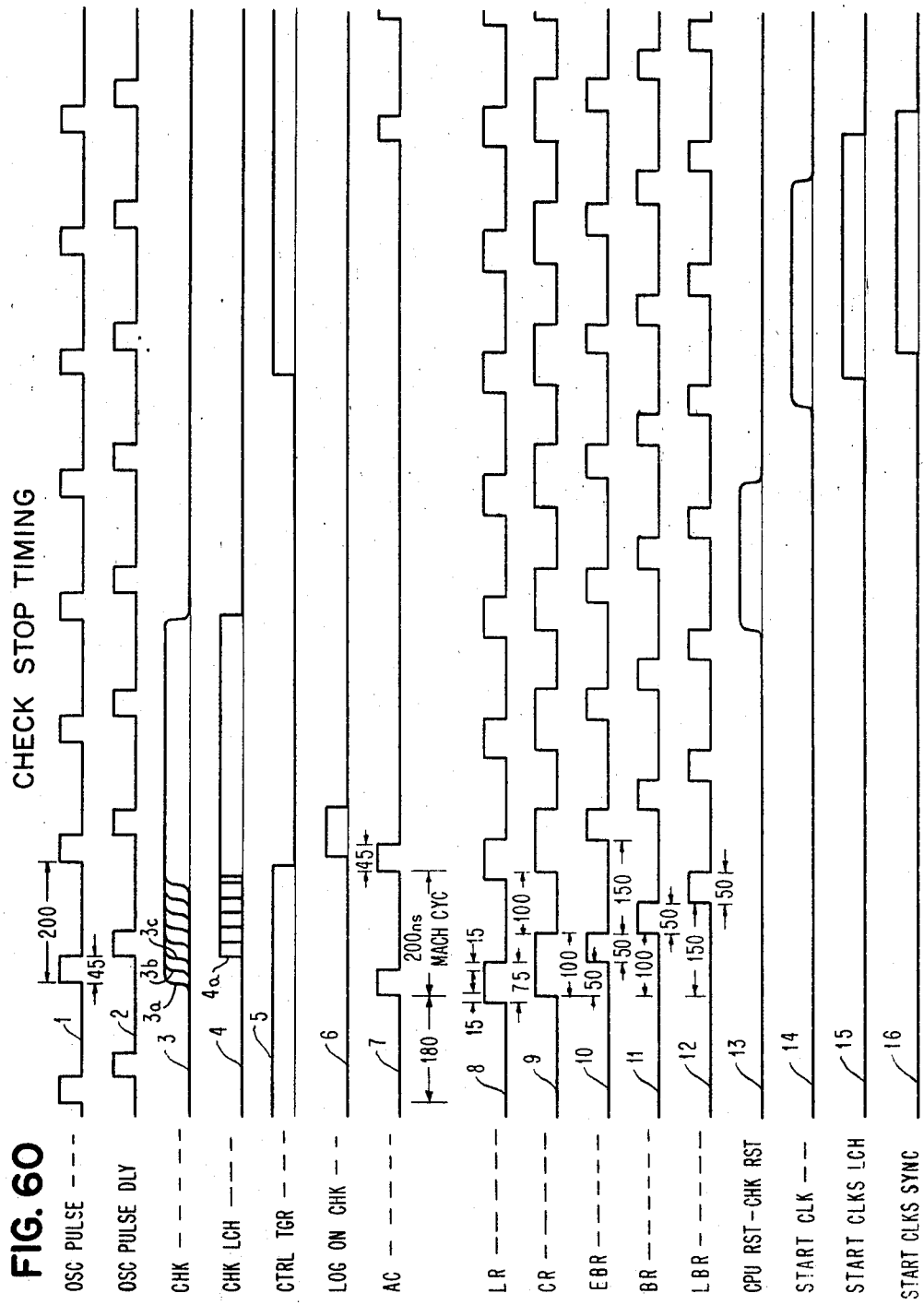

References herein to FIGS. 56–59, 61 and 62, refer to figures in said application Ser. No. 609,238. The actual timing signals used throughout the system are generated by the clock circuits shown in FIG. 59, the upper portion of which comprises the control clock, and the lower portion of which is identical to the upper portion and comprises the running clock; the only difference between them being that the control clock is operated by the gated control pulse signal from FIG. 58, whereas the running clock is operated by the gated running pulse signal from FIG. 58. The operation of the clock generating circuits is illustrated in FIG. 60 through FIG. 62. In FIG. 60 through FIG. 62, an OSC PULSE (illustration 1) comprises the signal on the OSC line. It is to be noted that this signal is about 45 nanoseconds in width, and the beginning of each pulse is separated from the beginning of the following pulse by 200 nanoseconds, which comprises a machine cycle. The delayed oscillator pulse (OSC PULSE DLY, illustration 2) comprises the output of the delay unit 7 in FIG. 58. This is the signal which gates the signals on the GATED CTRL PULSE line and on the FATED RUNNING PULSE line. These signals are utilized to generate the actual timing signals as shown in FIG. 59.

Whenever the clock has to be stopped because of error signals which give rise to a check condition, it is desirable to always know that the clock will stop at a definite time in relation to the time at which the error condition was sensed. Therefore, the clock circuits of FIG. 56 through FIG. 59 are arranged so that the clock will always stop within a machine cycle following the cycle within which an error could be sensed. Referring to illustration 3 of the check signal (CHK) in FIG. 60, it will be seen that check signals can appear at a number of different times within a machine cycle. It is therefore desirable to establish that these check signals will fall within a single defined machine cycle. For this reason, the final timing of the various clock signals (as shown in illustrations 7–12 in FIG. 60), is set up so that A time begins prior to the time when any of these check signals could occur and the next A described in section 7.5 only during the nonoscillator pulse time. Thus, either of the first two check setting times (3a, 3b) will cause the check latch to be set at time 4a, all other occurrences of a check condition causing the check latch to be set at a corresponding time, approximately 20 nanoseconds after the check condition has occurred, due to the time delays inherent in logic circuits used for setting the check latch. Thus, the establishment of a signal from the check latch is related to the timing of the oscillator in such a fashion that the basic timing signal which defines a machine cycle, which is A time, must occur approximately 180 nanoseconds after the oscillator pulse output on the OSC line in FIG. 56.

8.0 SCAN

Within the embodiment of said environmental system, the word "scan" means the forcing of conditions in bistable devices throughout the system, so as to cause the system to establish a particular state. This is accomplished by a network of circuitry which is complex in its size, but is conceptually very simple. The process includes defining a scan mode, identifying a particular cycle within the scan mode, and utilizing certain bits of a storage word fetched from storage as data bits to force particular bistable devices.

Figure 68:
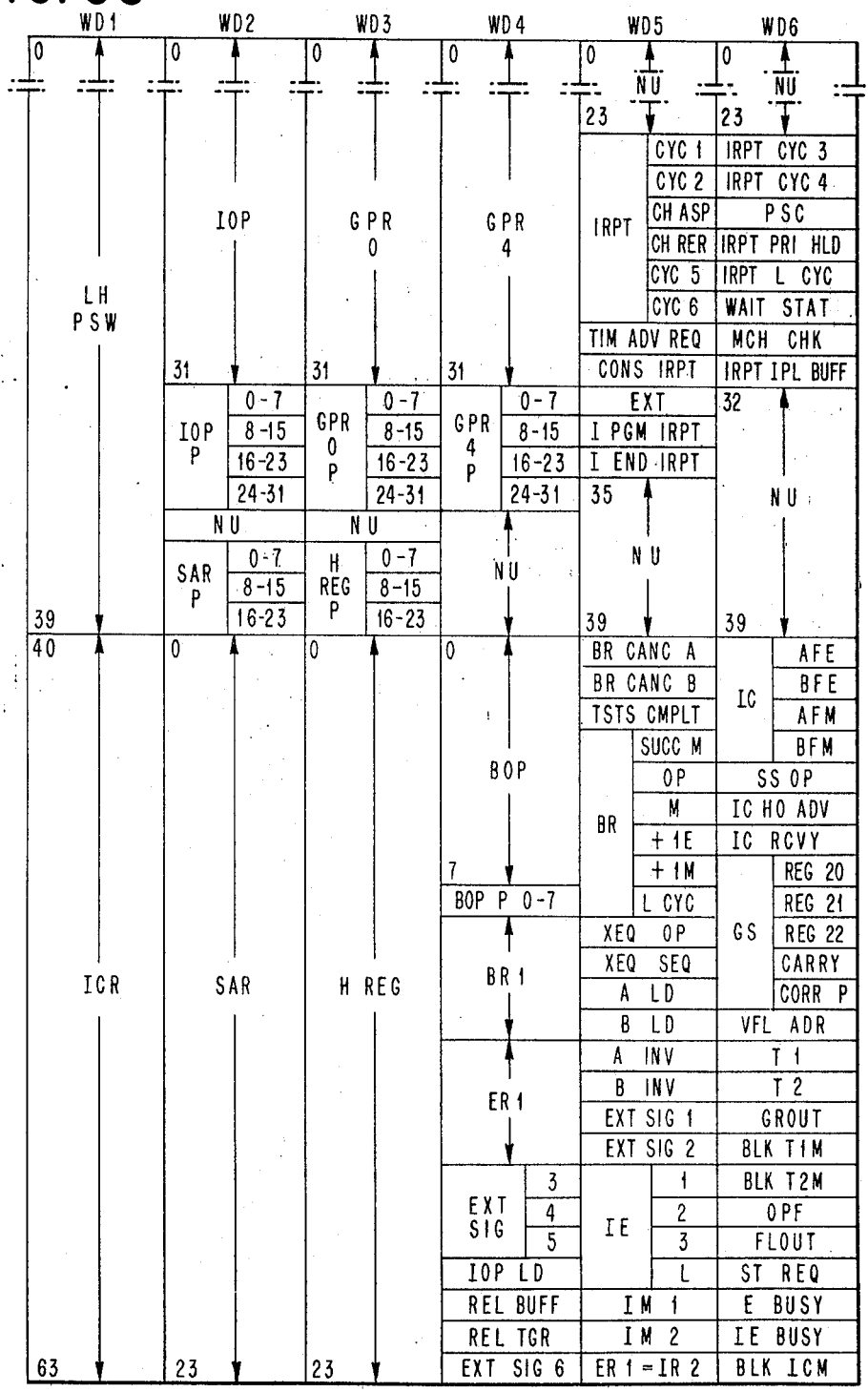

(8.1) Scanning into the I unit (FIG. 68)

I unit scanning is illustrated in FIG. 68. Scanning into the I unit is controlled by six scan word cycles, each one of which causes a 63-bit word to be set into various latches and triggers of the machine. The first scan cycle is defined as word 1 (WD1), which causes all 63 bits of the J register to be loaded into the PSW register, bit for bit, as shown in FIG. 68. In word 2 of the scan, bits 0–31 are loaded into the IOP register, and IOP parity bits themselves are forced by bits 32–36 of the J register. During this same cycle, the storage address register is loaded with bits 40–63 of the J register, and the parity bits of the storage address register are forced by bits 37–39 of the J register. In a similar fashion, the other words are applied to the various circuits as shown in the chart of FIG. 68. The manner of providing this gating is twofold: as in the case of the PSW register, scan gates are provided as shown at the top of FIG. 70 of application Ser. No. 609,238. When status triggers and registers are being scanned into (as in the case of word 5 and word 6, FIG. 68) actual signals are generated by scan gate signals in combination with bits of the J register as shown in FIG. 71 of application Ser. No. 609,238. But the circuits of FIG. 70 and 71 are merely illustrative of the manner in which scanning signals may be applied to the circuits of this embodiment.

Figure 69:
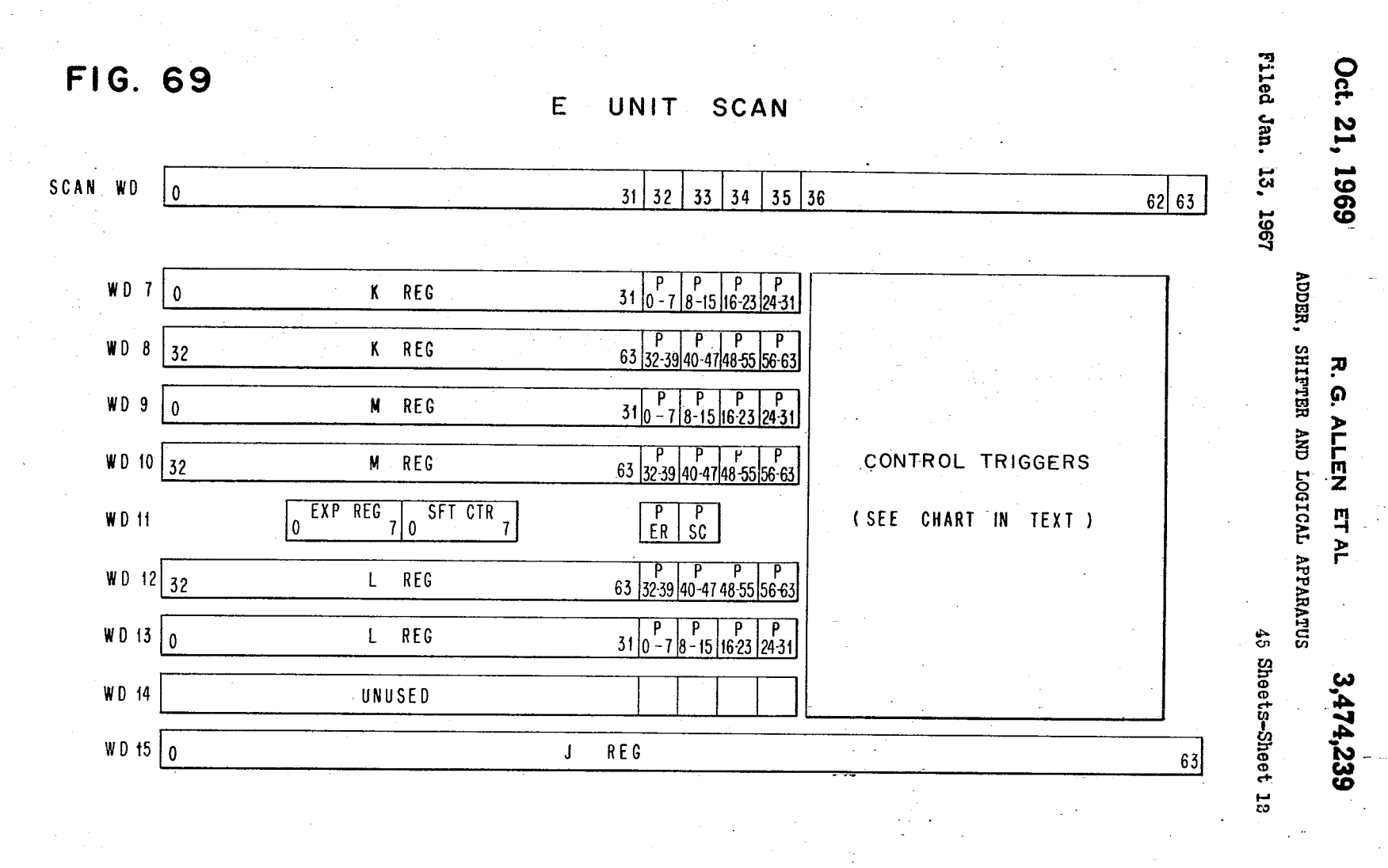

(8.2) Scanning into the E unit (FIG. 69)

A chart which is illustrated somewhat differently than FIG. 68, but which contains the same information, is shown in FIG. 69. E unit scanning commences after I unit scanning, and includes word 7 through word 15 of a scan operation. The chart of FIG. 69 is not complete as shown therein, bits 36–62 thereof for words 7 through 14 being illustrated in the following chart:

E scan-in chart—word 7

Bit trigger:
 36 J 0–7 EA
 37 J 0–63 MA T/C
 38 J 0–31 MA T/C
 39 J 32–39 EA
 40 J L 32 MA T/C
 41 J For Parity MA T/C
 42 K 0–63 MA
 43 K R4 MA
 44 K L2 MA
 45 DC 8
 46 DC 4
 47 DC 2
 48 DC 1
 49 DB 0
 50 DB 1
 51 DB 2
 52 DB 3
 53 DB P
 54 QUOT OVFLO
 55 QUOT SIGN OVFLO
 56 QUOT INSRT Z VALID
 57 QUOT INSRT Z QUOT
 58 QUOT INSRT DIV TRUE

(9.0) INSTRUCTION UNIT DATA FLOW

As is well known in the data processing art, every computer, or data processing system, utilizes instructions which include an operation portion that defines the actual data handling steps which the computer is to perform as well as an address portion which defines a location in storage of the data, or operands, upon which the operation is to be performed. Traditionally, a computer will have a section of the machine set aside for the purpose of handling the instruction, which section may have a variety of names such as control unit, instruction sequencing unit, or instruction unit. This portion of the machine is referred to herein as the I unit, the I unit selects instructions, handles branch and interrupt functions, communicates with the channels, and performs other related control functions.

The description of the I unit herein is divided into "data flow" and controls. "Data flow" refers to the main registers, adders, incrementers, and decoders among which the manifestations of instructions, or portions of instructions, are routed, so as to perform the registering, testing, incrementing, and decoding of their instruction manifestations so as to derive a useful result therefrom.

The description of the I unit data flow is covered in two different ways herein: first, a complete look at the data flow will be given in sections 9.1 et seq, followed by individual descriptions of main portions thereof. The block diagrams of the first section show the same matter as the block diagrams of the second section, but the purpose and approach of the drawings differs. In studying the circuitry in detail, the second section should be utilized; to get an idea of how instructions are handled in this system, the drawings of the first section should be utilized.

(9.1) General introduction to I unit data flow

Figure 72:
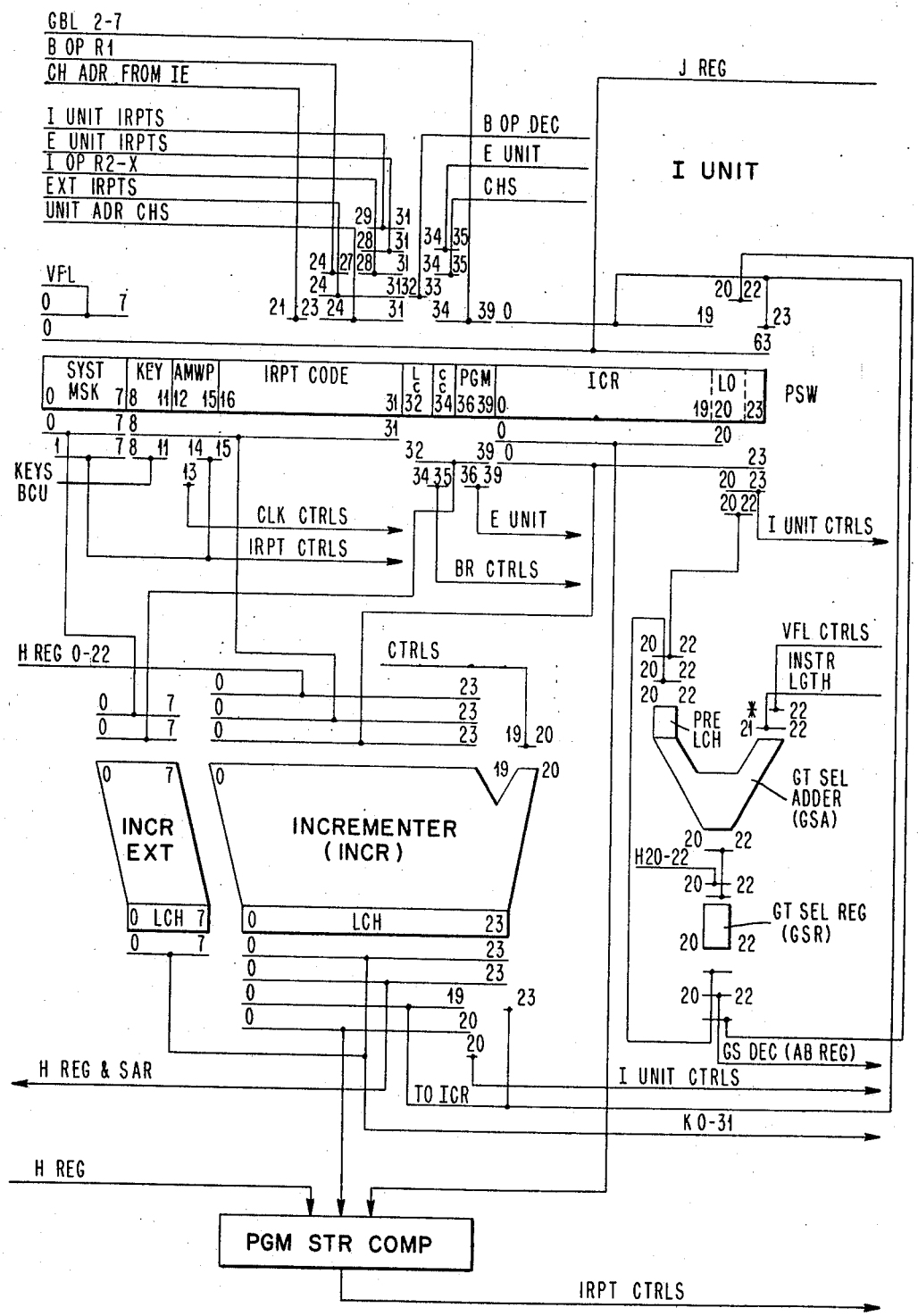
Figure 73:
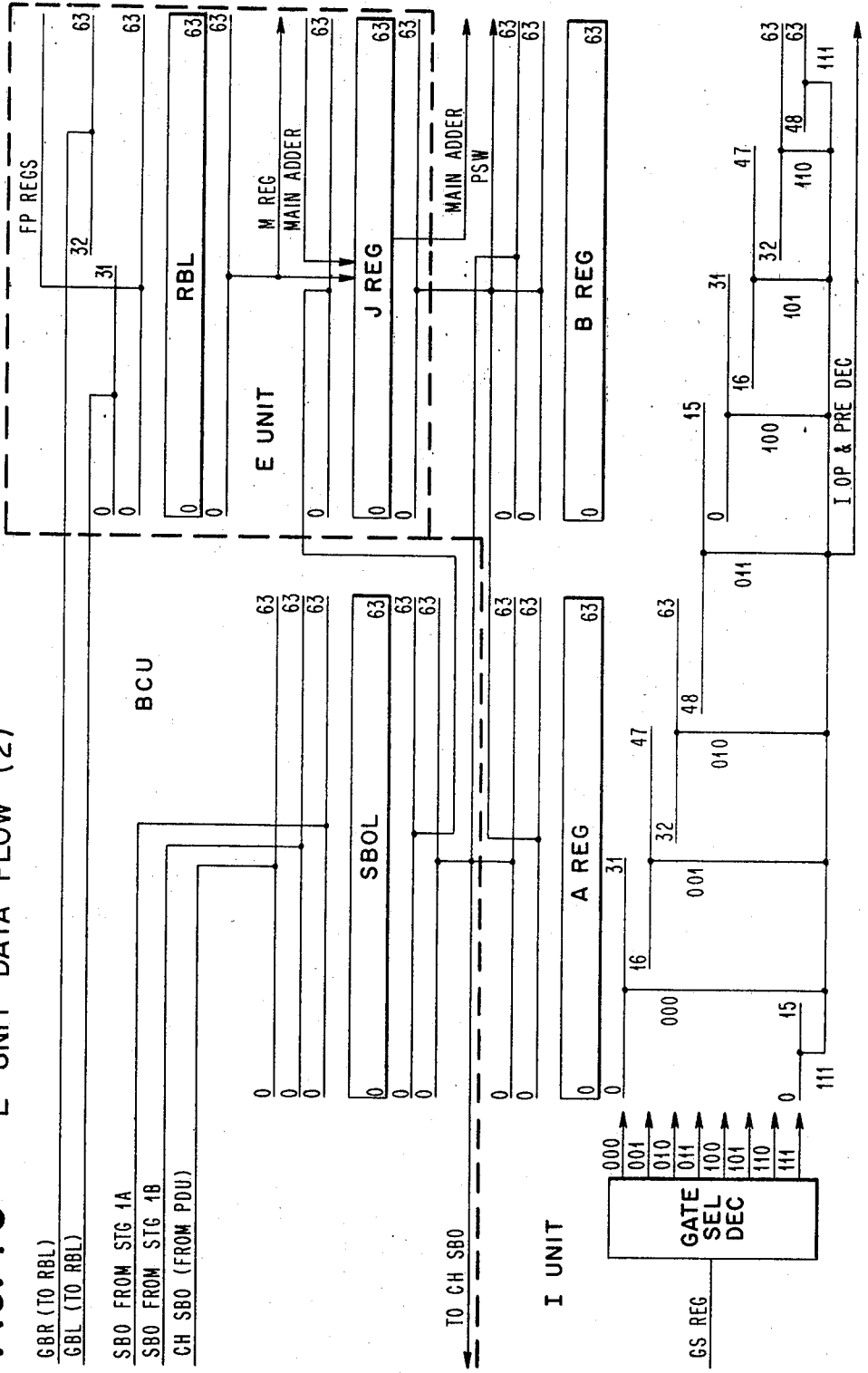

The I unit data flow is described in conjunction with portions of the E unit (which performs the arithmetic and logic operations upon operands, thereby executing the instructions), and the BCU (bus control unit, which controls the flow of data to and from storage units). The I unit data flow may be considered to comprise four portions:

Instruction selection shown in FIG. 72 and described in section 9.1.1;
Instruction input paths shown in FIG. 73 and described in section 9.1.2;
Instruction decoding shown in FIG. 74 and described in section 9.1.3;
AND instruction utilization shown in FIG. 75 and described in section 9.1.4.

(9.1.1) INSTRUCTION SELECTION (FIG. 72)

In the upper central section of FIG. 72 is shown the program status word register (PSW). This register is shown in detail in FIG. 131 through FIG. 139 of application Ser. No. 609,238. The PSW contains the system mask, storage protection keys, status bits indicating that the machine is utilizing ASCII code (A), the machine check mask (M), a WAIT bit (W), a PROBLEM bit (P), the INTERRUPTION CODE (IRPT CODE), the instruction LENGTH CODE (LC), the CONDIAION CODE (CC), the PROGRAM MASK (PGM), and the instruction counter register (ICR), including a low order portion thereof (LO). It is the ICR which determines the address of the next instruction in a sequence of instructions which comprise a program.

The ICR feeds an incrementer (INCR) which increments the instruction address each time that an instruction buffer register is to be loaded from storage; the ICR also feeds a gate select adder (GSA) which updates the instruction count each time an instruction is performed so as to generate a correct address for the next instruction in a sequence. The INCR is shown in detail in FIG. 140 through FIG. 154 of application Ser. No. 609,238. The output of the INCR may be returned to the ICR and may also be applied to the SAR (storage address register) and the H REG (H register, a backup for the storage address register), as well as to a PGM STR COMP (program store compare circuit) and to the high order half (K 0–31) of the K register. The INCR is sometimes used merely as a data path to pass 32 bits from one portion of the PSW register to the K register, and is sometimes used to check (for correct parity) the two halves of the PSW. In order to provide a 32 bit data path, the INCR is provided with an INCR EXT (incrementer extender) which provides the low order 8 bits (0–7) of the data path when the INCR is so utilized. The INCR may also receive inputs from the H REG.

The illustrative diagram of FIG. 72 also shows a gate select adder and gate select register (GSA, GSR) which control the selection of a particular group of instruction bytes from among 8-byte storage words as described in section 9.1.2. Since each instruction has at least two bytes, any addresing of storage is on a byte basis, the lowest ordered bit (23) of the ICR is not utilized in selecting instructions from the AB REG; thus, only bits 20–22 are involved in the gate select mechanism. The GS mechanism is shown in FIG. 156 through FIG. 162 of application Ser. No. 609,238.

(9.1.2) INSTRUCTION INPUT PATHS (FIG. 73)

The output of the gate select register (GSR) in FIG. 72 is applied to a gate select decode circuit GS DEC (AB REG) so as to select the correct 32 bits at one time out of the AB register (A REG, B REG). The AB register is utilized as a buffer register for instructions which are fetched from storage so as to insure that there is always one instruction available for procesing in addition to the instruction which is currently being processed in the I unit. Since the I unit generally processes each instruction concurrently with the execution of a previous instruction by the E unit, this means that the contents of the AB register may be as much as two instructions ahead of that which is being executed. Instructions are received from one of the storage units (STG 1A, STG 1B) over the storage bus out (SBO), or on the channel storage bus out (CH SBO) including data from the power distribution unit (PDU, which includes the maintenance channel). All data so received are stored in the storage but out latch (SBOL), instructions being transferrable directly to the AB register, and all data, including instructions, being transferrable to the channel storage bus out or to the J register (J REG). Instructions may be temporarily placed in the J REG if they have not been fetched by a certain time in an instruction fetch cycle, and will thereafter be transferred to the AB register provided that a branch has not occurred. In all other cases, timely received instructions are transferred directly from SBOL to the AB register. The contents of the AB register is transferred to the IOP register and to the PRE DEC or TP (predecode) circuit by means of the gate select mechanism, 32 bits at a time. The choice of the 32 bit group to be selected from the AB register is made by the GATE SEL DEC (gate select decode) circuit which is controlled by the gate select circuitry of FIG. 72 so that the extraction of each instruction will result in extracting the next sequential instruction on a following operation. The AB register, and GS output gating therefor, as shown in RIG 76 through FIG. 80 of application Ser. No. 609,238.

(9.1.3) INSTRUCTION DECODING (FIG. 74)

Figure 74:
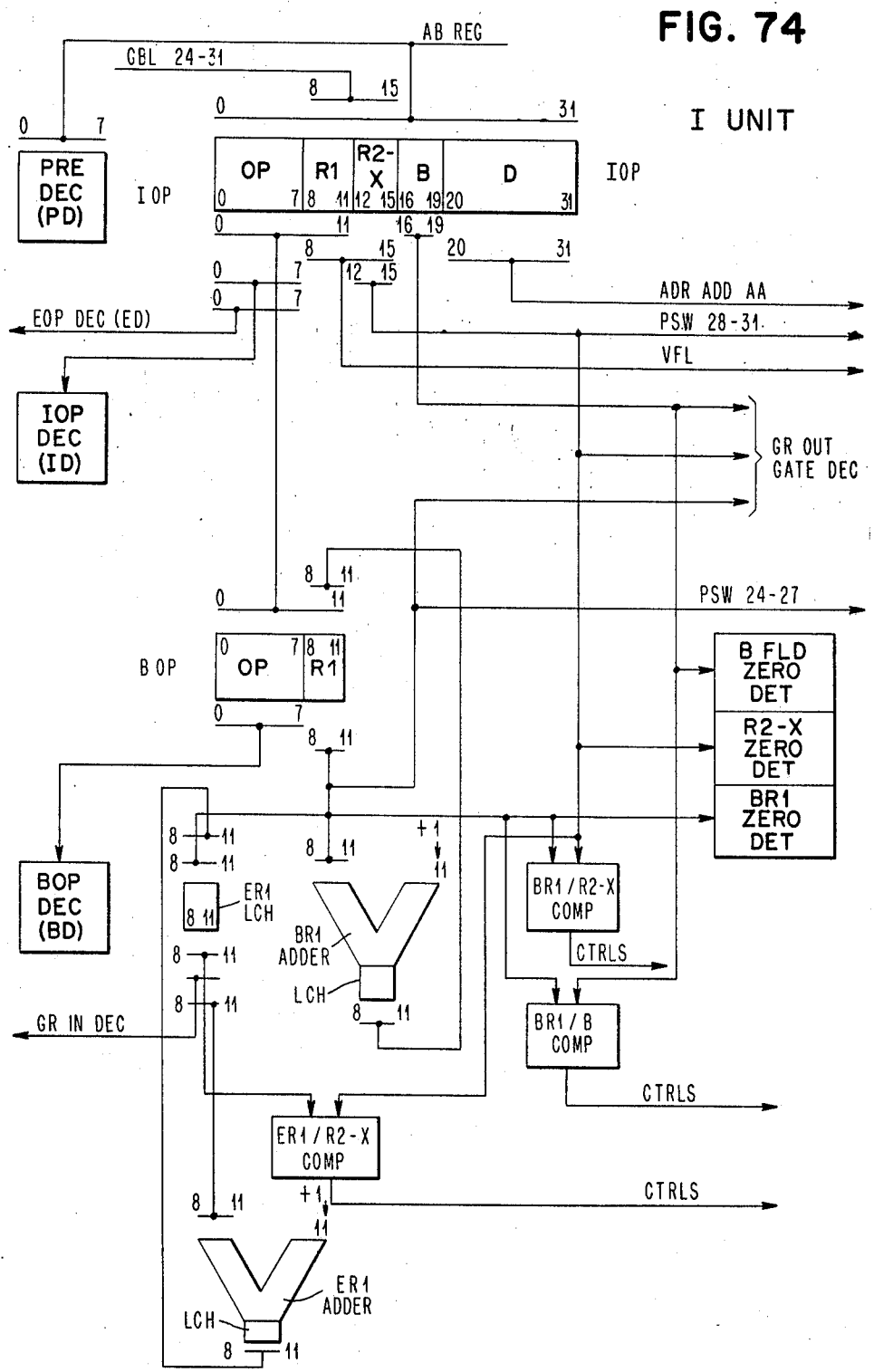

The 32 bits from the AB register are applied to the IOP register as shown in FIG. 74. This register includes an operation portion (OP), an R1 field, an R2–X field, a B field, and a D field. At the time an instruction (or a portion of an instruction) is loaded into the IOP register, preliminary information about the instruction is also being derived from the PRE DEC. The contents of the IOP register are transferred to various circuits which perform different functions in the handling of an instruction. The OP portion is applied to the IOP DEC (ID), where the operation portion is decoded for I unit use. The same portion is transferred along with the R1 portion to the BOP register; in turn, the OP portion of the BOP register is applied to the BOP DEC (BD), for backup operation decoding. It is the IOP and BOP decoders which perform a major portion of the operand and branch decoding in the system. Each of the fields R1, R2–X, and B are used to specify general purpose registers, the contents of which are involved in the execution of the instruction. The R1 field, however, is utilized from the BOP register rather than from the IOP register controlling selecting of the general registers. Each of these fields is also tested for zero in order to determine special situations where no general register is to be utilized in accordance with the architectural definition of a data processing system in said System /360 Manual. The B field of the IOP register is applied to the addressing adder (AA) as a component of a storage address for all instructions which reference storage, the addressing adder being shown in FIG. 79 of application Ser. No. 609,238 which the R1 portion of the BOP register also applies to an ER1 register which provides R1 information later in a cycle. The ER1 register is so called because it provides R1 information to the E cycle rather than to the I cycle.

In FIG. 74 various comparison circuits are shown which compare ER1 with R2–X, BR1 with R2–X, and BR1 with B. The purposes of the various comparisons are described in conjunction with the circuits which utilize them. The instruction decoding circuits are shown in detail in FIG. 76 et seq of application Ser. No. 609,238.

(9.1.4) INSTRUCTION UTILIZATION (FIG. 75)

In FIG. 75, a plurality of general purpose registers (GR) receive information from the K REG under control of the ER1 SEL GR IN lines. The output of a general register selected by one of the lines: IR2 SEL GR, IB SEL GR, BR1 SEL GR, BR1+1 SEL GR lines will be applied to the general bus left or general bus right (GBL, GBR) for application to the register bus latch (RBL) shown in FIG. 73, and to the address adder (AA). The general registers, the GBL and GBR, and the controls therefor are shown in FIG. 114 et seq. of application Ser. No. 609,238. Other inputs to the address adder include a VFL LGTH FLD (VFL length fields), the interrupt controls (IRPT CTRLS), and the IOP D field. The output of the address adder is applied to the SAR, and thence to the SAB (storage address bus) which applies address bits to storage. The address adder is also applied to the H register which serves as a sort of backup register for the SAR; addresses which are to be manipulated or compared are derived through the H register whereas utilization of address manifestations is through the SAR.

Also illustrated in FIG. 75 are the channel and unit selection circuits which respond to the H REG. Specifically, either the H REG or channel address signals from the console may be utilized to form a unit address on the UABO as well as channel selecting signals.

It should be borne in mind that FIG. 72 through FIG. 75 are intended as illustrative figures for reference, rather than being descriptive of the hardware as such. All of the hardware illustrated in RIG. 72 through FIG. 75 is illustrated, both in block diagram form, and in detail, in figures relating thereto, described hereinafter.

(10.0) INSTRUCTION SEQUENCING

(10.1) Introduction

Instruction execution in the system is performed in two parts: an I time and an E time. The timing for a typical RX instruction is shown in FIG. 248 (see said System/360 Manual for details of an RX instruction).

I time (instruction time) is further broken down into two parts to perform "instruction handling," which includes the generation of storage addresses, and the gating of operands to the execution units from the general registers (GR's) or from the floating point registers (FPR's). The first part of I time is defined by the control trigger T1. The second part is defined by another control trigger, T2. When the T1 and T2 cycles have been completed, the proper execution unit or units may be started. Both T1 and T2 may be repeated, as necessary, until the aforesaid functions are completed.

E time (execution time) is accomplished within different areas: the E unit, the IE Unit and the branch (BR) Unit. All instructions require the use of at least one execution unit, and some require the concurrent use of two execution units.

The following instructions use both the E unit and the IE Unit:

ISK;
SSM;
LM;
STM.

The following instructions require the BR unit as well as the E unit:

BALR (if R2≠0);
BCTR (if R2≠0);
BCT;
BAL;
BXH;
BXLE.

When an execution unit is started, the I time control triggers being their functions on the next instruction, overlapping the operation of the execution unit.

The T1 cycle is used to generate storage addresses when required. When this is completed, a logical control called TON T2 (turn on T2), which is developed from many conditions described in detail hereinafter, will initiate operand fetches from storage and set the T2 control trigger. During the T2 cycle, internal operands contained in either the general registers or floating point registers are gated to the execution unit. When the necessary conditions have been met, another logical control line called I TO E FER will cause the execution unit to start, unless an interruption has occurred.

While execution units are performing the actual functions of one instruction during a related E time, their "busy" state is recorded in control triggers located in the I unit. The last machine cycle for the E time conditions a turn off for a related busy trigger, IE BUSY, or E BUSY; THE BRANCH UNIT USES THE IE BUSY TRIGGER TO INDICATE THE BUSY STATUS OF THE BR UNIT. Since the I time for one instruction is allowed to overlap (occur simultaneously with) the execution of a previous instruction, interference which could occur for many instructions is avoided by generating various "blocks" which control the following instruction. Blocking can occur to either part (T1 or T2) of the overlapped I time, and may be removed at various points during the handling of a current instruction. It is advantageous to allow instruction handling to proceed to a point which just precedes causing interference with instruction execution. By providing two points at which blocking of the I time functions of the next instruction is employed, a variable degree of overlap is obtained, which provides versatility necessary for maximum instruction handling speeds.

(11.0) INSTRUCTION COUNTER CONTROLS (FIG. 72 THROUGH FIG. 75)

The incrementer and gate select circuits control the normal advancing of the instruction counter and the normal fetching of instructions.

Instructions fetched from storage are buffered in either the A or B register before being set into the IOP register for initial execution. (See FIG. 72 through FIG. 75.) the instruction counter register (ICR) contains 24 bits (numbered 0 through 23) and is advanced by means of two adders: the gate select adder for advancing the low order portion IC LO (bits 20–22) and the incrementer for advancing the instruction counter high order portion ICHO (the remaining bits). The gate select adder works in conjunction with the gate select register (GSR) to select gates from the A and B registers to the IOP register.

(11.1) Introduction

All instructions are executed in two parts: an I time and an E time. I time of one instruction may be overlapped with E time of the previous instruction. The instruction counter controls, while advancing the setting of the gate select register GSR, also maintain the ICR with a proper address for interrupt purposes.

The IC controls also generate the instruction fetch addresses and make normal IC fetches. The addresses are generated by adding, in the incrementer, an appropriate, small increment amount to the ICR. The IC controls attempt to make an IC fetch as soon as an empty instruction buffer (A or B REG) condition is detected, but any instruction in the process of execution may block out IC fetches if an IC fetch would cause interference with the instruction execution. If the IC fetches are continuously blocked by instruction executions, the I unit ultimately will exhaust all instructions in the buffers. At this time, the IC block will drop, allowing IC fetches to be made and instruction execution to resume. Normally the instruction buffers will not be exhausted before IC fetches are made. However, special logic has been incorporated to insure that, except in unique situations, both buffers are not emptied. In other words, fetches relating to executions take priority over instructions fetches until the A and B registers no longer have a full instruction left; then, one instruction fetch is allowed notwithstanding the need for operands.

First there is a physical description of the IC data flow. IC addressing, advancing, fetching and recoveries are discussed, in that order.

(12.0) BRANCHING

(12.1) Branch operations

(12.1.1) INTRODUCTION TO BRANCH CONTROLS

In this system, branch fetches (i.e., fetches of instructions which are themselves the subjects of branch instructions) are made at TON T2 in the same way as are operand fetches. For branch fetches, however, return addresses are generated for both the J register and the A register or the B register, whichever is appropriate to the branch-to address: if bit 20 of the address is zero, the fetch is returned to A; if bit 20 of the address is one, the fetch is returned to B.

Since two instruction buffers register (A, B) are provided branch instructions also initate a fetch to fill the second buffer. This fetch, which is obtained from the storage location following the location of the subject instruction, is called the branch-plus-1 (BR+1) fetch. The address for this fetch is computed during T2 of the branch instruction. The BR+1 fetch request is normally made at the I to E transfer. A return address for this fetch is generated for the register of the AB buffers opposite to the register designated for the branch fetch.

At some predetermined time of the branch execution a tests complete (TSTS CMPLT) latch is turned on. During this cycle a branch successful (BR SUCC M) line attains a value according to whether or not the branch was successful.

If the branch operand returns before TSTS CMPLT of any branch, the operand is inhibited from gating into the AB register; but in any case, the branch operand is returned to the J REG. If a successful branch is detected during TSTS CMPLT, and the branch operand has already been loaded into the J REG, the branch operand is gated into the appripriate half of the AB reg- of the AB register by TSTS CMPLT. If the branch operand returns after TSTS CMPLT has been turned on, the returning operand is gated into the proper register of the AB buffers if, and only if, the branch is successful; if not, the operand is put to no use whatever.

The branch+1 fetch is always made at a time late enough so that the operand returns *after* TSTS CMPLT has been turned on. If the branch is successful, the BR+1 operand is gated into the appropriate half of the AB register upon its return. If the branch is unsuccessful the BR+1 operand is blocked upon its return, and in fact is put to no use whatever.

If a branch is unsuccessful, normal processing of the next instruction effectively starts at the same time as TSTS CMPLT is turned on. If a branch is successful, the subject instruction effectively starts as soon as the instruction is available in the AB register. During TSTS CMPLT of *successful* branches, the gate select register is updated to the subject address, and the ICR is then set on the cycle following TSTS CMPLT.

The following sections contain detailed discussion of the branch fetch, the branch-plus-1 fetch and the methods of terminating successful and unsuccessful branches. Certain features unique to each branch are also discussed when these features have an impact on the aspects of branching which are being discussed.

For the three RR format branches {Branch on Condition (BCR), Branch and Link (BALR), and Branch on Count (BCTR) no branch is ever made if the R2 field is zero. If the R2 field is zero in a BCTR instruction, the E unit is utilized to decrement the contents of the general register specified by R1. If the R2 field is zero in a BALR instruction, the E Unit is utilized to store the right half of the PSW in general register R1. If the R2 field is zero in a BCR instruction, the IE unit is utilized to perform a NO OP. In all of these, the branch unit is *not* started and no branch fetches are made. Therefore, these instructions are not considered to be branches when R2=0, in the following sections.

The Execute instruction (XEQ) is processed by branch controls and, therefore, is included whenever a general reference to "branches" is made.

(13.0) I UNIT EXECUTION

I unit execution comprises the performance of actual data manipulation within the I unit (rather than within the E unit). The functions executed within the I unit are primarily channel instructions and supervisory type instructions such as setting the program and the system mask, loading the PSW, setting or inserting keys, and diagnose. In addition, the IE unit cooperates with the E unit on the performance of multiple load and store operations. The IE unit comprises essentially a control section (FIG. 277 et seq. of application Ser. No. 609,238) and a channel communications section (FIG. 308b et seq. of application Ser. No. 609,238).

(14.0) INTERRUPTIONS

(14.1) Interruption handling

The sections hereunder describe the response of the system to both internally and externally generated interruption signals.

Interruptions are first defined in general terms; then the individual signals are further defined, classified, and assigned servicing priorities consistent with basic architectural criteria set forth in said System/360 Manual and the implementation plan of the present embodiment. The detection of interruptions and the means by which interruption processing is initiated are examined next, followed by detailed descriptions of the specific sequences associated with each type of interruption. Actual circuits are described in sections hereunder.

(15.0) VARIABLE FIELD LENGTH DATA FLOW

(15.1) Brief description of VFL data flow (FIG. 373)

The variable field length portion of said environmental system is designed as a semi-independent unit, which is part of the execution unit, but is designated herein as "VFL," whereas the binary portion of the E unit is designated herein as "E unit," as well as the term "E unit" meaning both the binary and VFL portions. The VFL portion is concerned primarily with SS format instructions, which include primarily data handling, logical operations, and decimal arithmetic.

The data input to the VFL data flow is from the K and L registers in the E unit, which are used as temporary storage buffer registers for complete 64-bit storage words. Source operands for VFL are fetched from main storage through the J register to the K REG or L REG. The K REG is used for operand No. 1 and the L REG is used for operand No. 2. Results of an operation are placed in the K REG, and at proper times, as determined by rules of storage accessing, those bytes of the K REG which were changed as a result of the operations are returned to storage.

There are several main data paths in the VFL data flow. Normal operands are supplied by the K REG or L REG and are gated through the left byte gate (LBG) or the right byte gate (RBG). From the LBG/RBG, operands can be supplied to the main adder, to the "AND, OR, EXCLUSIVE OR (mask)," which is referred to herein as the AOE. In addition, operands which pass through the LBG may be supplied to the digit buffer-digit counter (DB/DC) as well as to the VFL TO AA & PSW gate.

Another input to the VFL data flow is through the direct data and outkey ingate, which controls the application of a byte of data from an external, non-conforming unit (see said System/360 Manual) or from the outkeys circuit of the BCU, which supplies storage protection keys derived from the storage unit. As is seen in FIG. 373, the DB/DC, the AOE, and the DA may each supply results to the K BUS GATE for application over the K BUS back to the K register in the E unit. In addition, the DB/DC may receive results from the DA, may receive results with the digits reversed in position from the AOE, and the digit buffer portion (DB) may receive outputs from the digit counter portion (DC) of the DB/DC.

Another data path is from main storage to the J and K registers, through the LBG, to the direct data register (DD REG). This data is kept available until the next time it is loaded as the result of a write direct instruction. A non-conforming external unit can make whatever use it wishes of the byte data which is stored therein.

Byte selection from among the eight bytes of a 64-bit storage word is accomplished under control of the S and T pointers. The S pointer output selects a correct byte from the RBG, and the T pointer selects a correct byte from the LGB. In addition, the output of the T latch is utilized to control gating of the result byte back into the K register; it is to be noticed that this is an unincremented amount so that it would be specifying, for instance, byte 3 while the output of the T register (which, when decoded, is called T PTR) would be selecting byte No. 4 in the LBG.

Still another data path shown in the data flow of the VFL portion is from IOP through the Y and Z registers, to the AOE and to the VFL TO AA & PSW gate.

Other data flow paths and main controls for VFL data flow are apparent in FIG. 373.

(16.0) VARIABLE FIELD LENGTH CONTROLS

The details of the VFL controls are described in section 16.0 of the case relating to said environmental system which is identified in section 2.0 herein.

(17.0) Variable field length operations

The details of the VFL operations are described in section 16.0 of the case relating to said environmental system which is identified in section 2.0 herein.

(18.0) BINARY DATA FLOW (E UNIT)

Figure 535:
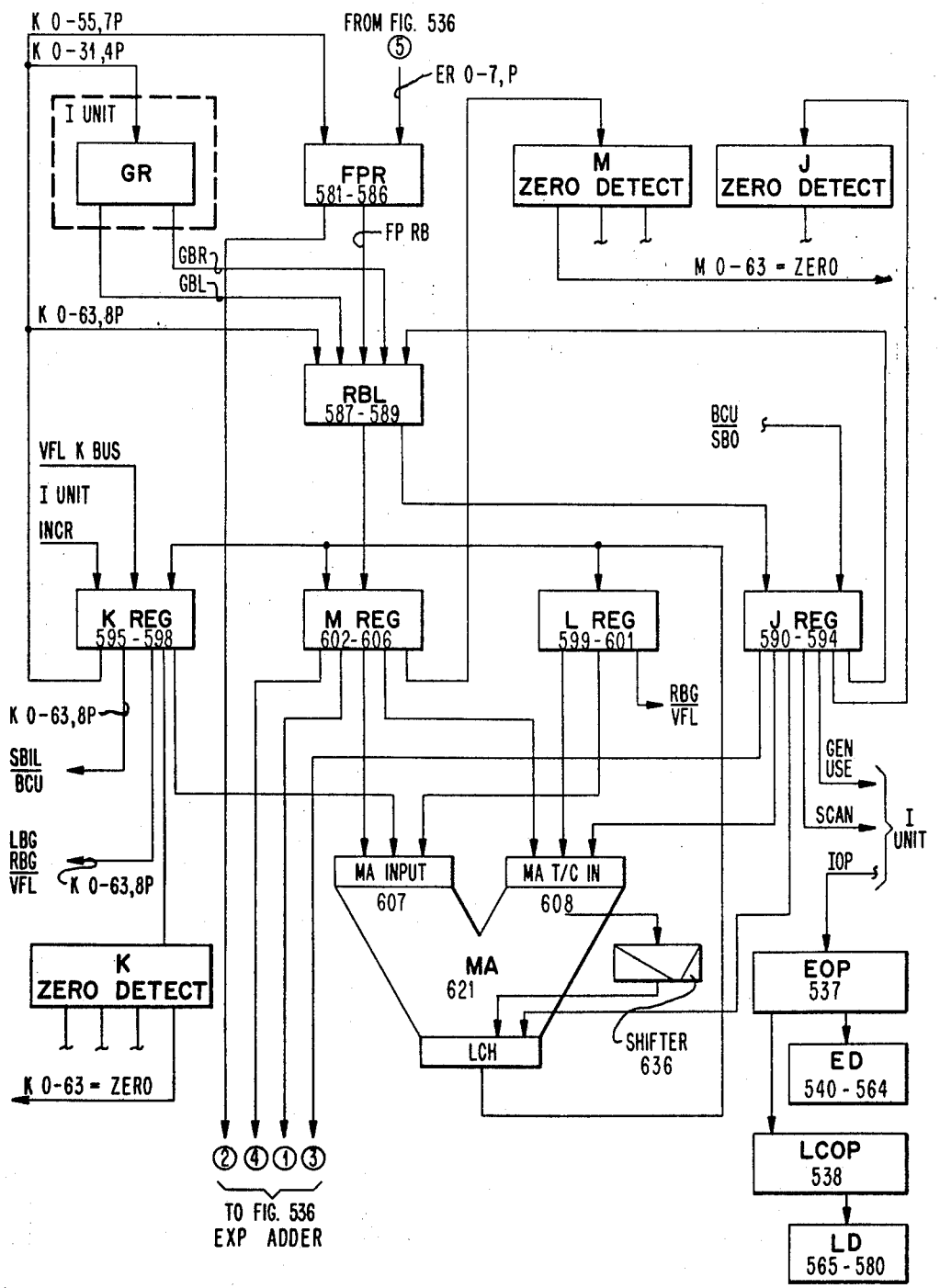
Figure 536:
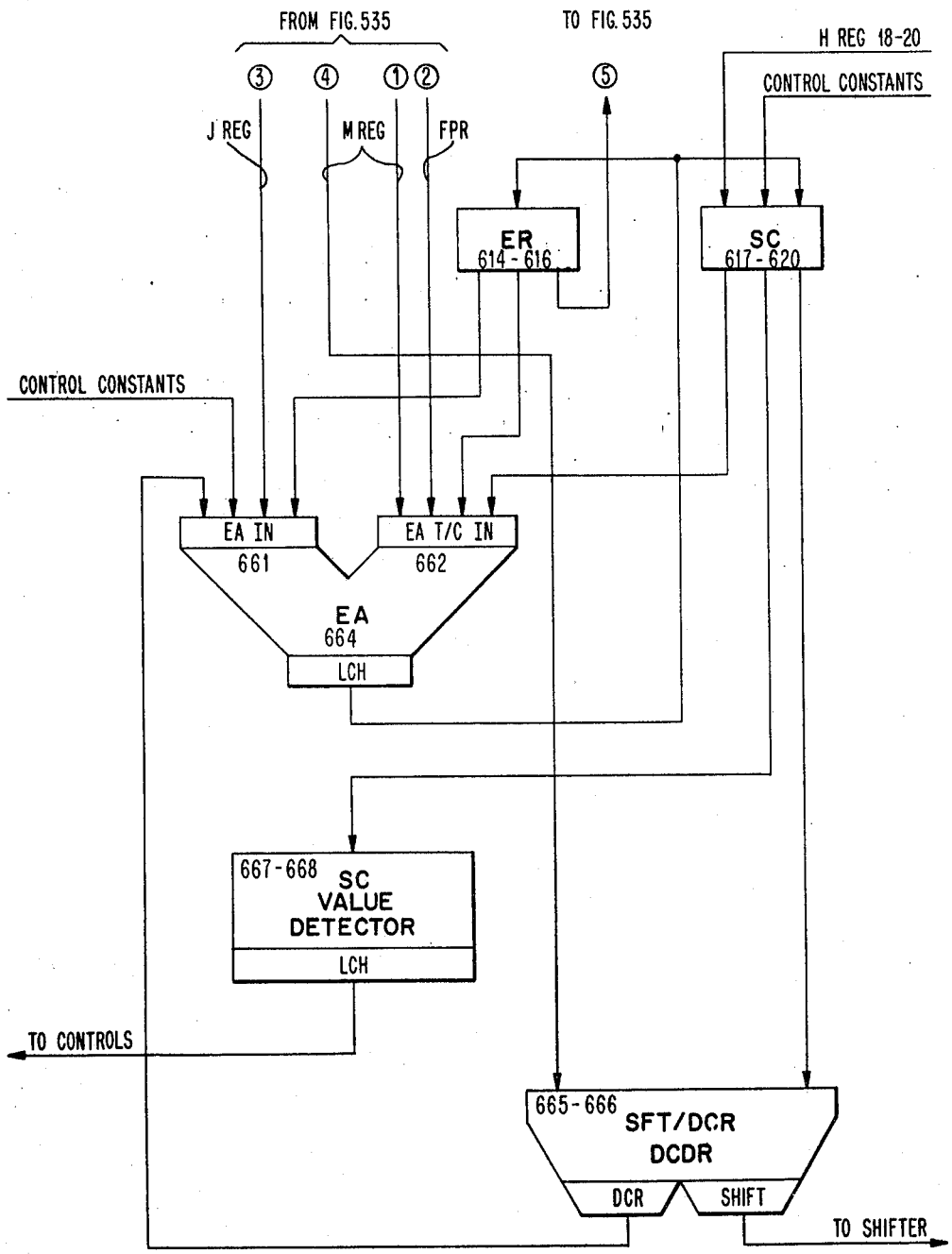

(18.1) Introduction to E unit data flow (FIG. 535 and FIG. 536)

In FIG. 535, the basic layout of the E unit data flow is shown. The basic input to the E unit is from storage, via the SBO which is located within the BCU to the J register. The J register can feed the main adder to complement input, can feed the main adder latch directly, send signals to the I unit, and also feed the RBL. The main data path in the binary portion of the E unit is through the main adder and via its output bus (AMOB) to the K, M and L registers. The M register is utilized as a main buffering register within the E unit. The L register and K register are used as source and result registers for VFL operations, as well as the J register being a primary source register for storage.

The main adder includes a shifter which, as illustrated in FIG. 535, provides bits to the main adder output latch in dependence upon bits derived from the first-level circuitry in the main adder itself.

As illustrated in the lower right of FIG. 535, the IOP register in the I unit provides an input to the EOP register which in turn provides inputs to the E decode circuit (ED) and to the last cycle operation (LCOP). The output of the LCOP is decoded in the L decode circuit (LD).

Outputs 1 through 4 at the bottom of FIG. 535 apply to the exponent adder, which is shown in data flow fashion in FIG. 536. The data flow, as illustrated in FIG. 536, includes an exponent register (ER), a shift counter (SC), a shifter decrementer decoder (SFT/DCR DCDR). A VALUE DETECTOR FOR THE SHIFT COUNTER IS ALSO PROVIDED AT THE OUTPUT TO THE SHIFT COUNTER. The exponent adder has two inputs, which can be provided from the exponent register, from the M, J, and floating point registers (FIG. 535) from the shift counter, from the SFT/DCR DCDR, and from control circuits.

(18.2) E unit operation decoders (18.2.1) EOP REGISTER (FIG. 537)

In FIG. 537, the EOP register comprises a pair of latches 1, 2 which can be set in response to control signals generated elsewhere herein jointly with corresponding bits of the IOP register in the E unit.

(18.2.2) LCOP REGISTER (FIG. 538)

In FIG. 538, the LCOP register responds to the EOP register in the same fashion as the EOP register responds to the IOP register.

In FIG. 539, a parity check is performed on the LCOP register by an EXCLUSIVE OR complex which can set a LCOP P CHK latch, the latch being reset by CHK RST.

(18.2.3) E DECODE CIRCUITS

The E decode circuits are shown in FIG. 540 through FIG. 564. These circuits comprise various combinations of AND and OR circuits so as to generate not only instructions as such, but various combinations of operational bits which permit utilizing E decode output lines as specialized gating circuits to encompass groups of instructions which bear some relationship. The nomenclature of the output is straightforward in general, the outputs being indicative of the particular combination which the signal line name represents. For instance, in FIG. 559, a line designating fixed point AND or OR or EXCLUSIVE OR operations is generated. The input to the OR circuits which generates this line comes from other E decode circuits elsewhere herein. An asterisk (*) is utilized to indicate that any possible combination can take place at the point of the asterisk with respect to a decoded value for the particular line. For instance, in FIG. 555, a line called RX4* is generated. This means that all RX instructions which include in the code thereof a 4 as the first digit of the code, and include any value from 0 through 9, and A through F as the second digit of the code, are to be included within the meaning of that line. In terms of the chart shown in section 9.2.4.2 of said environmental system, this means that all RR instructions which have a code of 40, 41, 4A, et cetera would be included.

Since the E decode circuits are obvious, no detail in the description thereof will follow. In certain instances, a particular configuration of E decode or L decode outputs may be utilized, and this configuration may not be shown directly in the circuits of FIGS. 540–564, or in the L decode circuits of FIGS. 565–580, but these configurations could be supplied in a manner similar to the manner in which those configurations which are shown are supplied. In other cases, a particular configuration may be generated more than once, which illustrates the possibility of powering decode lines by multiple generation thereof.

(18.2.4) L DECODE CIRCUITS

The L decode circuits shown in FIGS. 565–580 are similar to the E decode circuits described in the last section. In other words, various combinations of particular outputs and "don't care" outputs (indicated by an asterisk)

are provided. These are utilized throughout various parts of the E unit for generating further control lines.

(18.3) Floating point registers (FIGS. 581–586)

In FIG. 581, the release controls for the floating point registers are shown. These permit changing the setting of the floating point register when the signals are present.

In FIG. 582, the circuit which responds to the SET FR2 signal from the I unit causes gating of the floating point register to transfer from response to BR1 to response to IR2.

In FIG. 583, the actual registers are shown. As illustrated, the floating point registers are responsive to the K register and to the exponent register.

In FIG. 584, controls for selecting which floating point register will provide an output are shown.

In FIG. 585, the floating point register output gate is shown. This feeds a floating point register bus as shown in FIG. 586.

(18.4) Register bus latch (FIG. 587–FIG. 589)

The register bus latch provides a buffer for general bus outputs and for floating point register bus outputs. In FIG. 587, the gating of the RBL is shown generally; this is shown in detail in FIG. 588 and FIG. 589. The register bus latch is a simple latching circuit which is enabled by the appearance of the NOT LC signal as shown in FIG. 587; therefore, the latch is not shown in greater detail.

(18.5) J Register

The J register is the input register from the storage via the SBO. It also has other inputs as illustrated by the J register gate circuit of FIG. 590. The input to the J register is shown in detail in FIG. 591 and FIG. 592. Release lines which permit changing of the contents of the J register are illustrated in FIG. 593, and the J register itself is shown in detail in FIG. 594.

(18.6) K register (FIGS. 595 through FIG. 598)

The input gating to the K register is shown briefly in FIG. 595 and in greater detail in FIG. 596. Circuits for generating unlatched lines that permit changing the contents of the K register are illustrated in FIG. 597, and the K register itself is shown in FIG. 598.

(18.7) L register (FIG. 599 through FIG. 601)

The L register input gates are shown generally in FIG. 599, the release circuits therefore in FIG. 600, and L register details are shown in FIG. 601.

(18.8) M register (FIG. 602 through FIG. 606)

The M register gating is shown in FIG. 602, and the M register input is shown in detail in FIGS. 603 and 604. Release lines for the M register are generated in FIG. 605, and the M register itself is shown in detail in FIG. 606.

(18.9) Exponent register (FIG. 614 through FIG. 616)

Exponent register gates are shown in FIG. 614, the release line therefor in FIG. 615, and a brief illustration of the exponent register is shown in FIG. 616.

(18.10) Shift counter (FIG. 617 through FIG. 620)

The shift counter input gates are shown generally in FIG. 617, and in detail in FIG. 620. The release lines of the shift counter are shown in FIG. 618, and the shift counter register itself is shown in FIG. 619.

(18.11) FIGS. 607–613 and FIGS. 621–658

(18.11.1) MAIN ADDER INPUT CIRCUITS

(18.11.1.1) MA input gates (FIG. 607)

The left-hand input to the main adder is called "MA INPUT," whereas the right-hand input to the main adder is called "MA T/C IN." The MA input is shown in FIG. 607. Therein, the output of the various registers that can feed the left-hand side of the adder are illustrated as providing bits to particular gates at the input of the adder (from the center of FIG. 607 down) the condition under which the gate will be opened to the main adder being indicated by the gating lines drawn at the extreme left of FIG. 607. The main adder input would comprise a large OR circuit together with a plurality of AND circuits, one for each of the particular gates, much as in the same fashion as is illustrated, for instance, with respect to the K register in FIGS. 595 and 596. No further detail for this circuit is therefore shown.

(18.11.1.2) MA T/C in gates (FIG. 608)

A circuit similar to FIG. 607 is illustrated in FIG. 608, and represents the input to the right-hand half of the main adder. The various registers are gated to the main adder whenever signals appear on the lines illustrated to the left of each of the gating lines by lettering at the left-hand side of FIG. 608. No further detail of this circuit is shown.

(18.11.1.3) Standard main adder gating triggers (FIGS. 609 and 610)

At the top of FIG. 609, a standard main adder gating trigger is shown. This is a trigger which may have one or two set inputs, one or two enable inputs, each of the enable inputs being valid only when there is an accompanying condition input. In the remainder of FIG. 609 and FIG. 610, either one, two, three or four inputs are shown in dependence upon whether one set input, one set one enable and one condition, or other combinations are utilized. The set inputs are so marked, the enable inputs are so marked, and any other input is a condition input. All of the circuits 1 in FIG. 609 and FIG. 610 represent standard gating triggers shown at the top of FIG. 609 with as many inputs thereto as are required, said inputs being indicated.

(18.11.1.4) CVB compacter (FIG. 611 and FIG. 612)

In FIG. 607, the CVB compacter is shown to receive inputs from bits 0 to 4 of the K register and to provide inputs to bits 61–63 of the main adder together with bits to the main adder to complement an input. The bit to the main adder through complement input is applied to bit 63 thereof, and an additional bit is provided to generate a "Hot 1" into the low order of the main adder. The general purpose of the CVB compacter is to convert a four bit input to the main adder into a three bit input to one part of the main adder together with one bit to the other input to the main adder and a carry. This is illustrated more clearly in FIG. 612. Whenever the CVB compacter is to be utilized, bits through bit 60 are supplied by the L register, leaving only bits 61–63 left for use as an input from the K register; since this is only three bits, the input cannot be applied directly to the main adder and the compacter must be used. The operation of the compacter is basically to convert four inputs (decimal 8 or greater) into three inputs (decimal 7) at the MA input, together with a single bit at the MA T/C IN which when added to the decimal 7 value will cause a result of 8, and if a carry is also forced at the main adder, this can cause a decimal 9. Thus, whenever bit 0 of the K register is a 1, decimal 7 is forced into the MA input by forcing bits 61–63 thereof to 1's and a 1 is added to this result by forcing bit 63 of the MA T/C input to 1. In fact, the odd and evenness of the values applied to the MA input are not accounted for by bit 63, but are rather accounted for by the Hot 1 which is applied to the main adder. This means that oddness and evenness has absolutely no parity effect with the single exception of the case where a 2 bit and a 4 bit appear with no other bits thereby causing the MA input to be odd. In this case, a parity correction factor is applied to account for the oddness of the total input thereto. This parity correction takes place only for decimal 2 and decimal 4, all other inputs comprising a combination of bits such that the total number supplied to the main adder and MA T/C inputs is an even number in all cases; only the Hot 1 input varies from even to odd. The CVB compacter is used in the convert to binary instruction only.

(18.11.1.5) CVD corrector (FIG. 613)

In FIG. 607, the output of the L register is passed through a CVD CORRECTOR for application to the main adder input. As illustrated briefly in FIG. 613, this corrector is merely an ordinary excess 6 correction circuit of a well-known type. This permits converting binary values to decimal values as is well known in the art.

(18.11.2) MAIN ADDER CIRCUITS (FIG. 621)

Figure 621:
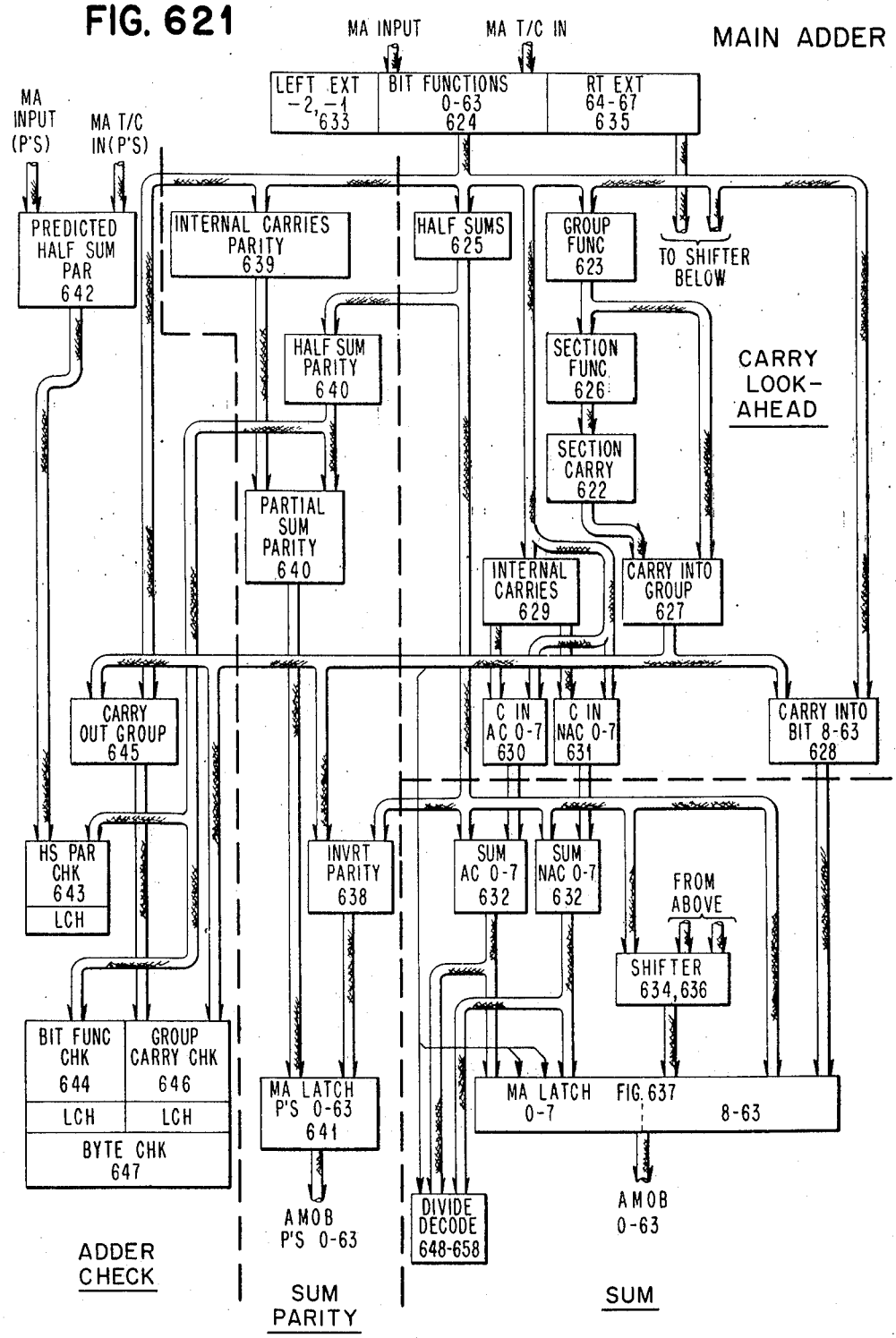
Figure 622:
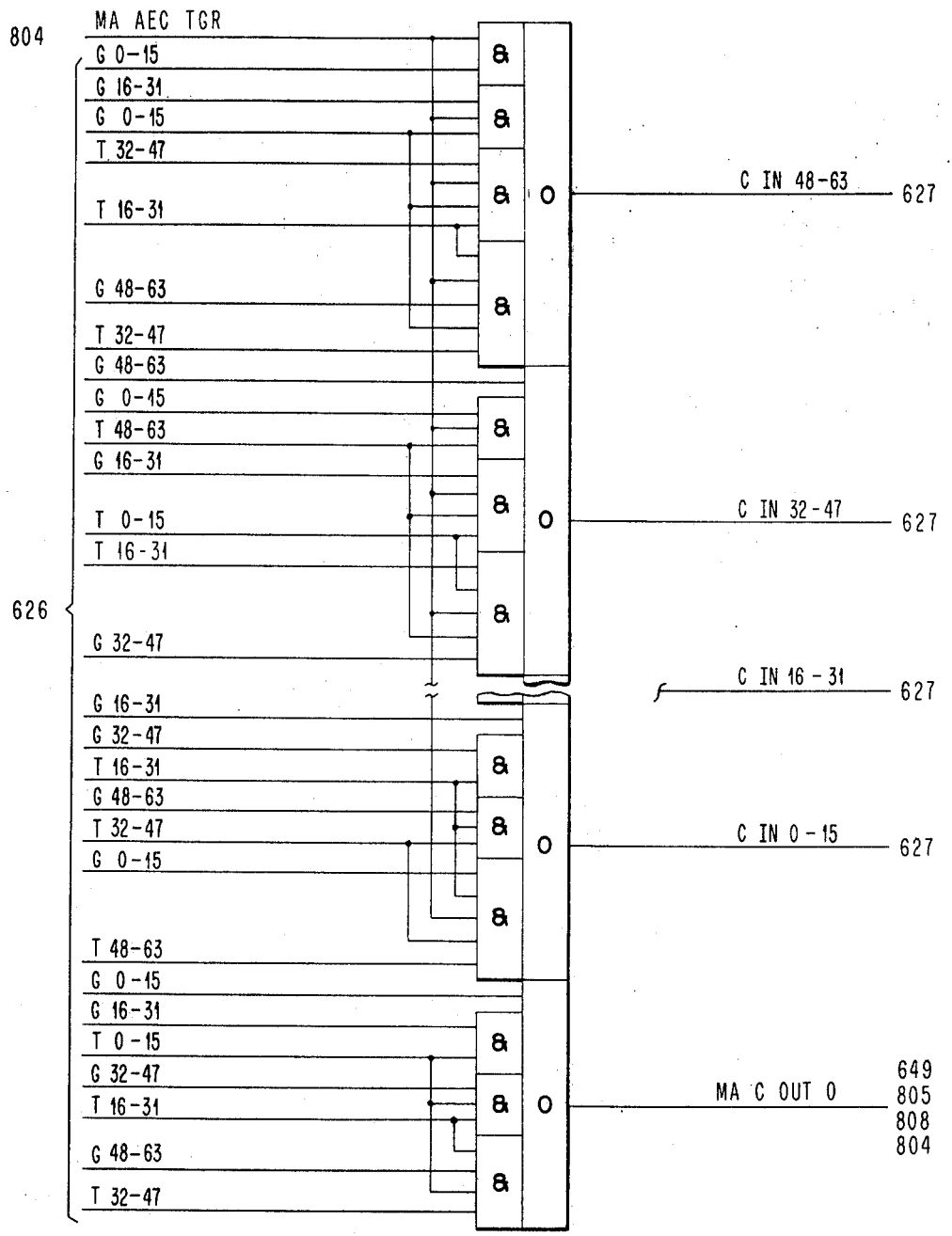
Figure 623:
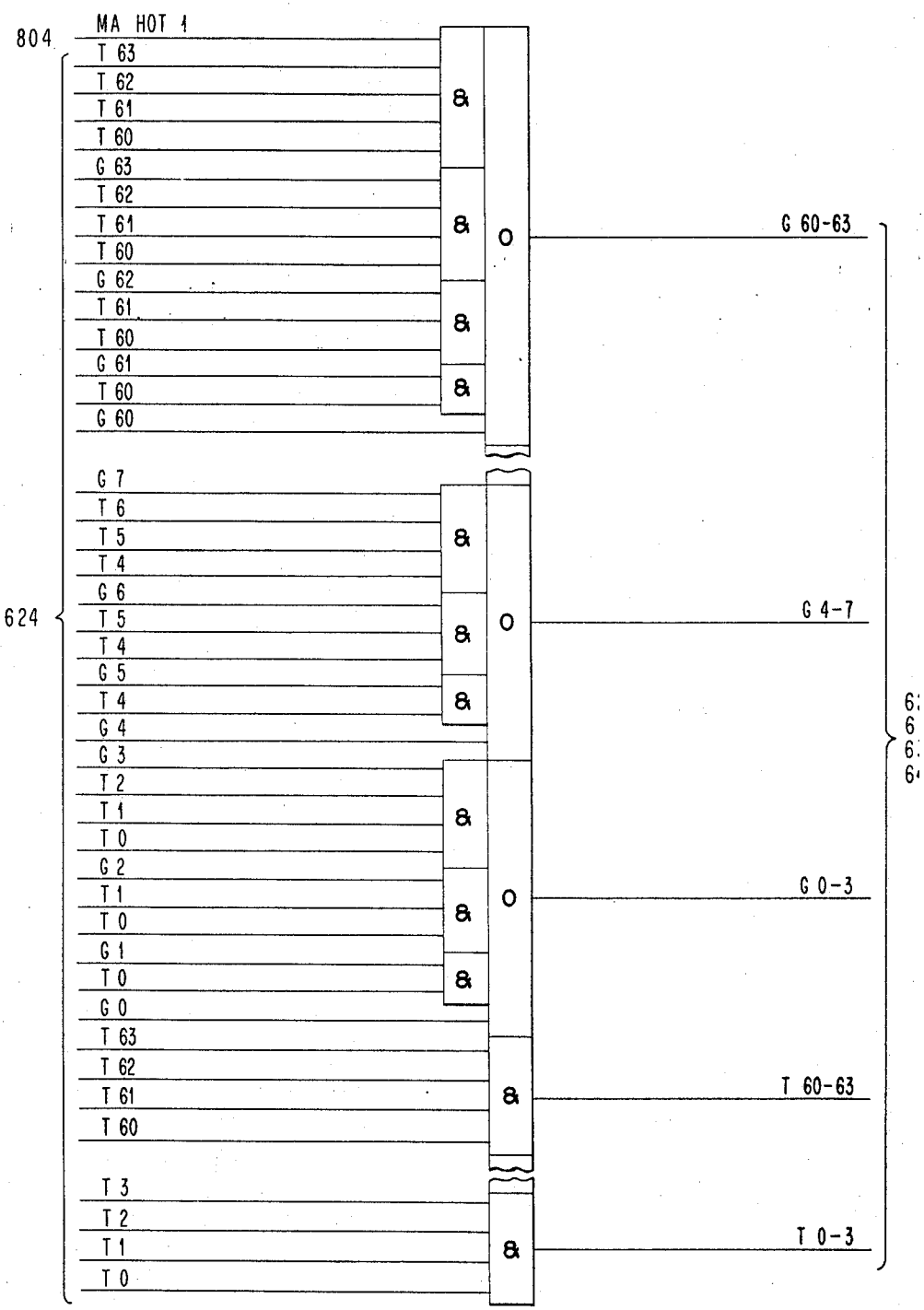
Figure 624:
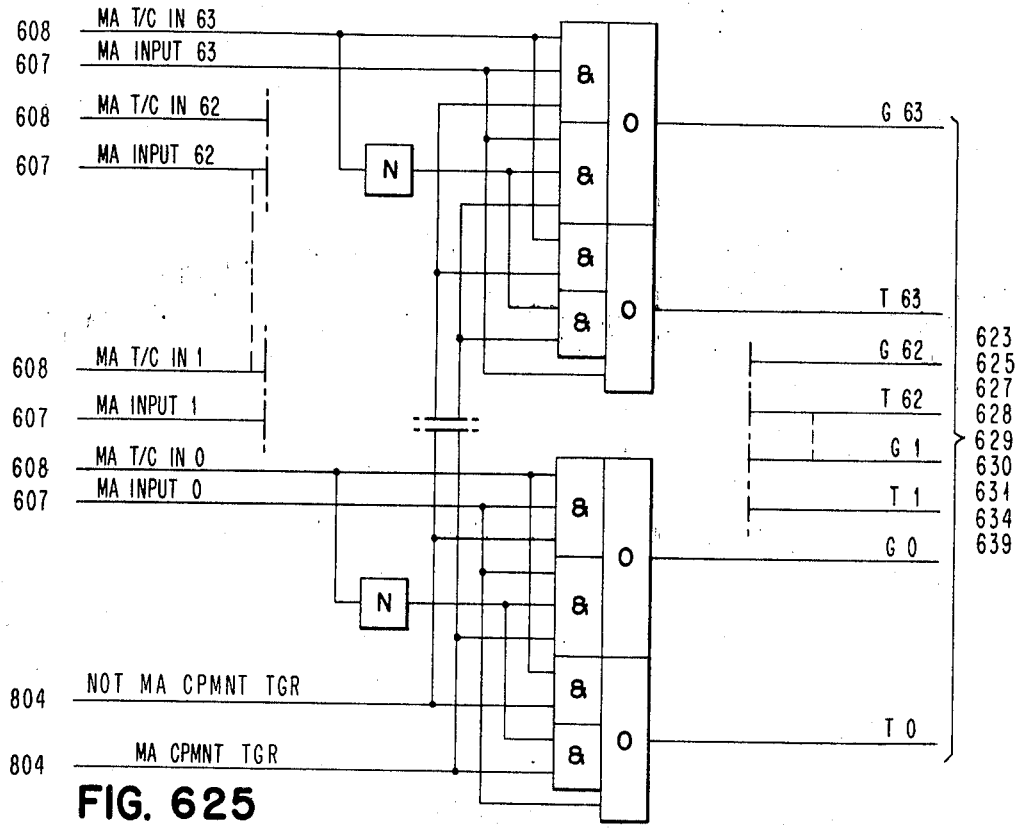
Figure 625:
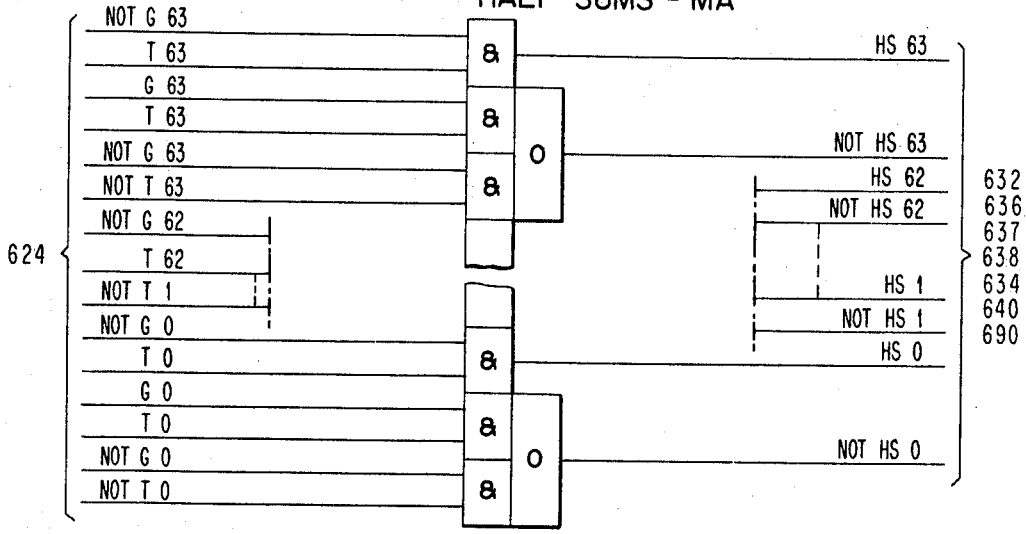
Figure 626:
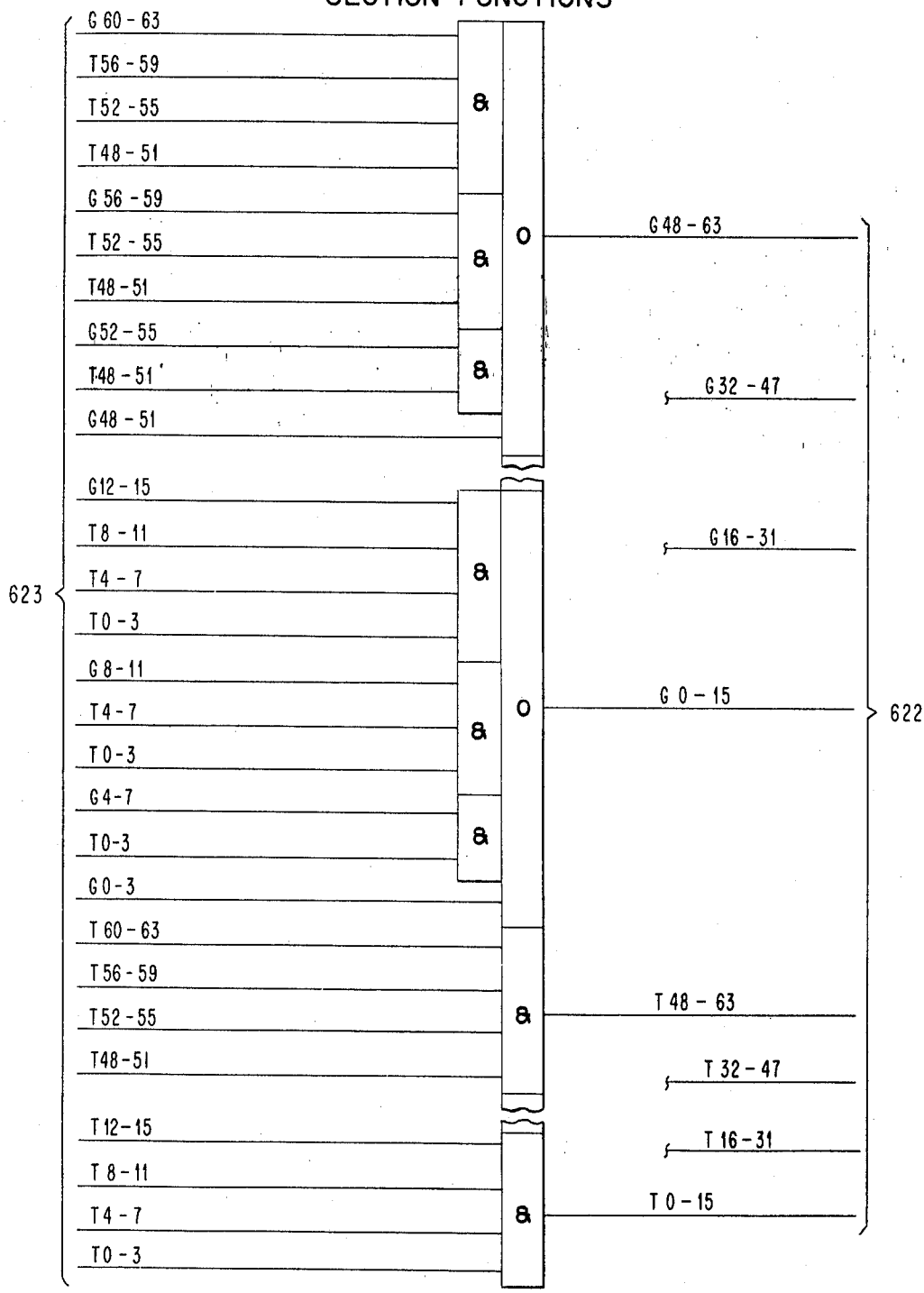
Figure 627:
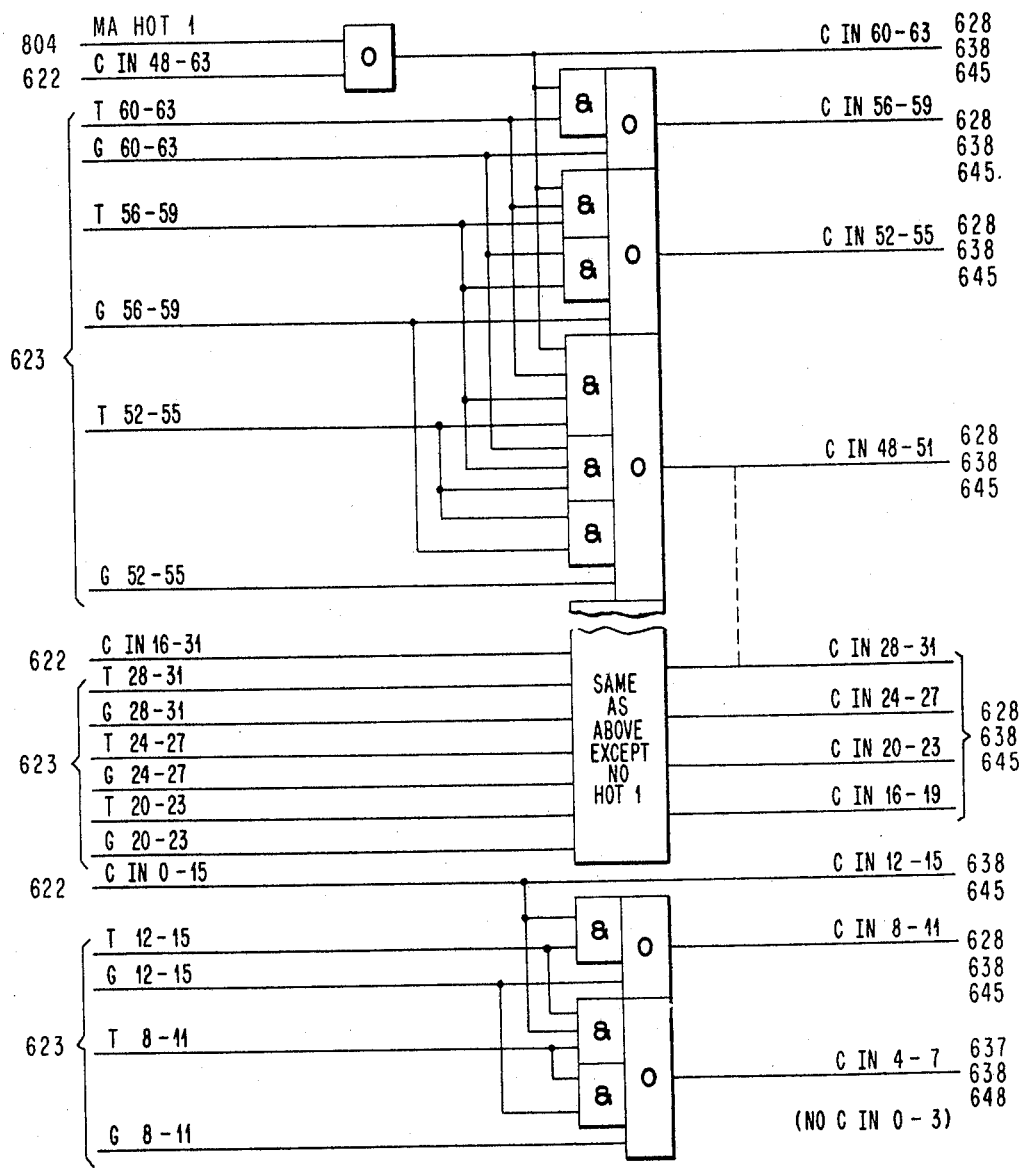
Figure 629:
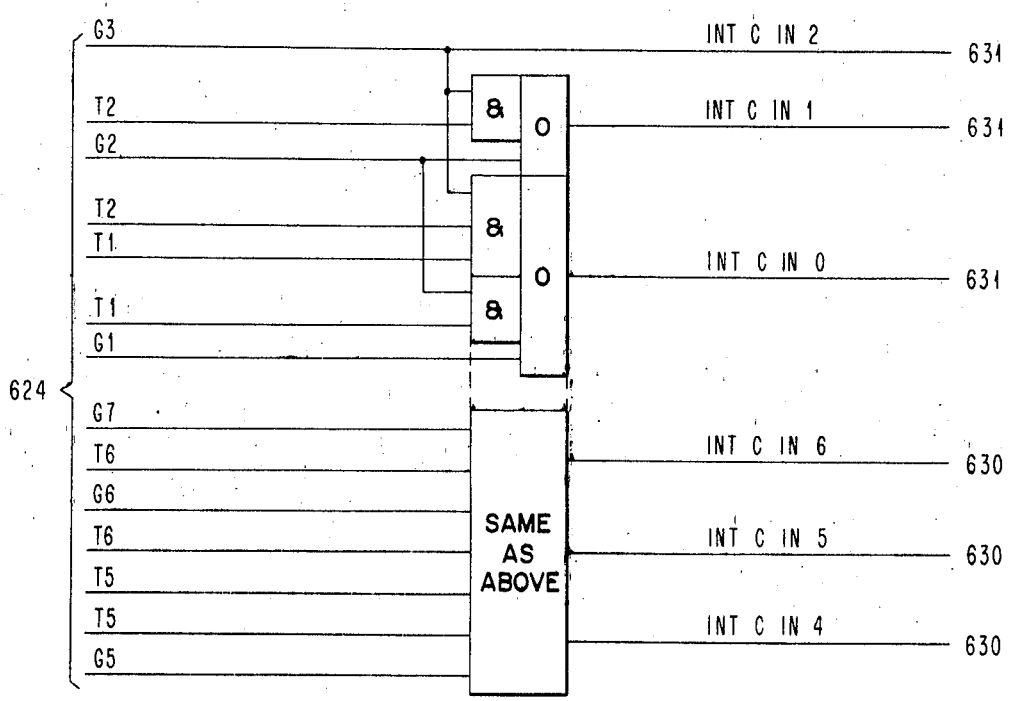
Figure 630:
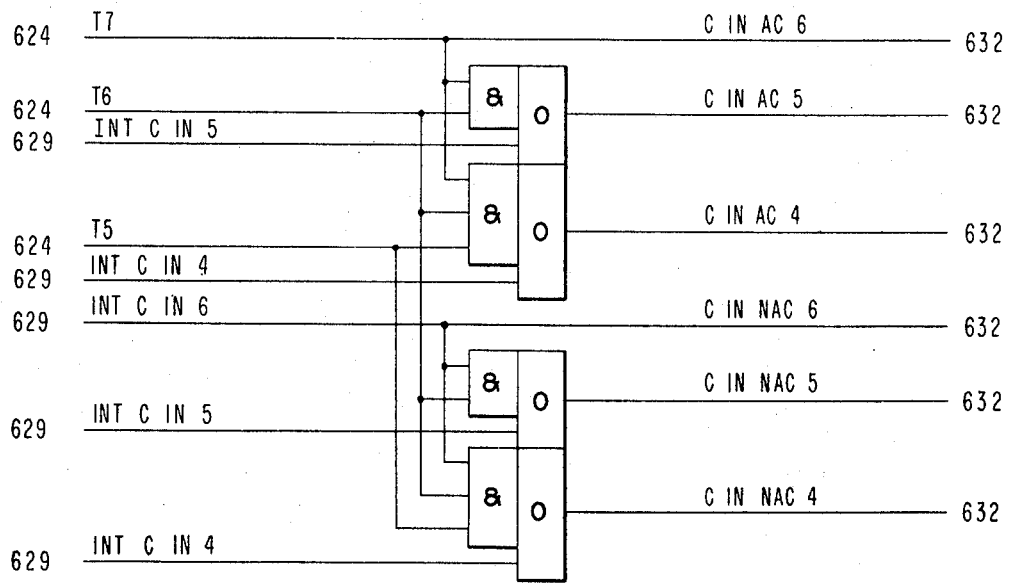
Figure 631:
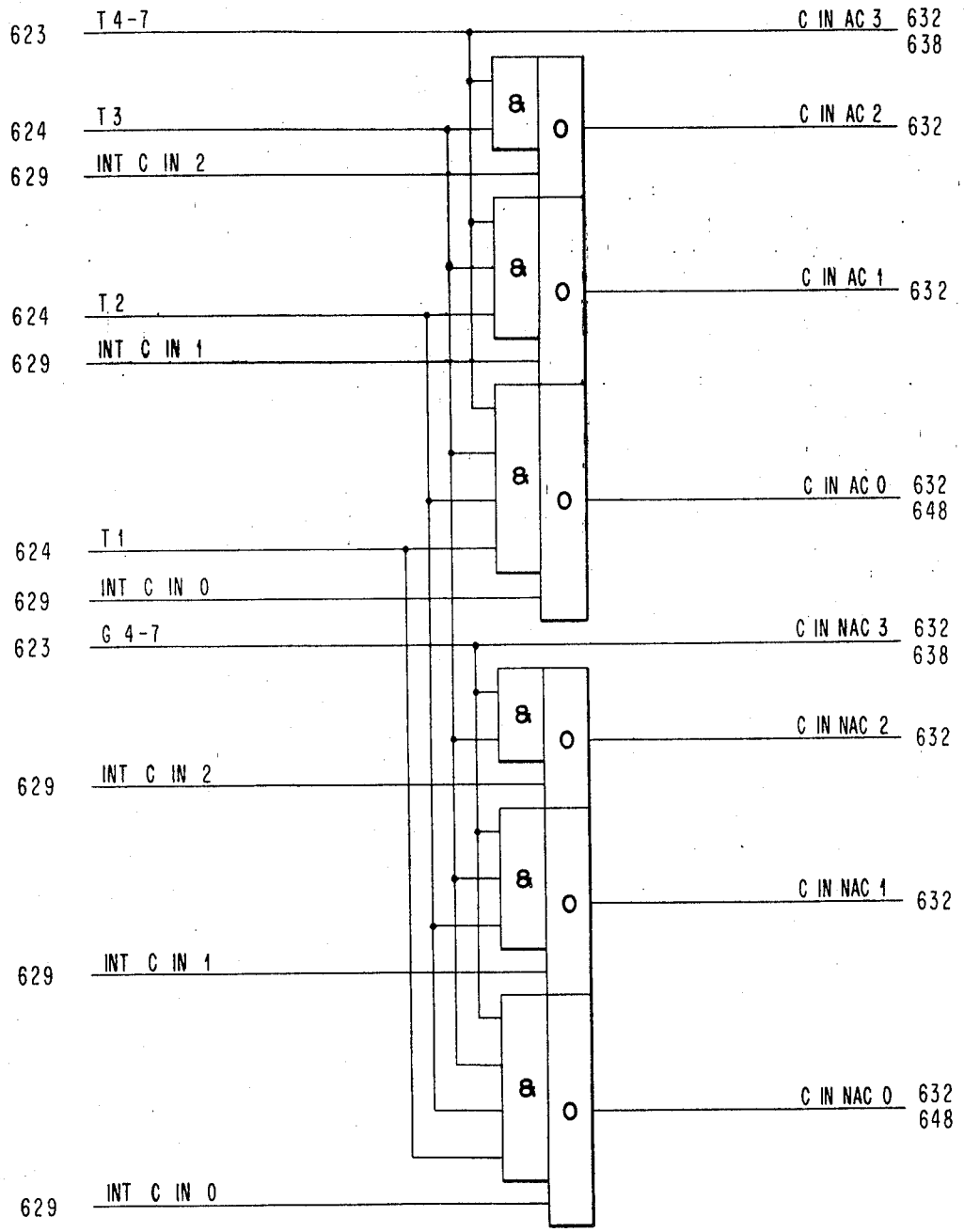
Figure 632:
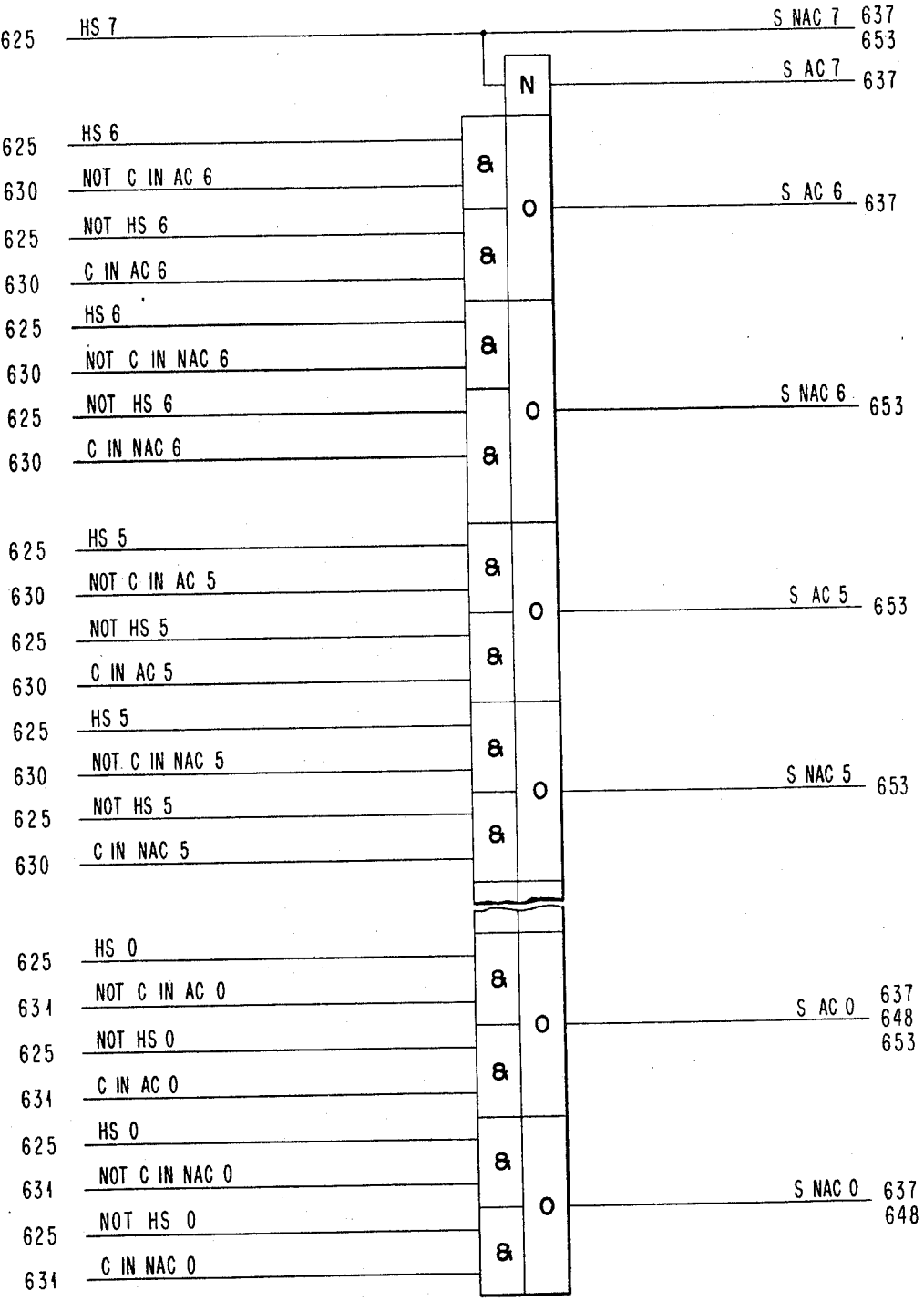
Figure 633:
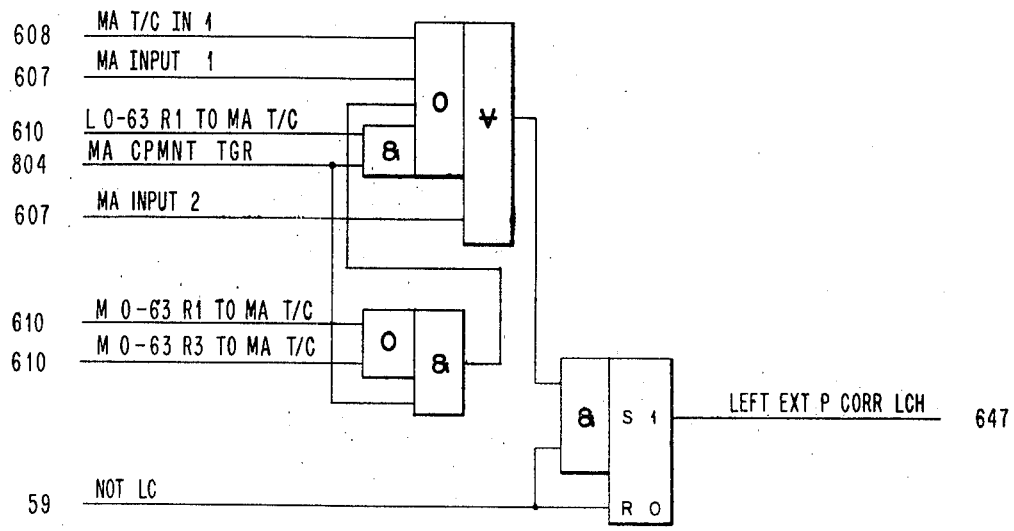
Figure 634:
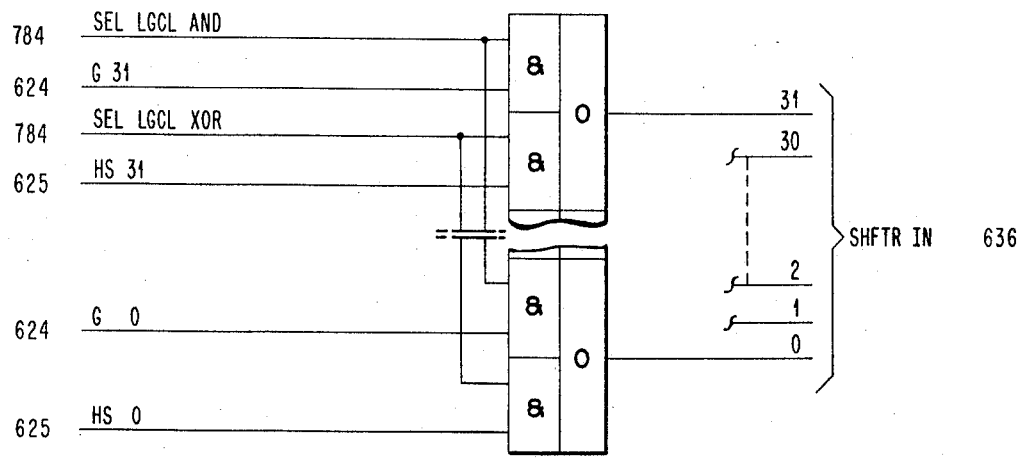
Figure 635:
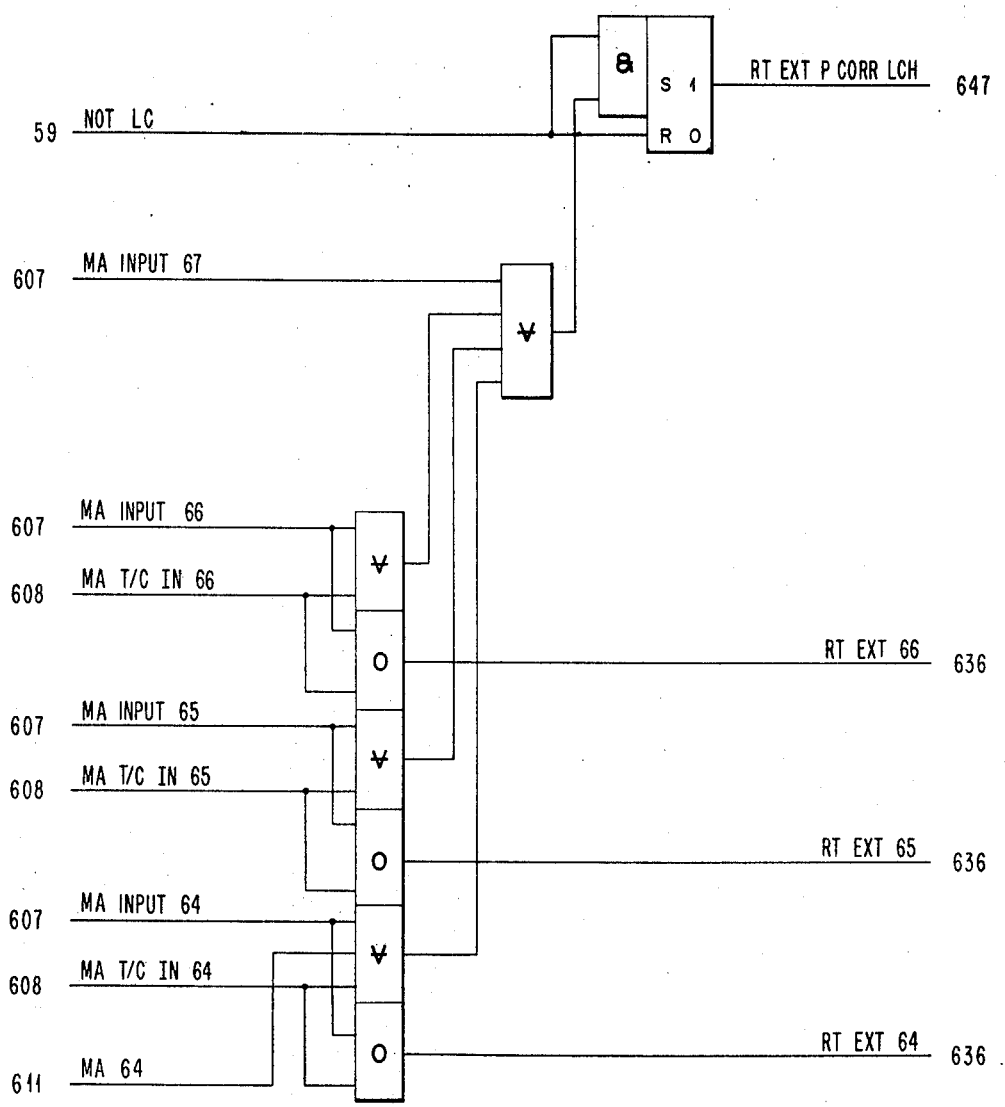
Figure 636:
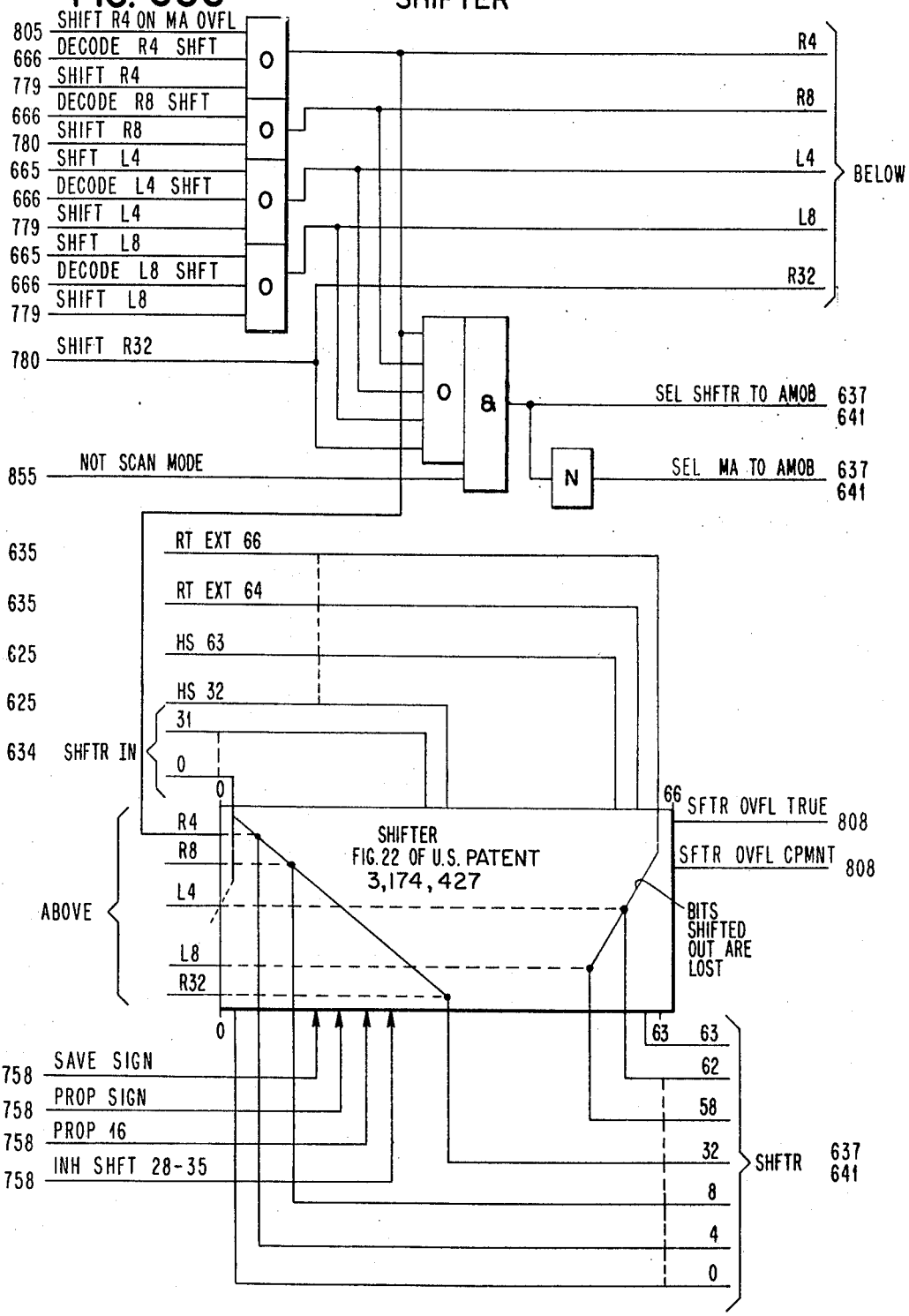
Figure 637:
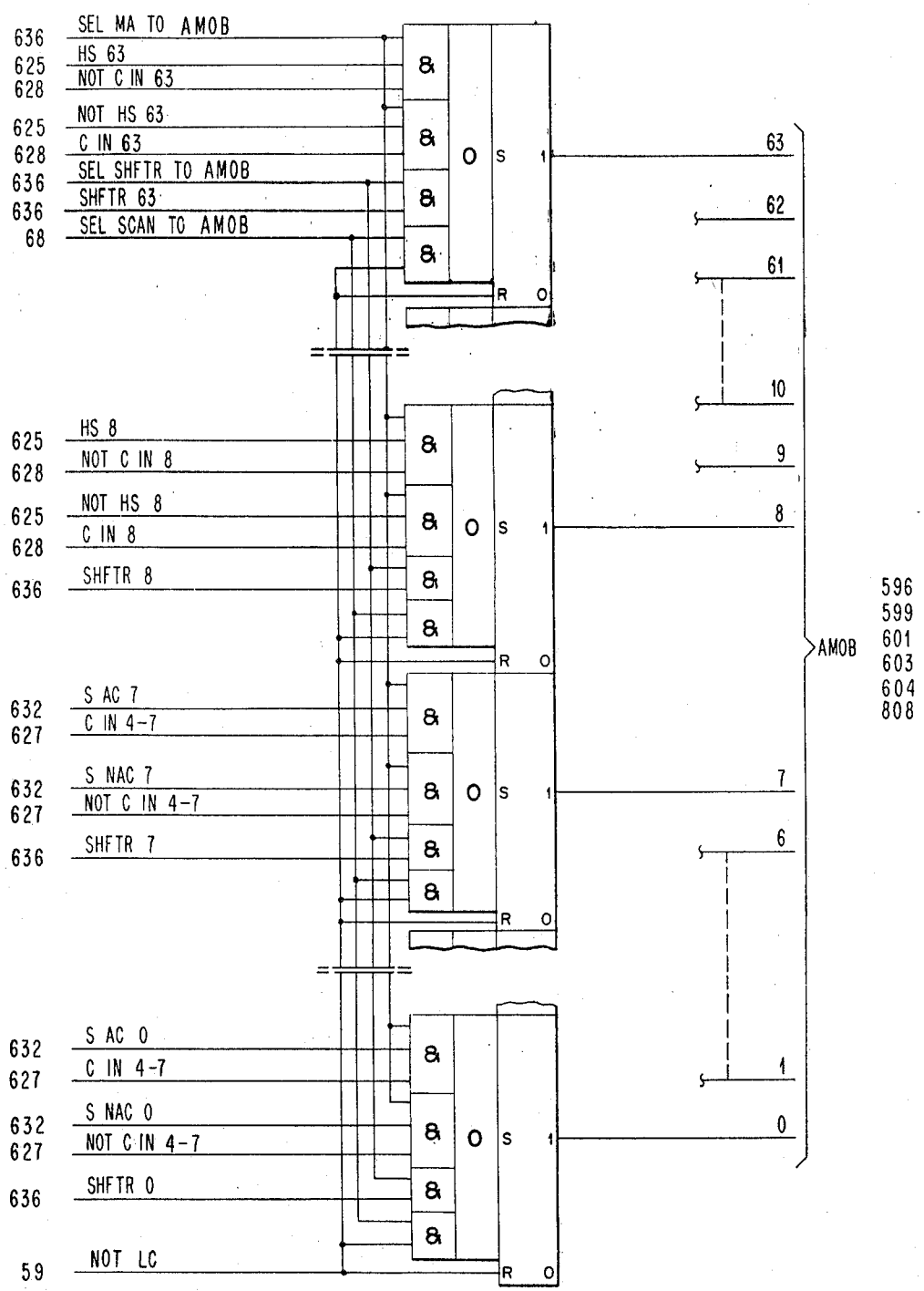
Figure 638:
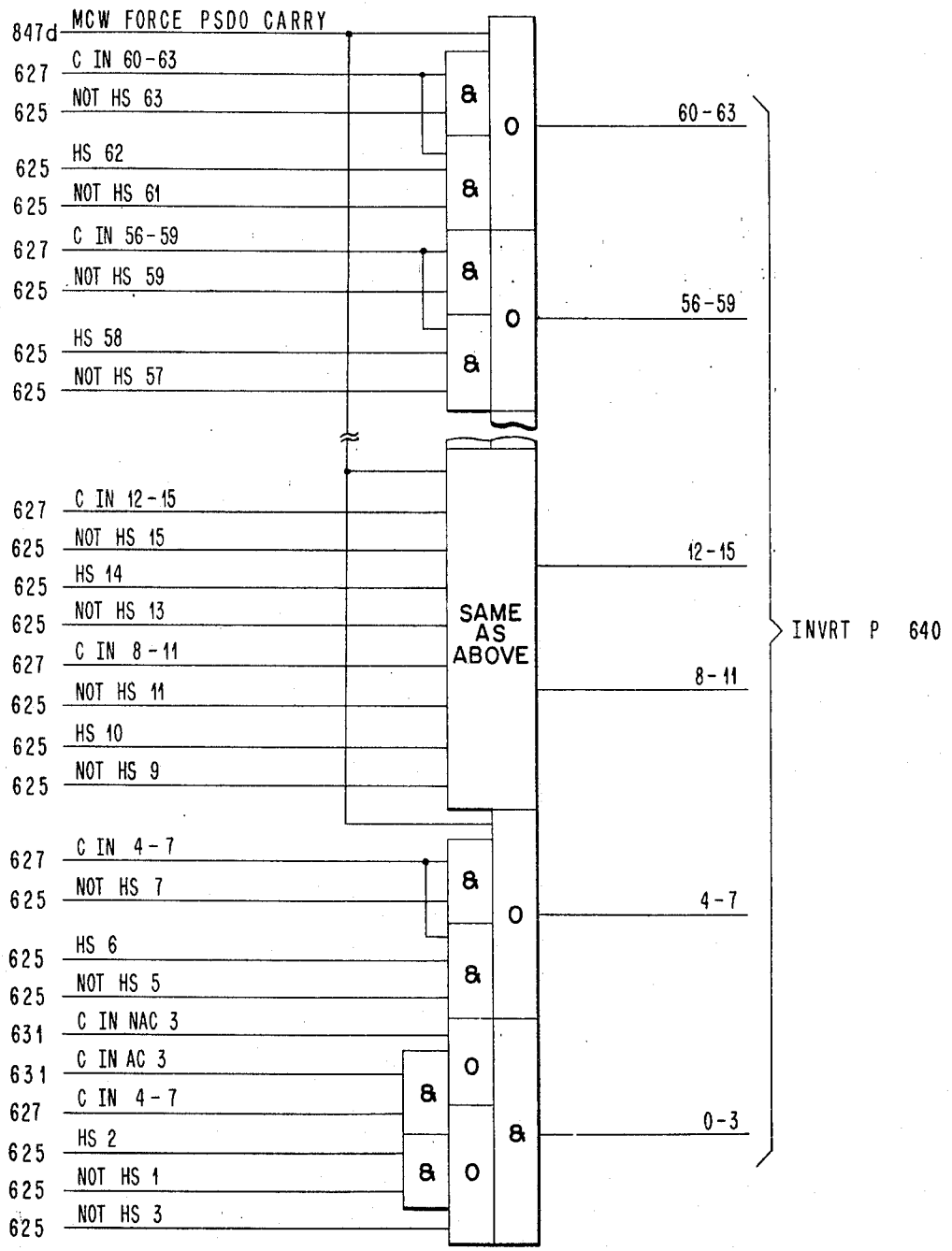
Figure 639:
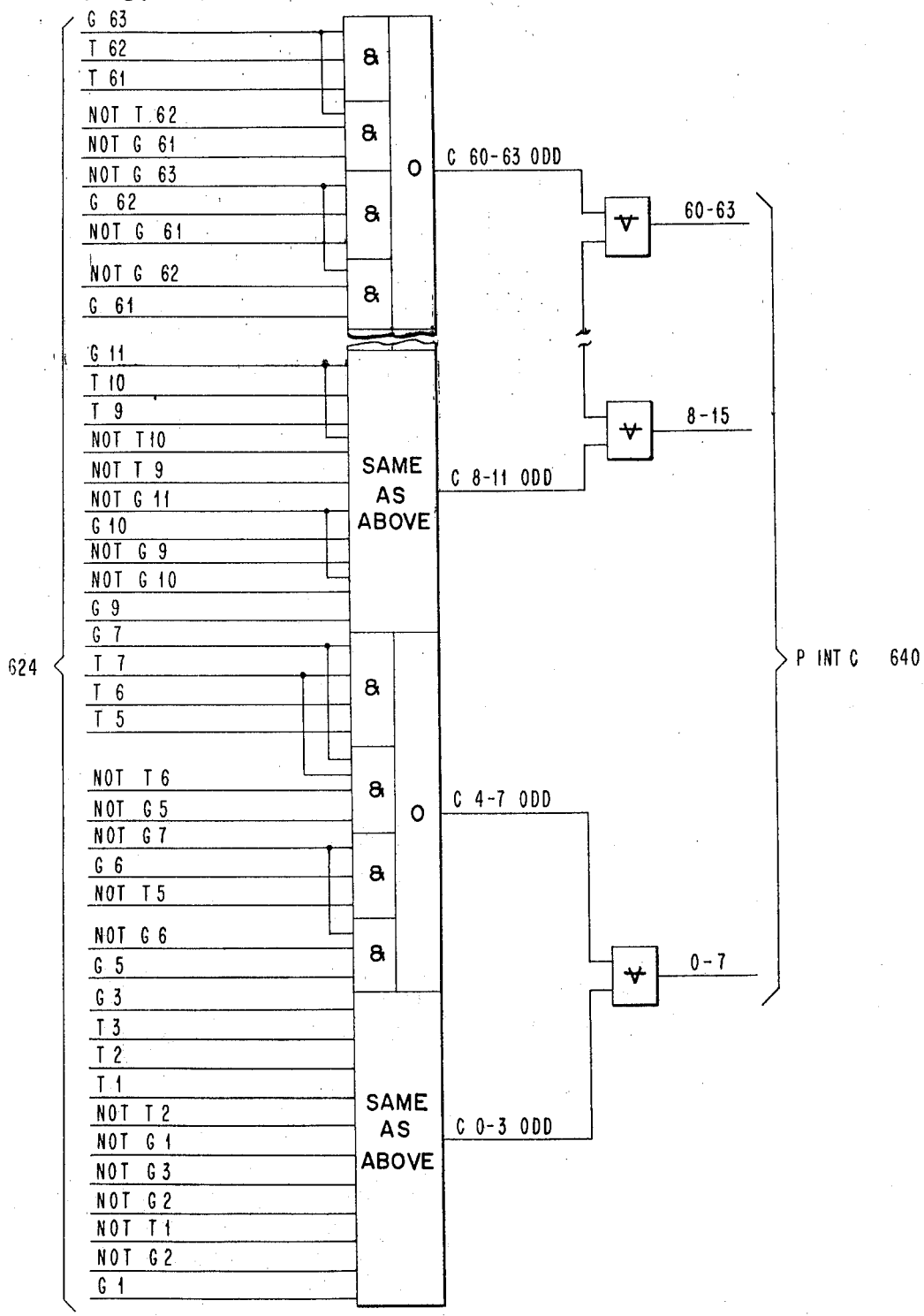
Figure 640:
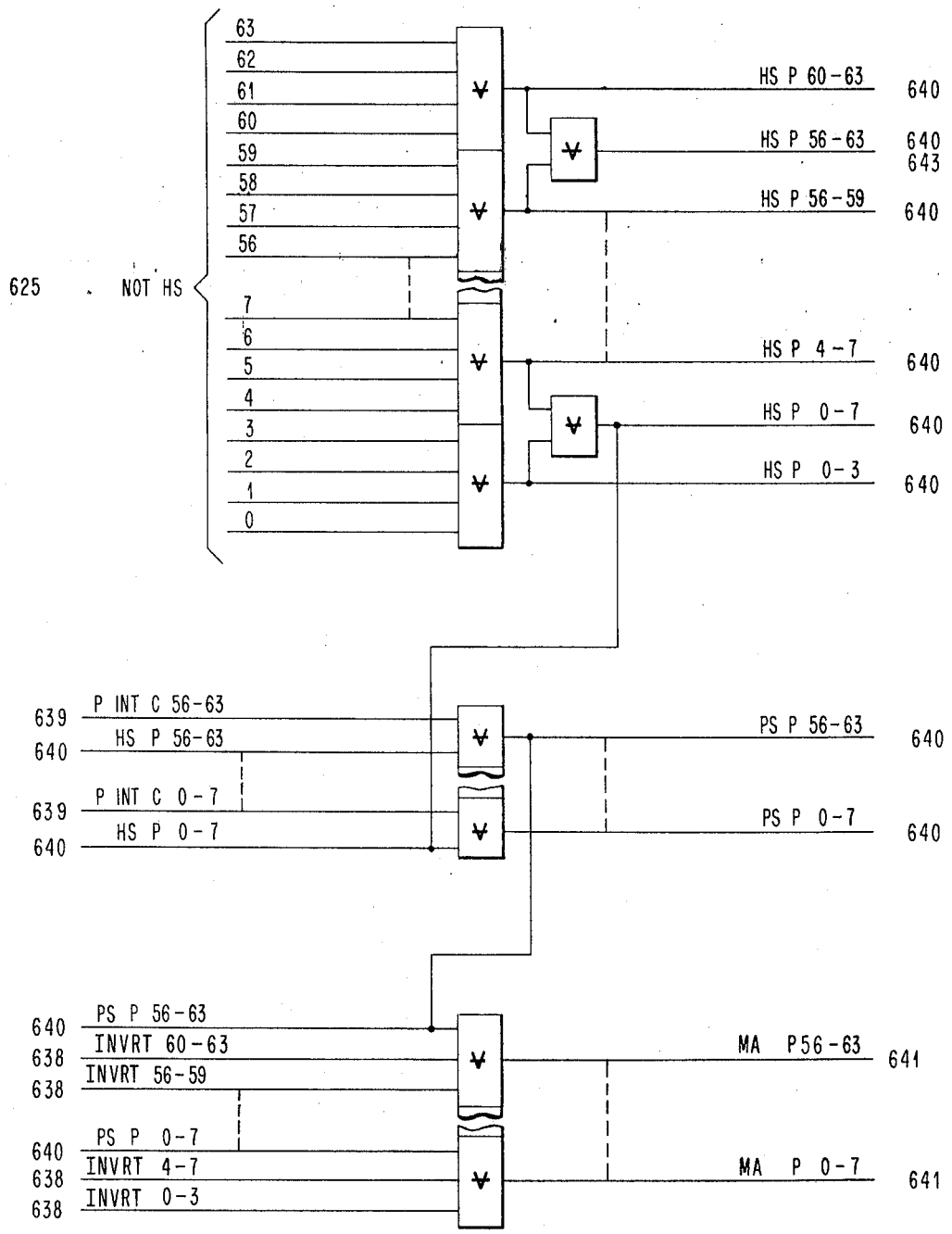
Figure 641:
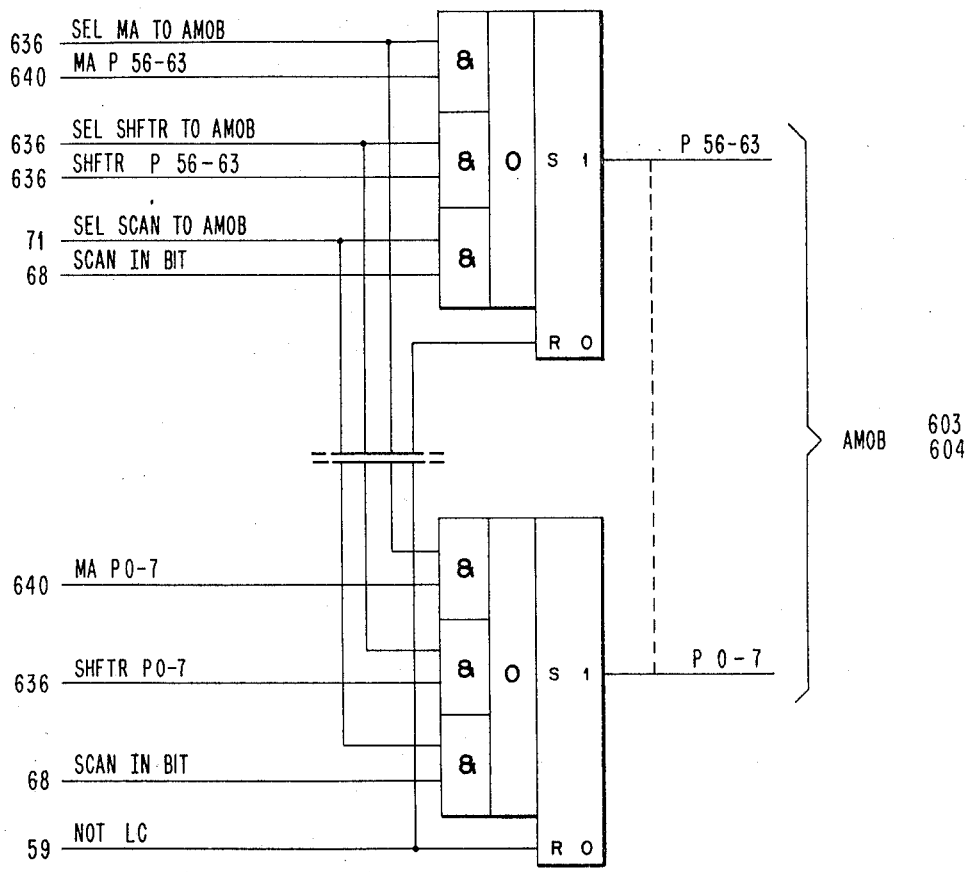
Figure 642:
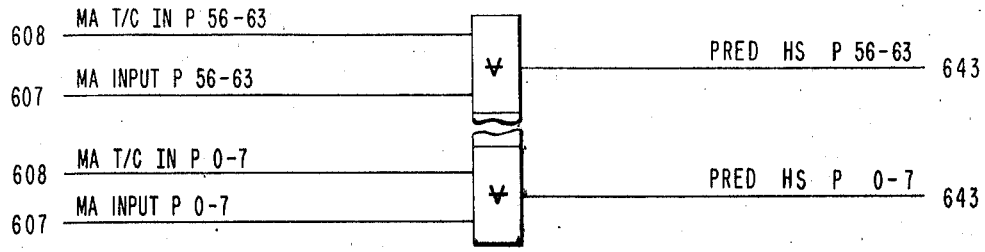
Figure 643:
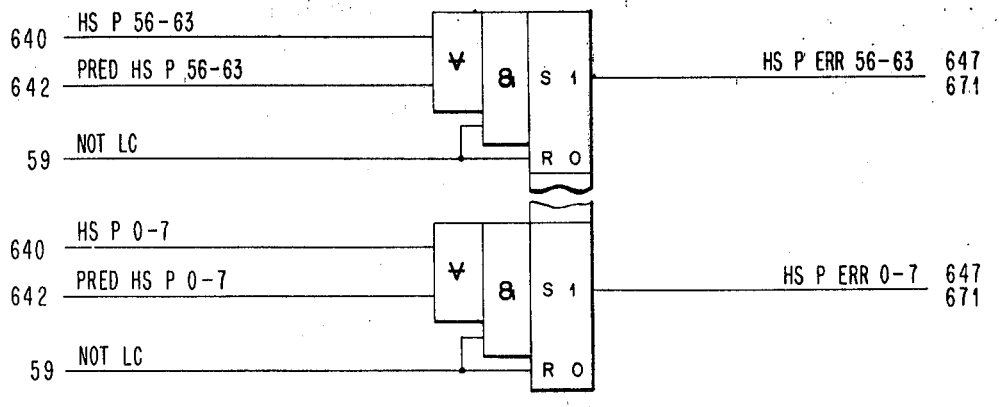
Figure 644:
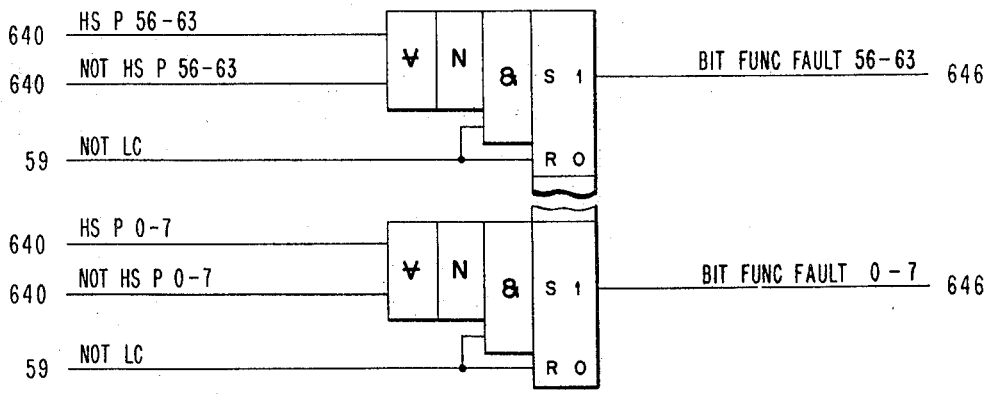

A brief description of the main adder circuits such as illustrated in the block diagram of FIG. 621. The main adder is a normal carry look-ahead adder which utilizes 4-bit groups and 16-bit carries so as to provide double level carry look-ahead in generator of bit carries. The operation of this adder is identical in principle in the operation of the address adder of said environmental system. The only difference is the position of section carries as is well known in the art. Apart from its carry look-ahead characteristics, however, the main adder does have special features which are described in later sections. As seen in FIG. 621, the main adder is seen to comprise a bit function generator (top of FIG. 621) which feeds a carry look-ahead section, the output of which controls a sum generating section; there is also provided a sum parity predicting section and an adder checking section. The total checking provided is sufficient to check every possible combination of inputs, and all circuit failures, for single or odd errors. This is described in somewhat more detail in later sections.

(18.11.2.1) Introduction to divide decoder

The Main Adder high order byte, positions 0–7, has been implemented as a *carry select added*. Basically, this differs from the seven lower order bytes in the resolution of the sums. The other adder functions—input-OR's, bit functions, half sums, sum parity, and checking, are the same.

(18.11.2.2) Sum generation

Each sum is a function (EXCLUSIVE-OR) of the associated half sum and bit carry. The bit carries, in the lower order bytes, are functions of the group carry and the bit functions. The group carry, of course, has two states: 1 (carry) or 0 (no carry). For positions 0–7, two sets of bit carries are generated. One set (AC) is generated assuming the group carry in the 1 state; the other set (NAC) assuming the group carry in the 0 state.

The bit carry sets are then combined with the half sums, producing two sum sets. One sum set is associated with a group carry of 1 and is selected as the result sum if the look-ahead group carry result is a 1. The other set, associated with a group carry of 0, is selected if the look-ahead group carry is 0. The carry and sum sets are generated with positions 0–7 united as one group rather than two, as is the case in the lower order bytes. The entire eight position sum is selected dependent upon the carry into group 4–7 (GG4–7).

FIG. 621 is a block diagram of the general components of the main adder, showing the sum generation path.

(18.11.2.3) Divide decoder

The divide decoder serves to determine the proper divisor multiple to be selected for each divide iteration cycle. The main adder high order byte is implemented as a carry select adder to provide early sums to compare with the divisor, generating the new multiple within the basic clock cycle. This saves at least a quarter of a cycle, and permits one divide iteration per machine cycle.

(18.11.2.4) Multiple resolution

The high order divisor bits, contained in the DB/DC registers, are compared with each of the sum sets according to the relationship required by the divide algorism. As the new dividend (ADDER RESULT) MAY BE IN EITHER TRUE OR COMPLEMENT FORM, FOUR FUNCTIONS ARE GENERATED FOR EACH DIVISOR MULTIPLE.

Example: 1/2 Multiple

1/2 Multiple & Result True & GG 4–7
1/2 Multiple & Result True & NOT GG 4–7
1/2 Multiple & Result Complement & GG 4–7
1/2 Multiple & Result Complement & NOT GG 4–7

There are, therefore, four multiple sets generated. The selection is made in dependence upon the add result. If the add result is true (defined by the MA CPMNT TGR and the carry from position 0) and a carry into group 4–7 occurs, then the related set is selected for setting of the multiple latch. Similarly, the remaining combination of add result and C IN 4–7 select the other multiple sets. This is illustrated in the following tables.

Divisor leading zeros

The divide execution sequencing does not bit normalize the operands. However, the divide decoder adjusts for leading zeros in the divisor by comparing different bit groupings dependent upon these leading zeros.

First cycle multiple selection

Prior to the first iteration cycle, the dividend may be positioned in different locations. Therefore, to determine the multiple for the first iteration cycle, the decoder is able to examine the dividend as it appears in these different locations. This is accomplished by OR'ing the possible first cycle dividend sources, under control of the execution hardware, prior to entering the comparison circuitry.

High order zeros detector

Positions 0–3 of the two sum sets (AC and NAC) are examined for All Zeros and All Ones conditions. The correct function is selected by the carry to group 4–7 (GG 4–7), producing the two functions:

MA 0–3 Equal Zero

MA 3–3 Equal Ones

These functions are used by the execution control circuitry in determining instruction sequence.

| DIVISOR | TRUE DIVIDEND=ABC | | | | | | | |
|---|---|---|---|---|---|---|---|---|
| EF | 000 | 001 | 011 | 010 | 110 | 111 | 101 | 100 |
| 00 | 0 | 0 | 1/2 | 1/2 | 3/2 | 3/2 | 1 | 1 |
| 01 | 0 | 0 | 1/2 | 1/2 | 1 | 3/2 | 1 | 1 |
| 11 | 0 | 0 | 1/2 | 1/2 | 1 | 1 | 3/4 | 3/4 |
| 10 | 0 | 0 | 1/2 | 1/2 | 1 | 1 | 3/4 | 3/4 |

MULTIPLE

0 = NOT A & NOT B

1/2 = NOT A & B

3/4 = E & A & NOT B

1 = (NOT E & A & NOT B) or (E & A & B) or (F & A & B & NOT C)

3/2 = (NOT E & NOT F & A & B) or (NOT E & A & B & C)

| DIVISOR | COMPLEMENT DIVIDEND=ABC | | | | | | | |
|---|---|---|---|---|---|---|---|---|
| EF | 000 | 001 | 011 | 010 | 110 | 111 | 101 | 100 |
| 00 | 3/2 | 3/2 | 1 | 1 | 0 | 0 | 1/2 | 1/2 |
| 01 | 3/2 | 1 | 1 | 1 | 0 | 0 | 1/2 | 1/2 |
| 11 | 1 | 1 | 3/4 | 3/4 | 0 | 0 | 1/2 | 1/2 |
| 10 | 1 | 1 | 3/4 | 3/4 | 0 | 0 | 1/2 | 1/2 |

MULTIPLE

0 = A & B

1/2 = A & NOT B

3/4 = E & NOT A & B

1 = (E & NOT A & NOT B) or (NOT E & NOT A & B) or (F & NOT A & NOT B & C)

3=2 = (NOT A & NOT B & NOT C & NOT E) or (NOT A & NOT B & NOT E & NOT F)

(18.11.2.2) Main adder-shifter

The main adder-shifter shown in FIG. 621 takes part in most data transfers within the E unit.

(18.11.3) DATA PATHS AND CONTROL

The adder performs all of its operations with a minimum of control. The true add operation is the basic function of the adder and is performed with no control other than input and output gating. When operands are gated to each of the inputs, and no adder control is exercised, the sum of the operands is generated and gated to the MA latch. From the MA latch the sum can be delivered to the K, L, or M registers.

To perform an operation other than the true add, one or more controls is used. For example, to perform a shift, a control sets the shifter to give the desired output, gates the shifter to the MA latch and blocks gating of the final sum to the MA latch. The data path is from the bit functions to the normally selected ORE gate, through the shifter and the shift gate to the MA latch.

On adder operations, input parity is checked and output parity is generated. The check circuits require that correct parity be gated to both input OR's. For this reason, on single operand operations, such as shifting, parity is forced to the input OR not receiving the operand.

(18.11.4) DATA FLOW AND TIMING, EXAMPLE

The adder is a one cycle data path. The sum of operands gated to the adder during a machine cycle is latched in the MA latch at L time following the cycle. The add takes place on the "first fixed point" cycle. The sum is delivered to K at A time of the next cycle.

On the AR ADD the adder receives inputs of two thirty-two bit operands and delivers a thirty-two bit useful sum. The operands are gated to the left or high order end of the adder input OR's. Parity is forced to the low order half of each input OR. A 64 bit sum having all significant digits in the high order 32 bits is delivered to K. Only the left 32 bits of K is gated to the general register R1.

The control of gates to the adder is external to the adder. The gating depends not only on the adder operation being performed but also upon the context of the operation. The gating for the true add performed when the AR instruction is being performed is as shown hereinbefore. The gating for a true add being performed during the execution of a multiply or divide instruction will be different and may involve shifted as well as straight gates.

(18.11.5) BIT FUNCTIONS AND THE ADD OPERATION

Two operands are combined to generate bit functions; the bit functions then produce the final sum along two independent paths. One path produces the sum before carries. The other path produces the carries to each bit position.

The carry to each position is determined without waiting for the generation of the final sums in lower order positions. This fact is the time saver in the look-ahead circuits.

The Sum Before Carries for any bit position is a function of the input bits which follows these rules:

MA Bit + MA T/C Bit = sum before carries (HS)
0 + 0 = 0
0 + 1 = 1
1 + 0 = 1
1 + 1 = 0

The sum before carries is the EXCLUSIVE OR of the input bits.

The Carry to any Bit Position is a function of the input bits to all lower order bit positions and is developed by the look-ahead circuits using two bit functions from each bit position.

Any single position will deliver a carry to the next higher order position according to the following rules.

0 + 0   Will never produce a carry.
1 + 0   Will produce a carry if the position receives a
0 + 1   carry.
1 + 1   Will always produce a carry.

Note that two different predictions concerning a carry from any position can be made.

(1) If either input bit is present, the position will produce a carry if it receives a carry. The position is said to transmit (T).

(2) If both input bits are present, the position will always produce a carry. The position is said to generate (D).

The OR rather than the ORE is used in producing the transmit function. This does not interfere with operation of the look-ahead circuits since whenever both bits are present, the carry out is determined by the generate function and is not dependent upon the transmit.

The Transmit and Generate Functions for each bit positions are delivered to the look-ahead circuits. The look-ahead circuits deliver a carry to any bit position if two conditions are met.

(1) Some lower order bit position generates.

(2) All bit positions between the bit position to receive the carry and the generating bit position transmit.

The Final Sum is generated from the HS and the carry by the same rules used to produce the HS from the two input bits. That is, the final sum is the EXCLUSIVE OR of the carry and the HS.

(18.11.6) LOOK AHEAD FOR THE FULL ADDER

To predict the carry into the high order position of our 64 position adder using the logic thus far described would require 63 AND circuits any one of which could produce the carry. Further, the circuit testing for the condition in which the low order bit generates and all other bits transmit would require 63 inputs. An adder using such circuits is said to have *one level* of look-ahead. By one level is meant that only bit functions are used to predict the carries to all positions. Three levels of look-ahead are used in said environmental system and thus avoids the cumbersome circuits described above.

To achieve *three levels* of look-ahead, the adder is divided into groups and sections, and the carries out of groups and sections are predicted by group and section functions.

*A GROUP* contains four bit positions.
*A SECTION* contains four groups.

Generate (D) and Transmit (T) functions are developed for each group and section. These functions have the same meanings as the bit functions generate and transmit.

*GENERATE* (D) means that the section or group will deliver a carry out.

*TRANSMIT* (T) means that the section or group will deliver a carry out if it receives a carry in.

(18.11.7) VARIATIONS OF THE ADD OPERATION

The true add is performed with no internal adder controls. Three adder operations use the same data paths as the true add but require some control.

(18.11.7.1) Complement add

Complement addition is used to find the difference between two numbers. For the floating point instructions ADD and SUBTRACT, *one's complement* addition is used when the difference is required. Other operations requiring the difference between numbers use *two's complement* addition.

For two's complement addition one operand is changed to its two's complement and all other adder operation is as for true add. The two's complement is the inversion of the number with a 1 bit added to the low order position. Controls 1 and 2 change the operand entering the T/C input OR to its two's complement.

*Control 1* SEL MA T/C CPMNT selects the inversion of the operand for the generation of the bit functions for the entire adder.

*Control 2* HOT 1 adds a one bit to the low order position by forcing a group carry to group 63 to 63 and also causing the group to generate if all positions transmit.

For one's complement addition, one of the operands is changed to its one's complement and all other adder operation is as for true add. The one's complement is generated by inverting one of the operands and allowing a carry from the high order position, if generated, to be fed to the low order end.

*Control 1* SEL MA T/C CPMNT selects the inversion of the input for the generation of the bit functions.

*Control 3* ALLOW END CARRY enters the look-ahead logic at the section level and allows a carry out of the high order position to be fed back to the low order position.

(18.11.7.2) Adder as a straight data path

To use the adder as a data path, the operand to be moved is gated to either input, and all parity bits and no data bits are gated to the other input. The operation is exactly as for the add. The sum is equal to the single input operand.

(18.11.8) PARITY GENERATION

The final sum of two operands is generated by EXCLUSIVE OR'ing the HS of the operands and the carries generated by the operands. The generation of parity for the final sum depends on a relationship that exists between the parity of the HS, the parity of the carries and the parity of the final sum. The relationship is:

HS p V—=NOT Sum p

For example:

|  | Bit positions | | | | DEC-Equiv | P |
|---|---|---|---|---|---|---|
|  | 1 | 2 | 3 | 4 |  |  |
| A | 0 | 1 | 0 | 1 | 5 | 1 |
| B | 0 | 1 | 0 | 0 | 4 | 0 |
| HS | 0 | 0 | 0 | 1 |  | 0 |
| Carries | 1 | 0 | 0 | 0 |  | 0 |
| Sum | 1 | 0 | 0 | 1 | 9 | 1 |

In practice the HS and the carries *within each group* are available early in the adder cycle. The carries into groups come from look-ahead and are not available until later. The parity of the final sum is, therefore, generated in four stages.

(1) The HS parity on each byte is generated.
(2) The carry parity within each group is generated.
(3) The parities generated in steps 1 and 2 are combined according to the relationship previously sighted to generate the parity of the final sum before group carries.
(4) When the group carries are available they are used to change the parity generated in 3 dependent on properties of the final sum before the group carries. The parity changes can be predicted by examining certain of the HS within each group and the carry into the group.

Entering into the generation of parity for each byte, therefore, are three things:

(1) The HS parity of the byte.
(2) The parity of the carries within each of the two groups of the byte.
(3) Two Change Parity Group (CPG) lines generated by examining the carry into the group from look-ahead and certain of the HS within the group. The output parity for group 8 to 15 is located hereinbefore in said environmental system.

(18.11.9) INPUT PARITY CHECKING (BYTE HS PARITY ERROR)

The checking of input parities depends on a relationship that exists between the input parity of each operand and the HS of the operands. The relationship is:

Parity of A V—Parity of B=NOT Parity of HS

For example:

|  | 1 | 2 | 3 | 4 | Parity |
|---|---|---|---|---|---|
| A | 0 | 1 | 0 | 1 | 1 |
| B | 0 | 1 | 0 | 0 | 0 |
| HS | 0 | 0 | 0 | 1 | 0 |
|  | P A | V— | P B | = | NOT P HS |
|  | 1 | V— | 0 | = | NOT 0 |
|  |  |  | 1 | = | 1 |

To check input byte parity therefore:

(1) The HS parity is generated for each byte.
(2) The EXCLUSIVE OR of the input parities for each byte is generated.
(3) 1 and 2 are compared. If they are the same, an input parity error has occurred.

The "Byte HS Parity Error" indicator is set.
The circuit generating Byte HS Parity Error for byte 8 to 15 is on said environmental system.

(18.11.10) BIT FUNCTION ERROR

All outputs of the main adder-shifter depend upon bit functions generated for each input bit position. The adder contains circuits that will detect any single bit function error.

The bit function check is performed in the following steps:

(1) The AND and OR bit functions and their complements are generated.
(2) From these, the HS and complement HS are generated, independently of each other, for each bit position.
(3) From the HS and complement HS generated in 2, the HS parity for each byte and its complement are generated.

Any single error in steps 1 to 3 will be detected by either the "Byte HS Parity Check" or the "Bit Function Error" circuits as follows:

A. Single error in 1 will cause either HS=NOT HS, or HS and NOT HS to be inverse of the proper result.
B. Single error in 2 will cause HS=NOT HS.
C. Single error in 3 will cause HS parity=NOT HS parity.

In A and B, when HS=NOT HS then HS parity=NOT HS parity and the Bit Function Error circuit will detect the error.

In A, when HS and NOT HS are inverse, the HS parity≠predicted HS parity and the HS Parity Check will detect the error.

In C, the Bit Function Check circuit will detect the error.

The HS Parity Error, Bit Function Error, and Byte Error circuits for byte 8 to 15 are on said environmental system.

(18.11.11) LOOK-AHEAD CHECK

The look-ahead circuits predict the carry into each group. The low order bit position of any group receiving a group carry will always receive a bit carry. In order to check the look-ahead circuits, the adder predicts this same carry dependent only on the bit functions of, and the carry into, the next lower order bit. The carry from look-ahead and the predicted carry (KC) are compared: if they are unequal, an error has occurred.

(18.11.12) SHIFTING AND LOGICAL CONNECTIVES

Shift operations and the performance of the logical connectives use data paths that differ from those of the add operation. The same bit functions used on the add operation are renamed and moved along different data paths to accomplish operations other than add. The logical EXCLUSIVE OR is the same function as the HS. The logical AND is the same function as the Generate.

Either or both of these functions can be gated to the shifter. The OR E gate to the shifter is normally conditioned, and is used to deliver the single operand to the shifter on shift operations, or to deliver the ORE of the two input operands to the shifter when the logical connective ORE is being executed.

To execute the logical connective AND, the line SEL LOG AND gates the AND function to the shifter and also degates the ORE function so that it does not reach the shifter.

To execute the logical connective OR, both the ORE and the AND functions are gated to the shifter. The SEL LOG AND line is conditioned, and the SEL LOG ORE line is allowed to remain conditioned.

When the data path is to be through the shifter, the output of the shifter must be delivered to the MA latch and the final sum must be blocked from reaching the latch.

(18.11.12.1) Data Shifting

The relationship of input bits to output bits of the shifter for the various combinations of control lines that may occur is shown in said environmental system. The control scheme used and the operation of the shift control lines (R32, R8, R4, and L8) and the Inhibit Bits 28 to 35 line are shown in said environmental system. Also are shown the operation of the Save Sign, Propagate Sign, and Propagate 16 control lines, and the operation of the Overflow control lines.

(18.11.12.2) Shifter parity generation

Parity generation in the shifter depends upon the fact that when a single operand is gated to the adder, the HS of the operand is equal to the operand. On the logical connectives when two operands use the shifter path correct parity is not generated.

Parity generation for the shifter output takes place in four stages:

(1) The adder delivers to the shifter the HS parity of each 4 bit group and of the 3 bit left extension (bits 64–66).

(2) The shifter combines the HS group parities into byte parities for all combinations of groups that may form output bytes. This is done by the Byte Parity Regeneration circuits. These circuits also take into account the effect of the Save Sign control on the bytes that may become byte 0 to 8.

(3) The parity shifting circuits select the properly combined group parities for each output byte depending upon the shift being executed.

(4) When any one of the four controls (Prop Signs, Prop 16, Overflow, or Inhibit bits 28–35) that may force output bits is active the Parity Shifter circuits adjust the parity accordingly.

Shifter overflow detector

When fixed point numbers are being shifted left, it is possible to shift out high order bits. This condition is detected by the shifter overflow detector.

The Save Sign line active indicates that a fixed point number is being shifted. With the save sign line active and a left shift taking place, all bits being shifted off are compared to input bit 0. If any bit to be shifted off differs from bit 0 the overflow condition is indicated.

Logical connectives

The following is a summary of the adder-shifter's part in the execution of the logical connective instructions:

Two cycles are required for the operation.

On the first cycle:

(1) Both operands are gated to the left end of the adder and parity is forced to the right end.

(2) One or both of the bit functions (Logic ORE or Logic A) are gated to the shifter depending on the connective to be performed.

(3) The shifter is controlled to shift R4. Since the operands are 32 bits long, no bits are shifted out.

(4) The right 4 shift control also serves to gate the shifter to the MA latch, and to disable the gate used by the final sum to reach the MA latch.

(5) Both operands have been checked for correct input parity, but correct parity has not been generated on the output.

(6) The output is delivered to the K register.

On the second cycle:

(1) K having incorrect parity is gated to the adder.

(2) The logic ORE function is gated to the shifter. This delivers the operand as received to the shifter.

(3) The L4 shift control causes the connective to be delivered to the high order positions of the MA latch.

(4) The connective now with generated parity is gated to K.

(5) The left end of K is put away in general register R1.

(18.12) Exponent adder

(18.12.1) INTRODUCTION

The Exponent Adder provides a nine bit, fully checked data path between the source registers and the Exponent AND/OR Shift Counter registers. The low order position (1–7) comprise a seven bit binary adder, the eighth position (0) is used for floating point sign operations, and the ninth position is parity.

The primary function of the Exponent Adder is to perform exponent arithmetic and sign control functions, and to serve as a transfer path during floating point instructions. It also performs binary arithmetic for such purposes as incrementing and decrementing of shift amounts and iteration counts.

(18.12.2) DATA FLOW (FIG. 536)

The basic data path is: source register to the Exponent Adder input OR's through the adder to the AEOB latch, and then to the Exponent or Shift counter registers. The input OR's are referred to as the AE-OR and the AE T/C-OR. The source registers to the adder inputs are:

| AE INPUT: | AE T/C IN: |
|---|---|
| J 0–7 | M 56–63 |
| J 32–39 | FLP 56–63 |
| ER 0–7 | SC 0–7 |

Additional inputs to the AE-OR are received from the M and SC/H Decrement Decoder, and from the control area. The AE T/C-OR receives inputs from the VFL area in addition to the source registers listed.

(18.12.3) BINARY ADDER

The seven position adder employs parallel carry look-ahead to resolve the bit carry functions. The sums are generated as the EXCLUSIVE OR of the data inputs and the bit carries. Note that the two operands are combined to generate bit functions. The bit functions then produce the sum along two independent paths. One path produces the sum before carries (Half Sum). The other path, carry look-ahead, resolves the carries to each bit position.

Half sum

The half sum for each bit position is a function of the input bits which follows these rules:

| AE BIT | AE T/C BIT | = | Half Sum |
|---|---|---|---|
| 0 | 0 | = | 0 |
| 0 | 1 | = | 1 |
| 1 | 0 | = | 1 |
| 1 | 1 | = | 0 |

The half sum is the EXCLUSIVE OR (V—) of the data inputs.

(18.12.4) BIT FUNCTIONS

The carry to each bit position (Bit Carry) is a function of the input bits and is developed by the look-ahead circuits. Each position will deliver a carry to the next higher order position according to the following rules:

| AE BIT | AE T/C BIT | |
|---|---|---|
| 0 | 0 | Will never produce a carry. |
| 0 | 1 | Will produce a carry if the position receives a carry. |
| 1 | 0 | |
| 1 | 1 | Will always produce a carry. |

Note that two different predictions concerning a carry from each position can be made.

(1) If either input is in a "one state," the position will produce a carry if it receives a carry. The position is said to Transmit (T).

(2) If both input bits are in a "one state," the position will always produce a carry. The position is said to Generate (D).

The OR function, rather than the EXCLUSIVE OR function, is used in producing the transmit. This does not interfere with the operation of the look-ahead circuits since the generate function determines the carry whenever both bits are present.

(18.12.5) CARRY-LOOK-AHEAD

The bit functions for each position are delivered to the look-ahead circuits. The look-ahead circuits deliver a carry to each bit position if two conditions are met.

(1) Some lower order bit position *Generates*.

All bit positions, between the generating bit position and the position to receive the carry, *Transmit*.

To implement the logic to resolve the bit carry to the high order position, as thus far described, would require 6 AND circuits, any one of which could produce the carry. Further, the circuit testing for the condition in which the low order bit generates and all other bits transmit would require 6 inputs. These cumbersome circuits are avoided by uniting the adder into two groups: 3 positions to the first (5–7) and 4 positions to the second (1–4). Generate and transmit functions are produced for each group and these are combined to produce a carry into the groups (*Group Carry*). The bit carries are developed from the group carries and the bit functions.

(18.12.6) END AROUND CARRY

The end around carry function, when enabled, essentially removes the high/low order relationship of the adder positions with respect to the carry functions. That is, to resolve the carry to each bit position, all other positions are treated as lower order positions. For example, if position 4 were to generate and positions 3, 2, 1, 7 and 6 were to transmit, a carry would be delivered to position 5.

$$(D4 \& T3 \& T2 \& T1 \& T7 \& T6 = C5)$$

The final sum is generated from the half sum and the bit group carry generation 1nd is enabled or disabled by the Allow End Carry (AEC) control function.

(18.12.7) SUM GENERATION

The final sum is generated from the half sum and the bit carry, following the same rules used to produce the half sum. That is, the final sum is the EXCLUSIVE OR of the bit carry and the half sum.

(18.12.8) SUM PARITY

The generation of the sum parity depends upon a relationship that exists between the parity of the half sums, the parity of the bit carries, and the parity of the final sum. This relationship is:

Parity HS V— Parity Carries=NOT Parity Sum

The half sum parity and the parity of the carries within each group may be determined comparatively early in the adder path. The group carries, developed by look-ahead, are not available until later in the adder path. Therefore, the sum parity is developed as follows:

(1) The parity of the carries within each group is generated (Internal Carries Parity).

(2) The parity of the half sum is determined from the parities of the input operands (Predicted Half Sum Parity). The relationship of the half sum parity to the parities of the input operands is:

AE T/C Parity V— AE Parity=NOT HS Parity

The predicted half sum parity is the NOT EXCLUSIVE OR of the input parities.

(3) The parities generated in 1 and 2 are combined according to the relationship previously sighted to produce the parity of the final sum before group carries (Internal Sum Parity).

(4) The parity generated in 3 is changed if the number of sums changed by the group carries is odd (Change Parity). This condition is determined by examining certain half sums within each group, and the group carries.

The sum parity, therefore, is a function of the following, and is generated independently of the sums themselves:

(1) The parity of the internal carries.
(2) The predicted half sum parity.
(3) The change parity.
(4) The sign control and AEOB complement functions, not related to the add function. The manner in which these functions modify the parity are defined hereinafter.

(18.12.9) CHECKING

The checking functions are designed to detect the following:

(1) A *mismatch* of the input data and its associated parity.

(2) A failure within the added which could result in multiple sum failures.

Input parity check

The checking of the input parities depends upon the relationship of the input parities and the half sums, as previously stated. To check the input parities:

(1) The parity of the half sums is generated.

(2) The parity generated in 1 is compared with the predicted half sum parity. An inequality defines an error condition.

Bint function check

The adder contains circuitry which will detect all single bit function failures.

The half sum functions are generated in a manner such that a bit function failure will cause:

(1) The half sum functions to be *inverse* of the proper result. This failure will be detected by the *input parity check*.

(2) The half sum and its complement to be *equal*. This failure, as well as a failure within the half sum parity generation circuitry, will cause the half sum parity and its complement to be *equal*. A comparison is made of the half sum parity and its complement. An *equality* defines an error.

Group carry check

The group carry developed by the look-ahead circuits is equivalent to a carry from the high order bit position of the lower order group. This carry (K G) is developed from the bit functions of, and the carry into, the high order position of each group. The predicted group carry (K G) is compared with the equivalent group carry and an inequality defines an error.

Byte check

The bit function check and the group carry checks are ORed to produce the function *Byte Check*. This function defines a failure internal to the adder circuitry.

(18.12.10) SIGN CONTROL

Sum 0 (sign) is a function of its half sum and the sign control functions. If the resulting sum is different from the half sum, the sum parity is changed. The following chart defines these relationships:

| Control Function | HS 0 | Sum 0 | Change Parity |
|---|---|---|---|
| None | 0 | 0 | No. |
| Do | 1 | 1 | No. |
| Set Sign Plus | 0 | 0 | No. |
| Do | 1 | 0 | Yes. |
| Set Sign Minus | 0 | 1 | Yes. |
| Do | 1 | 1 | No. |
| Invert Sign | 0 | 1 | Yes. |
| Do | 1 | 0 | Yes. |

(18.12.11) COMPLEMENT GATES

Complement gates at the Exponent Adder input and output provide ability to perform complement arithmetic in both binary and excess 64 form.

AE complement

A complement gate is implemented in the Exponent Adder following the AE T/C OR. This gate extends the full width of the AE T/C OR, including position 0 (sign). This allows for complementing the AE T/C input operand, and is enabled by the Select AE Complement control function.

AEOB complement

A complement gate is incorporated in the AEOB latch, providing for the recomplementation of the adder sum. It extends from position 1–7 (position 0 is excluded) and is "split" after position 1. The two components Complement AEOB1 and Complement AEOB2–7, may be selected singly or together. The selection of the Complement AEOB1 gate causes the inversion of an odd number of sums (1), and a corresponding change in the sum parity. This feature provides the ability to perform the arithmetic operations defined hereinafter.

(18.12.12) OUTPUT SIGNALS

Certain conditions are detected by the Exponent Adder circuitry which are of significance in the performance of particular instructions.

Half sum one's detector

A signal is generated when the half sums of positions 1–7 are *all "one."* With the AE Complement gate selected, this signal indicates the equality of the two input operands (positions 1–7).

High order carries detector

The carries from positions 1 and 2 are detected by the adder look-ahead circuits.

Overflow/underflow detector

The result of exponent arithmetic can, of course, exceed the limits of exponent values. This occurrence is detected by the adder circuitry. A result in excess of the upper value limit defines an overflow condition. A result which exceeds the lower value limit defines an underflow.

Floating point operation

For all floating point operations, the Exponent Adder performs *excess 64* arithmetic. All adder operands, including increment and decrement amounts, are considered as "excess 64" values. Four operations are performed by the Exponent Adder:

(1) Exponent Transfer
(2) Exponent Comparison
(3) Exponent Subtraction
(4) Exponent Addition

Exponent transfer

The Exponent Adder serves as a data path through which the operand passes to the Exponent or Shift Counter registers.

Exponent comparison

The adder result is equal to the absolute difference of the input operands. The result is obtained as follows:

A complement add, with end around carry enabled, is performed. The result will be the true binary difference if the AE input operand was the larger. Complementing Sum 1 (CPMNT AEOB1) YIELDS THE DESIRED RESULT.

The result will be the complement of the binary difference if the AE T/C input operand was the larger. Recomplementing yields the true binary difference. Complementing Sum 1 again would yield the desired result. However, this is the same result as is obtained by complementing sums 2–7 (CPMNT AEOB2–7).

Therefore, the sums are complemented dependent upon the form of the add result, defined by the carry from position 1.

Exponent subtraction

The adder result is equal to the algebraic difference of the AE input operand subtracted from the AE T/C input operand. The result is obtained as follows:

A complement add is performed and sums 2–7 are complemented (AEOB CPMNT 2–7).

Exponent subtraction is performed to resolve the result exponent for divide, and to decrement exponents, preshift amounts and iteration counts.

Exponent addition

The adder result is equal to the sum of the input operands. The result is obtained as follows:

A true add is performed and Sum 1 is complemented (CPMNT AEOB1).

Exponent addition is performed to resolve the result exponent for multiply, and to increment exponent values.

Binary operation

For all non-floating point operations, the Exponent Adder performs as a conventional binary adder.

19.0 BINARY CONTROLS

(19.1) Introduction to binary controls

The sections hereunder cover general control philosophy in the binary area of the E Unit. Since the points covered apply to many instructions, they are not repeated in the description of each individual instruction.

(19.1.1) CONTROL TRIGGERS

Three basic types of control triggers are used in the E Unit. All three types are in general set and reset by a controlled A clock pulse.

(19.1.1.1) Gating triggers

Gating triggers are used to gate operands from the working registers into main adder and exponent adder. The combination of gating triggers needed for a particular cycle is set at the beginning of that cycle. The triggers stay on for one cycle and then return to the OFF state unless they are set again for the next cycle.

(19.1.1.2) Status triggers

Status triggers store the results of operations. Some typical status triggers are listed below:

MA C OUT O TGR: this trigger is set when a carry out of the high order hit of the main adder occurred in the previous cycle.

SELECTED K ZERO TGR: this trigger is set if an operand in the K register in all zeros.

E IRPT TGR: this trigger is set whenever the E Unit detects a program interrupt.

Status triggers may stay on, once they are set, until the end of the instruction; they may be set more than once during an instruction, or they may be set every cycle. Status trigger setting depends on the particular trigger and its usage in the instruction.

(19.1.1.3) Sequence triggers

Sequence triggers define the sequence of operations that the machine will go through to execute an instruction. The latched output of a sequence trigger together with operand decoding and status trigger outputs determine:

(a) Where the results of the current cycle will be placed;

(b) What gating triggers will be set at the beginning of the next cycle; and (c) What sequence trigger will be set at the beginning of the next cycle.

In general, only one sequence trigger is on at a time. Exceptions to this are the triggers used for the multiply iteration and the last cycle of some instructions.

(19.1.2) FUNCTIONAL OR'S

The circuits that develop the control functions used in the data flow are called functional OR's. These functional OR's fall into the following classes:

In Gate and Release, lines gate the operands to the desired registers and release those registers. They must bracket the A pulse that releases the register. Thus, sequence and status trigger inputs that may change at the next cycle must be latched.

Gating Trigger Set Conditions, when active, unconditionally set the gating triggers. They must bracket the A pulse.

Gating Trigger Enable Condition lines are ANDed with late data conditions to set a gating trigger. The timing is the same as the set conditions.

Status Trigger Enable Condition lines are ANDed with late data conditions to set a status trigger. The timing is the same as the set condition.

Control During Cycle: some control functions are accomplished during the cycle. Examples of this are selecting a constant shift amount in the shifter, or selecting a complement output of the exponent adder. All inputs to these functional OR's are unlatched.

(19.1.3) TIMING

(19.1.3.1) Generally

The path from a working register through the shifter and back to the register will provide an overall picture of the timing. The op decoding, possible status conditions, and the output of the previous sequence latch combine with an A clock to set a gating trigger. The gating trigger raises a gate and allows the data in one of the working registers (K, L, M or J) to enter the adder, where it flows simultaneously through the adder and shifter. The sequence trigger is set at the same time as the gating trigger. An output of the sequence trigger raises a gate which shifts the data by the required amount, and raises a gate which allows the shifted data (instead of the data which went through the adder) to enter the main adder latch. The L clock locks the shifted data in the adder latch so that it cannot change as it is being transferred back into the register. The same L clock locks the sequence latch to preserve the sequence through the next A clock. The output of the sequence latch, along with possible status conditions, selects a gate which allows the data in the adder latch to flow to the input of the desired register. Finally, the sequence latch and status conditions are combined with an A clock to set the data into the register. With the same A clock, of course, the sequence trigger and gating trigger are set for the next machine cycle.

In a general description it is impossible to discuss all the various control lines which may enter into the decisions to set a trigger or raise a gate. Thereafter, the conditions described should be taken as a general guidance only.

The most important general timing rule is that all transfers of data or control are protected. For example, if a trigger is to be set with an A clock, the combinational logic that controls the setting of the trigger must be made up of lines that do not change during that A clock.

(19.1.3.2) Timing examples: FLP LOAD (LD, LE)

An example of the timing of instruction operation is explained below:

(1) 1ST FXP and ELC are the sequence triggers used in these instructions. Each stays on for only one cycle. This discussion assumes that the storage operand is in the J Register at, or before, the start of the E-time instruction.

(2) During the first cycle, the J Register is transferred, left eight, through the shifter to the K register. To do this, a gating trigger from J is set to MA T/C and a gating trigger is set to force parity to MA. These triggers are both set at the same time as the first sequence trigger.

(3) During the first cycle, the left eight shift line is raised. Since the shift occurs later in the cycle, a gating trigger is not needed for this gate. This line illustrates the delay in getting the signal from the output of the sequence trigger, through a functional OR and across to the point where it is used.

(4) At the end of the first cycle, the shifted result is gated from the output of the adder latch to the input of K, and the K register is released. The control line straddles the A clock because it is formed by the latched output of the 1ST FLP sequence trigger.

(5) During the first cycle, parity is forced to EA T/C. Since this is a shorter path than the data path, a gating trigger is not used. Therefore, the line is similar in timing to (3) above and the same comments apply.

(19.1.4) STARTING OF AN INSTRUCTION

The starting of an instruction in the E Unit is conditioned by two functions, EN 1ST CYC and E GO. Both conditions must be satisfied simultaneously to start an instruction. The logic for EN 1ST CYC is:

(ELC LCH or NOT E BUSY LCH) & T2 LCH & NOT E IRPT

EN 1ST CYC is used to condition the functional OR's to gate prefetch operands into the J and M registers, to release the J and M registers when they are to hold the prefetch operands, and to set the gating triggers that would be used during the first E cycle. EN 1ST CYC is also ANDed with E GO to set the first sequence trigger.

If there is a delay of one or more cycles between the time that the E unit finishes one instruction and starts the next, EN 1ST CYC may be active without E GO. This could set invalid operands into M or J and could set first cycle gating triggers using an invalid operand code. However, when EOP does become active, those registers and gating triggers will be reset properly and no invalid condition will be retained.

If the I unit finishes the preparation of the next instruction before the E unit has finished the execution of the current one, the E GO line will become active before EN 1ST CYC. In this case, nothing happens until ELC LCH allows EN 1ST CYC to rise.

There are three different sequence triggers that can be used for the first E cycle. All floating point instructions use 1ST FLP TGR, all SS format instructions use VFL SEQ T1, and all other instructions use 1ST FXP TGR. The following discussion will apply only to instructions which use 1ST FXP or 1ST FLP triggers.

If the instruction to be executed involves an operand coming from storage (generally an RX instruction), the operand may not be back from storage at the time of the I to E transfer. In this case, the completion of the first E cycle is delayed until the operand has been set into the J register. The reset of 1ST FXP or 1ST FLP and the setting of the next sequence trigger to be used is conditioned upon the rise of the latched output of the first cycle trigger. Also the setting of the first cycle results into registers is conditioned on the latched output of the first cycle trigger. The latch of 1ST FXP or 1ST FLP is blocked with NOT J LOADED TGR in all instructions using operands from storage during first cycle. Thus the E unit stays in 1ST FXP or 1ST FLP until the operand is in J. Of course, the operand could have been prefetched by the I unit so that it is in J before the I to E transfer. In this case, the J LOADED TGR would be ON and there would be no delay in completing the first E cycle.

In most binary instructions involving memory operands, the store or fetch request is made by the I unit. However, in some exceptional cases (for example, HW stores to some memory locations), the store request is made in the E unit. Store requests by the E unit for binary instructions are made through the VFL STR REQ TGR.

(19.1.5) PREFETCH

Operands are prefetched to the RBL from the general and floating point registers by the I unit during T2 of the instruction preparation. During the I to E transfer, the RBL is gated to the M or J registers. Thus, the register operations are normally available in the working registers of the E unit during the first E cycle.

(19.1.5.1) Fixed point instructions

Two general registers are gated to RBL and set into M. The left half or RBL will be the R1 operand, and the right half will be either the R2 operand or the R1+1 operand. Only those operands necessary for the execution of the instruction will be gated into M.

(19.1.5.2) Floating point instructions

Since floating point operands may be 64 bits in length, only one operand is gated to the RBL at a time. In an RX instruction, the R1 operand is gated from RBL to M during the I to E transfer. In an RR instruction, the R2 operand is gated to J (with transformation to storage format) during the I to E transfer. The R1 operand is then gated to M during the first E cycle.

For a more complete discussion of operand gating from the registers see the Instruction Sequencing section of said environmental system.

(19.1.5.3) Flush path

A register operand that is used in one instruction may have been the result register for the previous instruction. In order to maintain speed in these cases, the path from the K register to a general or floating point register and back through the RBL to J or M must be made in one cycle. This path is called the "flush path" and is critical to the timing of the operation of the E unit. Because of the "flush path," it is not usually necessary to compare the result register of instruction ($n$) with the operand registers to be prefetched for instruction ($n+1$). However, this is not true for a general register which is: (1) the result register for instruction ($n$) and (2) is specified as an element of an address for instruction ($n+1$). In this case, the address calculation must be delayed until the register holds the valid result of instruction ($n$).

(19.1.6) J LOADED TRIGGER

The J LOADED TGR is set at the same time as a storage word is set into the J register. The set condition is the same as for releasing the J register: J ADV and AR clock. The J LOADED TGR is set from a running clock so that it will be able to handle a storage fetch in the single cycle mode. The reset of the J LOADED TGR, however, is with a controlled A clock.

The J LOADED TGR is generally reset at the end of the cycle in which the memory operand is transferred from J to another register. The reset logic makes the J LOADED TGR set or reset dominant as the situation warrants.

In general, a memory operand in J will be transferred through the MA T/C to some other register in the E unit during the performance of an arithmetical or logical operation. In this case, all the gating triggers from J to MA T/C are OR'ed and used to reset the J LOADED TGR. Since this transfer may in some cases not occur until one cycle after the word comes back to J, and the minimum memory bus rate is two cycles, this case requires a set dominant trigger. In all other cases, the J loaded trigger is reset dominant.

In FXP or FLP RX MPY and in some cases of SS MPY, the memory operand is not transferred from J through the adder. These cases are handled through separate inputs to the reset logic.

(19.1.7) REGISTER RELEASE

(19.1.7.1) General registers

The results of most instructions except FLP or SS are placed in the general registers. This is accomplished by sending the result from K to the input of all registers, then releasing only the register selected by the ER1 field. This release control line is generated during every PA or ELC cycle except when the BLOCK PA TGR is turned on. In the Multiple Load instruction, the register is also released during the EM1 and EM2 cycles.

(19.1.7.2) Floating point registers

The floating point registers are released in a manner similar to the GR. Bits 0–55 of the input to the registers come from K and bits 56–63 come from ER (exponent register). For single FLP operations, bits 24–55 of the selected register are not released.

(19.1.7.3) Block PA TGR

The BLOCK PA TGR is turned on whenever a result is not to be stored back in the registers. Store and compare are examples of operations which do not return the result to a register. In addition, any E-detected program interrupt which causes instruction suppression will turn on the BLOCK PA TGR.

(19.1.7.4) Timing

Both registers are released with a special clock line. This clock will be basically a B clock but will be optimally timed for each set of registers. The release timing is critical because of the flush path. The flush path is the path from the K register, through any GR or FR and back through the RBL to the M or J register-all in one cycle. If this path were not used, it would be necessary to delay a cycle if one instruction called for a register that had been the result register of the previous instruction.

(19.1.8) INSTRUCTION ENDING

The ELC (E Last cycle) sequence trigger is turned on for the last cycle of every instruction. It may be on alone during the last cycle, or it may be on with the PA sequencer. In general, when the time of the last cycle can be determined *unconditionally*, the ELC trigger is turned on alone. When the last cycle is determined by data conditions, the ELC trigger is enabled from control logic, and ELC is then turned on with a late data condition from the data flow. For all binary instruction, the only trigger that is ever on with ELC is PA.

(19.1.9) RESETS

All control triggers in the E unit (except the E RESET TGR) are reset by one or more of the four reset lines that enter the E unit. The reset of the triggers is DC—in other words, it does not depend on the state of the clock lines. A table of the four reset lines and the triggers that they affect is shown below:

| RESET LINE | TYPE OF TGR | | | |
|---|---|---|---|---|
| | CHECK | IRPT (Except Timer) | TIMER IRPT | ALL OTHERS |
| CHK RST | X | | | |
| IRPT END RST | | X | | |
| RST TIM IRPT | | | X | |
| CPU RST | | X | X | X |

Each trigger receives only one reset line which is the OR of the appropriate resets. The CPU RST line, as it enters the E unit, consists of the OR of the computer reset and system reset functions. Likewise, the CHK RST line is the OR of the computer reset, system reset, and check reset functions. (See the Manual Controls and Maintainance section of said environmental system.)

No registers in the E unit are reset directly from any of the above reset lines. Some registers, for example L, M, and J, are never reset. Other registers must be reset initially because they could cause the setting of a machine check trigger before they are loaded with valid data. These registers are K, ER, SC, EOP and LCOP. CPU RST is used to set the E RST TGR. The output is latched and used to perform the following functions:

Gate AMOB to K:
Release K:
Gate AEOB to ER and SC:
Release ER and SC:
Reset EOP and LCOP.

The first clock pulse after the CPU RST will thus set K, ER, and SC to zeros with correct parity from the adder and busses. The EOP and LCOP will be DC reset until the E RST TGR is turned off. The first clock pulse also resets the E RST TGR.

(19.1.10) SINGLE CYCLE MODE

During normal operation, a fetch to J can be requested while J has an operand in it. In the time it takes for the new operand to get to J, the previous operand can be removed from J and placed in another register. This type of operation is not possible during single cycle mode. When the machine is in single cycle mode, the return of the operand to J is effectively instantaneous following a fetch request.

The situation described above occurs during binary instructions when an early TOF BLK T2M signal is generated to allow an earlier fetch of the operand for the next instruction. This early signal is blocked during single cycle mode and a late signal is unconditionally generated at the end of ELC. Thus, during normal operation, the TOF T2M line is raised twice, once for the early TOF and once with ELC LCH.

(19.1.11) MODAR

The MODAR trigger (in the Interruptions section) is turned on by the E unit whenever an addressable register is changed. An addressable register includes the condition registers as well as the general or floating point registers, or storage. If MODAR has not been set before, it is set during ELC, since some addressable register is alway changed at the end of ELC.

(19.1.12) OPERAND FORMATS

19.1.12.1 Fixed point format

Fixed point operands enter the E unit as 32-bit register operands set into either half of M, or as 32 or 16 bit memory operands in J. All 16-bit (or half word) operands are always expanded to 32 bits by propagating the sign position, 16 bits to the left, before any other operation is performed on them. Straight or left 32 bit gates from M and J to the adder allow the result operand to be left aligned in K. Result operands are put in the GR from the high order 32 bits of K.

Double operands (64 bits) can be fetched from the GR at one time (via GBL and GBR) stored in both halves of M. Double results, however, must be put in the GR in two sections. The high order half of the result is put in GR R1 while the low order half is being shifted left 32 bits from M to the adder so that it will be positioned for storing into GR R1+1 during the next cycle.

Although fixed operands are shifted for proper positioning, not bits are ever transposed and there is no basic difference in the format of a fixed operand in storage from that of one in the E unit.

19.1.12.2 Floating point format

Floating point operands enter the E unit (J register) as either single (32 bit) or double (64 bit) operands. In either case, the high order bit is the fraction sign, the next seven bits are the *excess 64 hexadecimal* characteristic and the remaining 24 or 56 bits constitute the fractions. This format is called the storage format. Floating point operands within the E unit are converted to a new format called the working format. The conversion of a floating point operand from storage format to working format is accomplished by left ring shifting eight bits on a 64 bit base. Thus, in working format, the fraction occupies bits 0–23 of a single operand, and bits 0–55 of a double operand. In both cases, the exponent (fraction sign and characteristic) occupies bits 56–63. Operands located in the floating point registers are always in working format. Operands fetched from the FLP registers to M are likewise in working format. However, an operand fetched from the FLP registers to J is transformed to the storage format, then is re-transformed to working format during the transfer from J to K. In addition to the two basic FLP formats, the exponent is generally separated from the rest of the word and stored in the ER. The result fraction is loaded into the FLP registers from K, and the exponent from the ER into K.

The purpose of the transformation of FLP operands to working format is to align the high order bits of fixed and floating operands into the adder, thus simplifying gating and detection circuits and allowing the use of a 64 bit adder.

(19.1.1.3) Binary control circuits

The binary control circuits are not readily grouped for discussion. These include a large number of different controls which are interdependent, but which are not sections 18, 19, 20 are shown in FIG. 535 through FIG. 672, in conjunction with the binary data flow, as well as in FIG. 673 through FIG. 858.

(19.2) Introduction to fixed sequence instructions

Fixed sequence instructions are executed in the binary section of the E unit. These include the fixed point (FXP) instructions, excluding Multiply, Divide, Convert instructions, Multiple Load/Store, full word logical operations, Shift, and Branch instructions.

(19.2.1) I TO E TRANSFER-INITIAL OPERAND LOCATION

The I unit controls the outgating of the general registers (GR) to the register bus latch (RBL), and makes the store and fetch requests to the bus control unit (bcu) PRIOR TO TRANSFERRING THE INSTRUCTION TO THE E unit. Initial RBL to J and M register gating is determined by the EOP decorder, which is valid at least one cycle before the first execution cycle. Exceptions to the above are defined in the description of the instruction in which they occur.

When E GO is received by the E unit, the first execution cycle is initiated and the initial gating configuration is set. This finds the operand in M and/or J at the location hereinafter referred to as the "initial operand location."

(19.2.3) FXP FULL-WORD INSTRUCTIONS

This section includes the load/store, sign control, and algebraic and logical arithmetic operations.

(19.2.3.1) Load

This instruction is a two-cycle sequence consisting of an operand transfer and a result put-away.

At the start of the instruction execution, the R2 operand is located as follows:

| Instruction format: | R2 operand |
|---|---|
| RR | M 32–63 |
| RX-even | J 0.31 |
| RX-odd | J 32–63 |

Instruction sequencing is controlled by the two triggers listed below, in the order in which they occur:

| 1st FXP | R2 transfer |
| ELC | termination |

The R2 transfer, defined by the 1st FXP trigger, is a one cycle operation. The R2 operand is gated from the J or M register to the Main Adder and returned to the K register.

The instruction termination, defined by the ELC trigger, is a one cycle put-way. At the end of the R2 transfer cycle, the ELC trigger is set, the result operand is set into the GR, specified by R1, and the instruction is terminated.

(19.2.3.2) Load type instructions

Load and Test
          Load positive
                   Load NeLoadvComple

These instructions are two-cycle operations consisting of an operand transfer, with sign modification, and a result put-away. The result is examined to determine its relationship to zero.

At the start of the instruction execution, the R2 operand is located in M32–63.

Instruction sequencing is controlled by the two triggers listed below, in the order in which they occur:

| 1st FXP | R2 transfer |
| ELC | termination |

The R2 transfer, defined by the 1st FXP trigger, is a one cycle operation. The R2 operand is gated from the M register to the Main Adder, two's complemented if the sign is to be changed, (see said System/360 Manual) and returned to the K register.

The instruction termination, defined by the ELC trigger, is a one cycle put-away. At the end of the R2 Transfer cycle, the ELC trigger is set, the result operand is set into the GR specified by R1, and the instruction is terminated.

(19.2.3.3) Add/subtract (algebraic & logical)

These instructions are two cycles operations consisting of an operand addition and a result putaway. The result is examined to determine its relationship to zero.

At the start of the instruction execution, the operands are located as follows:

| Instruction Format | R1 Operand | R2 Operand |
|---|---|---|
| RR | M 0–31 | M 32–63 |
| RX-even | M 0–31 | J 0–31 |
| RX-odd | M 0–31 | J 32–63 |

Instruction sequencing is controlled by the two triggers listed below, in the order in which they occur:

| 1st FXP | add |
| ELC | termination |

The add cycle, defined by the 1st FXP trigger, is a one cycle operation. The R1 operand is gated to the main adder from the M register. The R2 operand is gated to the main adder from the J or M register, two's complemented if the instruction is Subtract, and added to the R1 operand. The sum is then returned to the K register.

The instruction termination, defined by the ELC trigger, is a one cycle put-away. At the end of the add cycle, the ELC trigger is set, the result operand is set into the GR specified by R1, and the instruction is terminated.

(19.2.3.4) Compare (algebraic & logical)

These instructions are two cycle operations consisting of an operand addition and the testing of the result to determine the relationship of the two operands.

At the start of the instruction execution, the operands are located as follows:

| Instruction Format | R1 Operand | R2 Operand |
|---|---|---|
| RR | M 0–31 | M 32–63 |
| RX-even | M 0–31 | J 0–31 |
| RX-odd | M 0–31 | J 32–63 |

Instructions sequencing is controlled by the two triggers listed below, in the order in which they occur:

| 1st FXP | add |
| ELC | termination |

The add cycle is identical to the Add cycle as described in Add/Subtract, for the Subtract case above.

The instruction termination, as defined by the ELC trigger, is a one cycle test of the result. At the end of the Add cycle, the ELC trigger is set and the instruction is terminated.

(19.2.3.5) Store

This instruction is a multiple cycle operation consisting of the store preparation, wait cycle and result store.

At the start of the instruction execution, the R1 operand is located in M0–31.

Instruction sequencing is controlled by the two triggers listed below, in the order in which they occur.

| 1st FXP | store preparation and w |
| Store | termination cycle |

The store preparation cycle is defined by the 1st FXP trigger. The R1 operand must be properly positioned in the K register, depending upon the store address: if the store address is odd, the operand must be placed in the low order half of the K register.

The R1 operand is gated from the M register to the main adder, shifted R32 if the store address is odd, and set into the K register.

The instruction termination, as defined by the store trigger, is a variable cycle operation depending upon the ACCEPT signal from the BCU.

If, at the end of the store preparation cycle, the ACCEPT signal has not been received, a wait cycle is taken. Wait cycles are continued until the ACCEPT is received. Gating is not performed during the Wait Cycle and the operand is not modified.

At the completion of either the store preparation cycle or a wait cycle, the ELC trigger is set if the ACCEPT signal has been received. With the ELC trigger on, the instruction is terminated.

(19.2.4) FXP HALFWORD INSTRUCTIONS

The halfword instructions work with halfword operands (2 bytes, 1 syllable) and are essentially separable into two classes. These are:

*Class 1.*—Register to Storage: The halfword Store is unique to this class. The basic operation is the positioning of the operand, depending upon the store address. If the store address indicates a store to the high order half of a full word, the E unit makes the store request during the first execution cycle. This is an exception to the usual operation: in all other cases, the I unit makes the store request.

*Class 2.*—Storage to Register: All halfword instructions, except halfword Store, belong to this class. The operation is the expansion of the halfword operand to full word length, and then the completion of the instruction function as though it were its full word counterpart.

(19.2.4.1) Halfword expansion

At the start of the instruction execution, the R2 operand is located in dependence upon the operand address as follows:

| H REG | | R2 Operand |
|---|---|---|
| 21 | 22 | |
| 0 | 0 | J 0–15 |
| 0 | 1 | J 16–31 |
| 1 | 0 | J 32–47 |
| 1 | 1 | J 48–63 |

The R2 halfword operand may occur in any of the four halfword locations (0–15, 16–31, 32–47, 48–63) within the double-word J register. The operand is gated from either the high order half (if H 21=1) or the low order half (if H 21=0) of the J to either 0–15 or 16–31 of the high-order half (0–31) of the main adder, in dependence upon the operand address. If the operand address is odd (H 22=0), the operand is then at MA 0–15 and the operand is shifted 8 bits to the right (R8) into bits 8–23 of the K REG. In each case, the sign is inserted (propagated) into the eight high-order positions (0–7) of the K REG. This partially expanded operand, consisting of eight bits of sign followed by the halfword operand, is gated from the K register to the RBL, and the RBL is gated R8 to the J register, with the sign inserted into the high-order eight positions. This completes the expansion of the R2 operand to full word length, with the halfword operand being in bits 16–31 of the J REG, and the sign of the operand filling bits 0–15 of the J REG.

(19.2.4.2) Load

This instruction uses a four cycle sequence. The operation consists of the expansion of the R2 operand to full word length, and result put-away.

Instruction sequencing is controlled by the four triggers listed below, in the order in which they occur:

| | |
|---|---|
| 1st FXP | sign propagation |
| HW or LGC | K to J transfer |
| HW ADD | R2 transfer |
| ELC | termination |

The sign propagation cycle is defined by the 1st FXP trigger. The R2 operand is gated from the J register to the main adder. The sign is propagated in the high-order byte as the operand is shifted, in dependence upon the operand address; the result is then returned to the K register, as described above.

The K to J transfer cycle is defined by the HW OR LGC trigger. The partially expanded R2 operand is gated from the K register to the register bus latch (RBL), which is then gated, R8, to the J register, with the sign propagated through the high-order byte. At the completion of this cycle, the fully expanded operand is in bits 16–31 of the high-order half of the J register.

The R2 transfer cycle is defined by the HW ADD trigger. The R2 operand is gated from the J register to the main adder, and returned to the K register.

The instruction termination, defined by the ELC trigger, is a one cycle put-away. At the end of the R2 transfer cycle, the ELC trigger is set, the result operand is set into the GR specified by R1, and the instruction is terminated.

(19.2.4.3) Add/subtract

These instructions are four cycle sequences. The operation consists of the expansion of the R2 operand to full word length, the addition of the two operands, and result put-away. The result is examined to determine its relationship to zero.

At the start of the instruction execution, the operands are located by the operand address as follows:

| H REG | | | |
|---|---|---|---|
| 21 | 22 | R2 Operand | R1 Operand |
| 0 | 0 | J 0–15 | M 0–31 |
| 0 | 1 | J 16–31 | M 0–31 |
| 1 | 0 | J 32–47 | M 0–31 |
| 1 | 1 | J 48–63 | M 0–31 |

Instruction sequencing is controlled by the four triggers listed below, in the order in which they occur:

| | |
|---|---|
| 1st FXP | sign propagation |
| HW+Log. | K to J transfer |
| HW ADD | add |
| ELC | termination |

The sign propagation cycle is identical to the sign propagation cycle as described for Load, above.

The K to J cycle is identical to the K to J transfer cycle as described for Load, above.

The add cycle is defined by the HW ADD trigger. The R1 operand is gated to the main adder from the M register. The R2 operand is gated to the main adder from the J register, is then two's-complemented if the instruction is Subtract, and thence added to the R1 operand. The sum is then returned to the K register.

The instruction termination, defined by the ELC trigger, is a one cycle put-away. At the end of the add cycle, the ELC trigger is set, the result operand is set into the GR specified by R1, and the instruction is terminated.

(19.2.4.4) Compare

This instruction is a four cycle sequence. The operation consists of the expansion of the R2 operand to full word length, the addition of the two operands, and the testing of the result to determine the relationship of the two.

At the start of the instruction execution, the R2 operand is located as follows:

| H REG | | | |
|---|---|---|---|
| 21 | 22 | R2 Operand | R1 Operand |
| 0 | 0 | J 0–15 | M 0–31 |
| 0 | 1 | J 16–31 | M 0–31 |
| 1 | 0 | J 32–47 | M 0–31 |
| 1 | 1 | J 48–63 | M 0–31 |

Instruction sequencing is controlled by the four triggers listed below, in the order in which they occur:

| | |
|---|---|
| 1st FXP | sign propagation |
| HW OR LGC | K to J transfer |
| HW ADD | add |
| ELC | termination |

The sign propagation cycle is identical to the sign propagation cycle as described for Load, above.

The K to J cycle is identical to the K to J transfer cycle as described for Load, above.

The add cycle is identical to the add cycle as described in Add/Subtract, for the Subtract case, above.

The instruction termination, as defined by the ELC trigger, is a one cycle test of the result. At the end of the Add cycle, the ELC trigger is set and the instruction is terminated.

(19.2.4.5) Store

This instruction is a multiple-cycle operation consisting of the store preparation cycle, wait cycle, and result store cycle.

At the start of the instruction, the *expanded* R1 operand is located in M 0–31. The low-order half, M 16–31, contains the R1 operand.

Instruction sequencing is controlled by the three triggers listed below, in the order in which they occur:

| | |
|---|---|
| 1st FXP | store preparation |
| HW+Log. | K to K transfer |
| Store | termination |

The R1 operand must be properly positioned in the store operand, dependent upon the store address. This positioning may be separated into two cases.

*Case 1.*—Address with H 22=1: If the store address includes (H 22=1), then a store to the low-order half of a full word is required. For this case the R1 operand is properly positioned within the low half of the full word boundary as it exists in the GR specified by R1. If the store address is odd (H 21=1), the operand is shifted R32 to place it in the odd, or low-order half of the double-word store operand.

*Case 2.*—Address with H22=0: When the store address includes H 22=0, a store to the high-order half of a full word is required. As the R1 operand is initially in the low-order half, a shift of L16 is required to position it properly within the full word boundary. As in Case 1, above, if the store address is odd, the operand needs to be shifted R32 in order to position it within the low-order half of the store operand.

For this case, the resulting shift of the R1 operand is either L16 or R16: these shift amounts are actually attained by a successive pair of shifts of L8 or R8, respectively.

The store preparation cycle is defined by the 1st FXP trigger. The R1 operand is gated to the main adder from the M register, shifted by an amount dependent upon the store address, and returned to the K register.

At the completion of this cycle, the operand is either properly positioned in the K register, or further shifting is required.

If a store to the high-order half of a full word is required (H 22=0), the operand is not properly positioned at the completion of the store preparation cycle. This being the case, a K to K transfer cycle, defined by the HW OR LGC trigger, is taken. The R1 operand is gated from the K register to the main adder, and shifted by an amount dependent upon the store address. The result is then returned to the K register, completing the positioning of the operand.

The instruction termination, as defined by the STORE trigger, is a variable cycle operation dependent upon the ACCEPT signal from the BCU. The instruction termination is begun at the completion of the cycle which properly positions the operand.

Wait cycles are taken while awaiting the ACCEPT signal from the BCU. Gating is not performed during the wait cycle and the operand is not altered.

The ELC trigger is set upon receipt of the ACCEPT signal. With the ELC trigger on, the instruction is terminated.

(19.2.5) LOGICAL CONNECTIVES

AND
OR
Exclusive OR

These instructions are three cycle sequences consisting of the generation of the logical connective, parity generation, and result put-away. The result is examined to determine its relationship to zero.

The logical connective functions are performed in the main adder, using the "AND," and/or the "Exclusive-OR" gates. The funtcions are attained as follows:

Logical AND
Logical OR
Logical Exclusive-OR
AND Gate
AND and EXCLUSIVE OR Gates
EXCLUSIVE OR Gate As these functions use the shifter as a data path, a shift amount must be selected. A shift of R4 is used to provide this path through the shifter.

The parity generated as a result of the AND instruction or the OR instruction may be incorrect. A cycle is taken to generate proper parity, and to shift the result operand L4 to compensate for the shift during the generation of the connective.

At the start of the instruction execution, the operands are located as follows:

| Instruction format | R2 Operand | R1 Operand |
|---|---|---|
| RR | M 32–63 | M 0–31 |
| RX-even | J 0–31 | M 0–31 |
| RX-odd | J 32–63 | M 0–31 |

Instruction sequencing is controlled by the three triggers listed below, in the order in which they occur:

| | |
|---|---|
| 1st FXP | connective generation |
| HW OR LGC | parity regeneration |
| ELC | termination |

The R1 operand is gated from the M register to the main adder. The R2 operand is gated to the main adder from the M or J register. The connective function is performed in accordance with the particular instruction, and the result is shifted R4 and then returned to the K register.

The connective operand is gated to the main adder from the K register, shifted L4 and returned to the K register. The K register parity check, and the main adder half-sum parity check *are disabled* during this cycle for the AND instruction and for the OR instruction.

This cycle completes the connective operation. At this time, the result operand is located in the high-order half of the K register, properly aligned and with correct parity.

The instruction termination, as defined by the ELC trigger, is a one cycle put-away. At the completion of the parity regeneration cycle, the ELC trigger is set, the result operand is set into the GR (R1), and the instruction is terminated.

(19.2.6) SHIFT INSTRUCTIONS—SINGLE, DOUBLE

Shift Right
Shift Left
Shift Right Logical
Shift Left Logical

These instructions are variable cycle sequences, consisting of the shifting of the operand and result put-away.

Operand shifting consists of two separate operations. These are:

(1) First Cycle Shift
(2) Shift Iteration

The R register 18–23 contains the shift amount, which is valid through the first execution cycle. H REG 18–20 is set into the shift counter register 4–6 at the start of the first execution cycle. The shift counter register 4–6 and the H register 21–23 define the shift amount, and are decoded to determine the shift and decrement amounts.

The M register out-gates (R1, R2, R3), referred to as the "bit shift" gates, and the main adder shifter amounts, are selected so that the sum of the two will equal the shift amount required for the cycle.

Examples

| Required Shift | M REG | Shifter |
|---|---|---|
| R5 | R1 | R4 |
| L5 | R3 | L8 |

The shift amount required for the first cycle may range from zero to a maximum shift of eight. If there is a shift of eight, the shift counter register is decremented by two.

After the first cycle shift, the remaining shift amounts, if any, will be some multiple of eight. During shift iteration cycles, the operand is shifted by eight and the shift amount decremented by two, since a shift of 8 bits is manifested by a 1 in bit 6 of the SCR, and bit 6 has a value of binary 2, being second from low order.

At the start of the instruction execution, the R1 operand is located as follows:

Instruction for R1 operand

Single ----------------------------------- M 0–31
Double ----------------------------------- M 0–63

Instruction sequencing is controlled by the three triggers listed below, in the order in which they occur:

1st EXP ---------------- shifting.
PA -------------------- Termination—first put-away.
ELC ------------------- Termination—final put-away.

In a first cycle shift, the R1 operand is gated from the M register to the main adder, shifted, and then returned to the K and M registers. The M register outgate is selected, and the shift amounts are determined by the SFT/DCR DCDR as shown in the following table:

a value of zero after completion of the current cycle. Notice that at least one cycle is taken to shift the amount specified by the H REG, which is *not* decremented; successive cycles are controlled by the SCR which *is* decremented.

The instruction termination is either a single or double put-away, depending upon the instruction. When a shift counter register value of 2 is detected (such that the shift being performed will decrement the shift counter register to zero), shifting is terminated and result put-away is begun.

At the completion of the final single put-away shift cycle, the PA and ELC triggers are set, the result operand set into GR (1), and the instruction is terminated.

If double put-away is required, at the completion of the final shift cycle, the PA trigger is set, and the result operand (R1) is set into GR (R1). The low-order half of the M register, containing the R1+1 result operand, is gated L32 to the main adder and returned to the K register.

The ELC trigger is then set, the result operand (R1+1) is set into GR (R1+1), and the instruction is terminated.

In algebraic shifting, the sign of the R1 operand is maintained by the "save sign" function which inhibits shifting into the sign position. If a left shift occurs in which a bit different from the sign is shifted out of position 1, the shifter overflow trigger is set. The instruction sequencing is not altered due to this occurrence.

The M propagate sign trigger is set equal to the R1 operand sign at the beginning of the first cycle. This trigger controls the propagation of the sign in the bit shift gating from the M register. The propagate sign function, generated during algebraic shifts, controls the propagation of the sign in the shifter.

| SCR | | | H REG | | | Shift Amount | RIGHT SHIFT | | LEFT SHIFT | |
|---|---|---|---|---|---|---|---|---|---|---|
| 4 | 5 | 6 | 21 | 22 | 23 | | M REG OUT | SHIFTER | M REG OUT | SHIFTER |
| x | x | 0 | 0 | 0 | 0 | 0+N | ST | -------- | ST | -------- |
| x | x | 0 | 0 | 0 | 1 | 1+N | R1 | -------- | R3 | -------- |
| x | x | 0 | 0 | 1 | 0 | 2+N | R2 | -------- | R2 | L4 |
| x | x | 0 | 0 | 1 | 1 | 3+N | R3 | -------- | R1 | L4 |
| x | x | 0 | 1 | 0 | 0 | 4+N | ST | R4 | ST | L4 |
| x | x | 0 | 1 | 0 | 1 | 5+N | R1 | R4 | R3 | L8 |
| x | x | 0 | 1 | 1 | 0 | 6+N | R2 | R4 | R2 | L8 |
| x | x | 0 | 1 | 1 | 1 | 7+N | R4 | R4 | R1 | L8 |
| x | x | 1 | 0 | 0 | 0 | 8+N | R8 | ST | ST | L8 |
| x | x | 1 | 0 | 0 | 1 | 1+N | R1 | -------- | R3 | L4 |
| x | x | 1 | 0 | 1 | 0 | 2+N | R2 | -------- | R2 | L4 |
| x | x | 1 | 0 | 1 | 1 | 3+N | R3 | -------- | R1 | L4 |
| x | x | 1 | 1 | 0 | 0 | 4+N | ST | R4 | ST | L4 |
| x | x | 1 | 1 | 0 | 1 | 5+N | R1 | R4 | R3 | L8 |
| x | x | 1 | 1 | 1 | 0 | 6+N | R2 | R4 | R2 | L8 |
| x | x | 1 | 1 | 1 | 1 | 7+N | R3 | R4 | R1 | L8 | x.—Can be either one or zero; effect is accounted for in successive cycles.
When SCR 6=1, and H REG=000, successive cycles are required.

The shift counter register is gated to the exponent adder (EA), decremented by two if the R1 operand is being shifted by eight, and returned to the shift counter register.

If, after the first cycle shift is completed, additional shifting is required, a shift iteration cycle is taken. The R1 operand in the M register is gated to the main adder, shifted eight, and returned to the K and M registers.

The shift counter register is gated to the Exponent Adder, decremented by two, and returned to the shift counter register. Iteration cycles are continued until a shift counter register value of two is detected, indicating (19.2.7) BRANCH INSTRUCTIONS The function of the execution unit in the performance of branch instructions includes the put-away of operands, and the calculation and comparison of operands to determine the status of the branch condition.

(19.2.7.1) Branch on count

This instruction is a two cycle operation consisting of the decrementing of the R1 operand, and result put-away. The I unit is signaled as to the result of the decrementing.

At the start of the instruction execution, the R1 operand is located in M 0–31.

Instruction sequencing is controlled by the two triggers listed below, in the order in which they occur:

| | |
|---|---|
| 1st FXP | count |
| ELC | termination |

The count cycle, as defined by the 1st FXP trigger, is a one cycle operation. The R1 operand is gated to the main adder from the M register, added to complement zero (all ones), and returned to the K register.

The instruction termination, defined by the ELC trigger, is a one cycle put-away. At the end of the count cycle, the ELC trigger is set, the result operand is set into the GR specified by R1, and the instruction is terminated.

A branch successful condition (E BR SUCC) exists when the result operand is not reduced to zero. This is indicated by an initial operand value greater than one, detected by the M zero detector during the count cycle. The E unit branch successful trigger is set if this condition is detected.

(19.2.7.2) Branch and link

This instruction is a two cycle sequence consisting of the transfer of the low-order half of the PSW to the K register, and result put-away.

At the start of the instruction, the operand is located in the low-order half of the PSW in the I unit.

Instruction sequencing is controlled by the two triggers listed below, in the order in which they occur:

| | |
|---|---|
| 1st FXP | ELC |
| ICR to K | termination |

The ICR to K cycle, defined by the 1st FXP trigger, is a one cycle operation. The low-order half of the PSW is gated to the INCR, and the INCR is gated to the high-order half of the K register. Both of these gating operations are controlled by the E unit.

The instruction termination, defined by the ELC trigger, is a one cycle put-away. At the end of the ICR to K cycle, the ELC trigger is set, the result operand set into the GR specified by R1, and the instruction is terminated.

(19.2.7.3) Branch on index (BXH and BXLE)

These instructions are three cycle sequences, consisting of the addition of the R1 and R3 operands, comparison of this sum with the third operand, and put-away of the R1 and R3 operands sum. The I unit is signaled as to the result of the comparison.

At the start of the instruction execution, the operands are located as follows:

| | |
|---|---|
| R1 Operand | M 0–31 |
| R3 Operand | M 32–36 |
| Third Operand | GR (R3 or R3 plus 1) |

Instruction sequencing is controlled by the three triggers listed below, in the order in which they occur:

| | |
|---|---|
| 1st FXP | add |
| PA | compare |
| ELC | termination |

The add cycle, defined by the 1st FXP trigger, is a one cycle operation. The R1 and R3 operands are gated to the main adder from the M register, added, and returned to the K register.

The third operand is gated from the general registers to the low-order half of the M register, under the control of the I unit.

The compare cycle, defined by the PA trigger, is a one cycle operation. The K register, containing the sum of the R1 and R3 operands, is gated to the main adder. The third operand is gated from the M register to the main adder, two's complemented, and added to the sum of R1 and R3. The result is returned to K register.

The R1 and R3 sum is set into GR (R1) during this cycle.

The instruction termination, as defined by the ELC trigger, is a one cycle operation. At the end of the compare cycle, the ELC trigger is set, and the instruction is terminated.

A branch successful condition exists when the R1 and R3 operands sum is related to the third operand as follows:

Branch on Index High=R1+R3 greater than third operand

Branch on Index Low-Equal=R1+R3 equal to or less than third operand

The relationship of the R1 and R3 sum to the third operand is defined in the table below.

| Signs | Carry from MA 0 | Sum VS 3rd Opnd |
|---|---|---|
| Alike | 1 | Greater than. |
| Do | 0 | Equal/Less than. |
| Unalike | 1 | Do. |
| Do | 0 | Greater than. |

The branch successful trigger in the E unit is set at the end of the compare cycle, if the branch condition is satisfied.

(19.3) Introduction to floating point instructions

Floating Point instructions are executed by the binary section of the E unit. Floating point operations, *excluding* Multiply and Divide, are described in this section. Multiply and Divide, along with their fixed point counterparts, are covered in another section.

(19.3.1) I TO E TRANSFER

The I unit controls the outgating of the floating point registers (FPR) to the register bus latch (RBL), and makes the store and fetch requests to the BCU prior to transferring the instruction to the E unit. Initial RBL to J and M register gating is determined by the EOP decoder, which is valid at least one cycle before the first execution cycle. This provides the initial operand location.

When E GO is received by the E unit, the first execution cycle is initiated and the initial gating configuration is set.

(19.3.2) INTERRUPTS AND CONDITION CODE

Interrupt handling and condition code are not described generally in this section, but the changes in the sequencing and the result of an instruction caused by particular interrupts are defined. In cases not specifically defined, the sequencing and the result are not altered.

(19.3.3) FLOATING POINT ADD/SUBTRACT

These instructions consist of a characteristic comparison, fraction pre-shift, and the algebraic addition of the operand fractions. The result fraction is examined to determine its relationship to zero.

(19.3.3.1) Initial operand locations

At the start of the instruction execution, the operands are located as follows, where SP and DP refer to single precision and double precision:

| Instruction Format | R1 Operand | R2 Operand |
|---|---|---|
| RR-SP | FLP (R1) | J 0–31 |
| RR-DP | FLP (R1) | J 0–63 |
| RX-SP-Even | M 0–23, 56–63 | J 0–31 |
| RX-SP-Odd | M 0–23, 56–63 | J 32–63 |
| RX-DP | M 0–63 | J 0–63 |

(19.3.3.2) Instruction sequencing

Instruction sequencing is controlled by the three triggers listed below, in the order in which they occur:

1ST FLP—characteristic comparison

Preshift-Add—preshifting and fraction addition

PA—termination

(19.3.3.3) Characteristic comparison

The characteristic comparison cycle, defined by the 1ST FLP trigger, is a one cycle operation consisting of the exponent subtraction and the transfer of the R2 fraction from the J register to the K register.

In the exponent subtraction cycle, the R2 exponent is gated to the exponent adder from the J register. The R1 exponent is gated to the exponent adder from the FLP or M registers, complemented, and added to the R2 exponent. The result, the exponent difference, is then set into the shift counter register and exponent register.

The R2 fraction is gated from the J register to the main adder, shifted L8, and set into the K register. The R1 operand, gated from FPR (R1) to the RBL, is set into the M register, *if* the instruction format is RR.

The preshifting and fraction addition sequence, defined by the preshift-add trigger, is a variable cycle operation. If the exponents are equal, subtraction of the two will result in "exponent adder halfsums all equal to one." The exponents are unequal if this condition is not satisfied, the larger being defined by the carry from the higher order position of the exponent adder.

An exponent difference sets the preshift trigger defining, within the preshift-add sequence, the preshifting operation. The register containing the fraction of the smaller exponent (M IF A CARRY, K if none) is gated to the main adder, shifted R4 or R8 dependent upon the shift counter value, and returned to the register from which it came.

The shift counter register is gated to the exponent adder, decremented by an amount equal to the number of hexadecimal digits that the fraction is being shifted, and returned to the shift counter register. The decrement amount and the shift amount are determined by the SFT/DCR decoder. The shift counter register is gated to the SFT/DCR decoder during preshifting.

Preshifting continues, in the normal case, until the SFT/DCR decoder detects a shift counter register value equal to or less than two. This is the indication that the exponents of the two operands will be equal at the end of the current cycle, and, therefore, this cycle completes the preshifting operation. The preshift trigger is turned off at this time, ending preshifting.

Fraction addition is performed if the characteristic comparison indicates equal exponents or, in the case of unequal exponents, preshifting is completed and the exponents have been equalized. The fraction addition cycle, within the preshift-add sequence, is defined by the OFF condition of the preshift trigger.

The operand fractions, contained in the K and M registers, are gated to the main adder, added algebraically, and the result is returned to the K and M registers. The following chart describes the form of addition performed, dependent upon the operand signs and the instruction itself:

| Instruction | R1 Sign | R2 Sign | Operation Performed |
|---|---|---|---|
| ADD | + | + | True ADD. |
| ADD | + | − | Complement. |
| ADD | − | + | Complement. |
| ADD | − | − | True ADD. |
| SUBTRACT | + | + | Complement. |
| SUBTRACT | + | − | True ADD. |
| SUBTRACT | − | + | True ADD. |
| SUBTRACT | − | − | Complement. |

The exponent of the intermediate fraction sum is the larger of the operand exponents. The R1 exponent is contained in the M register. The R2 exponent has been lost. The R2 exponent, if the larger, is equal to the R1 exponent plus the exponent difference obtained during the exponent comparison cycle.

The R1 exponent is gated to the exponent adder from the M register during the fraction addition cycle. The exponent register, containing the exponent difference, is gated to the exponent adder if the R2 exponent is the larger. The adder result, which is equal to the larger exponent, is returned to the shift counter and exponent registers.

If the exponent difference is equal to or greater than 14, (meaning that one operand is very much greater than the other) the preshifted fraction will be zero. Addition of the two fractions would yield a result equal to the fraction with the larger exponent. Therefore, if an exponent difference of this magnitude is obtained, the result fraction is known to equal the fraction with the larger exponent. Preshifting and fraction addition are omitted in this case.

The *occurrence* of an exponent difference, but not the *magnitude* of this difference, is detected during the characteristic comparison cycle. The exception here is an exponent difference greater than sixty-three, which cannot be represented in the shift counter or exponent registers. This condition is detected during the exponent comparison cycle, setting the exponent overflow trigger if the R2 exponent is positive, or setting the exponent underflow trigger if the R2 exponent is negative.

Preshifting is initiated in dependence only upon the *occurrence* of an exponent difference, and not the *magnitude* of that difference. If the shift counter register is equal or greater than fourteen, or if the exponent overflow trigger or exponent underflow trigger is on, it will be detected by the SFT/DCR decoder during the first preshift cycle. The preshift trigger is turned off, the exponent overflow and exponent underflow triggers are reset, and preshifting is terminated after one cycle.

The register which is *not* preshifted contains the fraction with the larger exponent. This register is gated to the main adder, added algebraically to zero, and returned to the K and M registers. The determination of the result exponent is the same as in the normal case fraction addition.

The fraction addition cycle completes the preshift-add sequence. The intermediate sum, in either true or complement form, is contained in the K and M registers. The exponent and sign of the intermediate sum are contained in the shift counter and exponent registers.

19.3.3.5 Termination

The termination sequence, defined by the PA (put away) trigger, is also a several-cycles operation. The functions of this sequence include fraction recomplementation, normalization, exception handling, and result put-away.

A fraction overflow carry is indicated by a carry from the high order position of the main adder during a true add cycle. The M register, which contains the intermediate sum, is gated to the main adder, shifted R4, a "one" is forced into position 3, and the result returned to the K and M registers. The exponent register is gated to the exponent adder, incremented by a "hot one" and returned to the exponent register.

The ELC trigger is then set, the result fraction and exponent set into FPR (R1) and the instruction terminated.

If there is no fraction overflow carry, an unnormalized sum is assumed and a normalization cycle is taken. The M register is gated to the main adder and complemented (if the intermediate sum is in complement form). It is shifted by an amount which depends upon the instruction and the number of high order zeros in the M register. The adder result is then returned to the K and M registers. The exponent register is gated to the exponent adder, decremented by an amount equal to the number of hexadecimal digits the fraction is being shifted and returned to the exponent register. The decrement and shift amounts are determined by the SFT/DCR decoder. The M register is gated to the SFT/DCR decoder for the add subtract normalized instructions only. Therefore, for the add substract unnormalized instructions, the shift and decrement amounts are zero and the intermediate sum and exponent are not altered. Normalization continues, for the normalized instructions, until the fraction is normalized or an exceptional condition is detected.

If the intermediate sum is normalized, the ELC trigger is set, the resultant exponent and fraction set into FPR (R1) and the instruction is terminated after one cycle of normalization. In the case of an unnormalized instruction with an unnormalized intermediate sum, the ELC trigger is set if lost significance is not detected. In the case of a normalized instruction with an unnormalized intermediate sum, the ELC trigger is set when the fraction becomes normalized if exponent underflow is not detected. With the ELC trigger ON, the result exponent and fraction are set into FPR (R1) and the instruction is terminated.

Lost significance is detected during the first normalization cycle, after recomplementation of the intermediate sum, if required, by the K register zero detector. The entire K register is examined for lost significance except for the case of single precision, unnormalized add/subtract. For this case, only the six high order hexadecimal digits are examined. This is due to the possible appearance of a significant seventh digit, the guard digit, which is not part of the result fraction.

When lost significance is detected, normalization is terminated and a significance adjustment cycle is taken. If the significance mask bit is one, the exponent of the intermediate sum is to be the exponent of the result. The shift counter register, which contains this exponent, is gated to the exponent adder and returned to the exponent register. When the significance mask bit is zero, the shift counter register is not gated to the exponent adder; the exponent adder, whose output is zero, is returned to the exponent register.

The ELC trigger is then set, the result exponent and fraction set into the FLP (R1) register and the instruction is terminated.

Exponent overflow may be caused when the exponent is incremented due to a fraction overflow carry. The exponent overflow trigger is set but the sequence is not altered by this occurrence.

(19.3.3.6) Sign handling

The sign of the intermediate sum is determined from the R2 sign and the instruction is performed. For add, the sign of the intermediate sum is equal to the sign of R2 as defined by the R2 sign trigger. For subtract, the intermediate sum sign is set inverse to the R2 sign. If the intermediate sum is in true form, its sign is correct. If the intermediate sum is in complement form, the sign is inverted during the recomplement cycle.

The sign of the result fraction is set to zero if lost significance or exponent underflow occurs. This is done during the adjustment cycle respective to each.

(19.3.3.7) Supplementary description

Some details have been omitted in the description of the instruction sequencing in an attempt to maintain continuity. These are covered in this section.

During single precision preshifting, zeros are forced at the Main Adder output in positions 28–35. This maintains the seventh or guard digit required for the single precision instructions, while insuring zeros will appear in the remainder of the output.

The intermediate sum must be examined for lost significance if this sum is not normalized. For this reason, a normalization cycle is taken. Alteration of the exponent and fraction must not occur and, therefore, the shift and decrement amounts are caused to be zero. At the end of this cycle, the intermediate sum has been examined for lost significance and either the significance adjustment or the put-away cycle will follow.

(19.3.4) FLOATING POINT COMPARE

This instruction consists of a characteristic comparison, fraction preshift, and the algebraic addition of the operand fractions. The intermediate fraction sum and operand signs are examined to determine the relationship of the two operands.

(19.3.4.1) Initial operand locations

At the start of the instruction execution, the operands are located as follows:

| Instruction Format | R1 Operand | R2 Operand |
|---|---|---|
| RR-SP | FLP (R1) | J 0–31 |
| RR-DP | FLP (R1) | J 0–63 |
| RX-SP-Even | M 0–23, 56–63 | J 0–31 |
| RX-SP-Odd | M 0–23, 56–63 | J 32–63 |
| RX-DP | M 0–63 | J 0–63 |

(19.3.4.2) Instruction sequencing

The sequencing of this instruction is identical to that of FLP subtract through the fraction addition.

(19.3.4.3) Termination

The termination sequence, defined by the PA trigger, includes fraction recomplementation and result testing.

The M register is gated to the Main Adder, complemented if the intermediate sum is complement, and returned to the K and M registers.

The ELC trigger is set if the intermediate sum is in true form or, in the case of a complement sum, after recomplementation; terminating the instruction.

(19.3.5) FLOATING POINT LOAD

This instruction is a two cycle sequence consisting of an operand transfer and a result put-away.

Initial operand location

At the start of the instruction execution, the R2 operand is located as follows:

| Instruction format: | R2 operand |
|---|---|
| RR-SP | J 0–31 |
| RR-DP | J 0–63 |
| RX-SP-Even | J 0–31 |
| RX-SP-Odd | J 32–63 |
| RX-DP | J 0–63 |

Instruction sequencing

Instruction sequencing is controlled by the two triggers listed below, in the order in which they occur:

1ST FLP—R2 Transfer
ELC—Termination

R2 Transfer

The R2 transfer, defined by the 1ST FLP trigger, is a one cycle operation. The R2 fraction is gated from the J register to the Main Adder, shifted L8, and set into the K register. The R2 exponent is gated from the J register to the Exponent Adder, and set into the Exponent register.

Termination

The instruction termination, as defined by the ELC trigger, is a one cycle put-away. At the end of the R2 transfer cycle, the ELC trigger is set, the result fraction and exponent are set into the FLP (R1) register, and the instruction is terminated.

(19.3.6) FLOATING POINT LOAD TYPE

FLP Load and Test—S/D
FLP Load Positive—S/D
FLP Load Negative—S/D
FLP Load Component—S/D Introduction These instructions are two cycle sequences consisting of an operand transfer, with sign modification, and a result put-away. The result fraction and sign are examined to determine their relationship to zero.

Initial operand location

At the start of the instruction execution, the R2 operand is located as follows:

| Instruction format: | R2 operand |
|---|---|
| RR-SP | J 0-31 |
| RR-DP | J 0-63 |

Instruction sequencing

Instruction sequencing is controlled by the two triggers listed below, in the order in which they occur:

1ST FLP—R2 Transfer
ELC—Termination

R2 Transfer

The R2 transfer, defined by the 1ST FLP trigger, is a one cycle operation. The R2 fraction is gated from the J register to the Main Adder, shifted L8, and set into the K register. The R2 exponent is gated from the J register to the Exponent Adder, and set into the Exponent register. The fraction sign is set positive, negative, or inverted, dependent upon the instruction.

Termination

The instruction termination, as defined by the ELC trigger, is a one cycle put-away. At the completion of the R2 transfer cycle, the ELC trigger is set, the result fraction and exponent are set into the FLP (R1) register and the instruction is terminated.

(19.3.7) FLOATING POINT HALVE

This instruction is a two cycle sequence consisting of an operand transfer, halved by shifting, and a result put-away.

Initial operand location

At the start of the instruction execution, the R2 operand is located as follows:

| Instruction format: | R2 operand |
|---|---|
| RR-SP | M 0-23, 56-63 |
| RR-DP | M 0-63 |

Instruction sequencing

Instruction sequencing is controlled by the two triggers listed below, in the order in which they occur:

1ST FLP—Halve
ELC—Termination

Halve

The Halve cycle, defined by the 1ST FLP trigger, is a one cycle operation. The R2 fraction is halved by gating the M register "right one" to the Main Adder and returning the result to the K register. The R2 exponent is gated from the J register to the Exponent Adder, and set into the Exponent register.

Termination

The instruction termination, as defined by the ELC trigger, is a one cycle put-away. At the completion of the Halve cycle, the ELC trigger is set, the result fraction and exponent are set into the FLP (R1) register, and the instruction is terminated.

(19.3.8) FLOATING POINT STORE

This instruction is a multiple cycle sequence consisting of the store preparation, wait cycle and result store.

Initial operand location

At the start of the instruction execution, the R1 operand is located as follows:

| Instruction format: | R1 operand |
|---|---|
| RX-SP—Even | J 0-31 |
| RX-SP—Odd | J 0-31 |
| RX-DP | J 0-63 |

Instruction sequencing

Instruction is controlled by the two triggers listed below, in the order in which they occur:

1ST FLP—Store Preparation
Store—Termination

Store preparation

The R1 operand must be properly positioned in the K register, dependent upon the store address. If the store address is odd, the operand must be placed in the low order half of the K register.

The R1 operand is gated from the J register, shifted R32 if the store address is odd, and set into the K register.

Termination

The instruction termination, as defined by the Store trigger, is a variable cycle operation dependent upon the "Accept" signal from the Bus Control unit (BCU).

Wait cycle

If, at the end of the Store Preparation cycle, the Accept signal has not been received, a Wait cycle is taken. Wait cycles are continued until the Accept is received. Gating is not performed during the Wait cycle, and the operand is not modified.

Store

At the completion of either the Store Preparation or a Wait cycle, the ELC trigger is set if the Accept signal has been received. With the ELC trigger ON, the instruction is terminated.

(20.0) BINARY OPERATIONS

(20.1) Binary division

(20.1.1) DIVISION METHODS

Let us start by taking a simple example of binary division:

| Dividend | 0110 | 0000 |
|---|---|---|
| Divisor | 1010 | |
| 2's comp Divisor | 0110 | |

```
            01001
   (1010)01100000
         0000
         ----
         1100
         1010
         ----
              0100
         0000
         ----
         1000
         0000
         ----
        10000
         1010
         ----
         0110    Remainder 01001
   (1010)01100000
         0110
         ----
         11000
          1010
          ----
          00100
           1010
           ----
           10100
            1010
            ----
            11100
             1010
             ----
             0110  Remainder (a) Restoring      (b) Non-Rest
```

Example *a* demonstrates division using a simple restoring algorithm. In other words, the dividend is always kept in true form. The divisor is subtracted from the dividend and the result is examined. If the result is true, a *one* quotient bit is entered and the result becomes the new partial dividend. If the result is complement, a *zero* quotient bit is entered and the result is discarded. In either case, the position of the partial dividend is shifted left one bit with respect to the divisor and a new subtraction is attempted. This method is basically the one that would be used if the division were to be done longhand.

Example *b* shows the same division problem done using a simple non-restoring algorithm. In this case, the dividend may be in true or complement form. The divisor is subtracted from the dividend and the result is examined. If the result is true, a *one* quotient bit is entered; and if the result is complement, a *zero* quotient bit is entered. In either case, the result of the subtraction becomes the new partial dividend, and the position of this dividend is shifted left one bit with respect to the divisor. The next iteration is identical to the first if the new partial dividend is true. If the new partial dividend is complement, however, the divisor is added to the dividend. Again, if the result is true, a *one* quotient bit is entered and if the result is complement, a *zero* quotient bit is entered. In either case, the result of the substration becomes the new partial dividend, and the position of this dividend is shifted left one bit with respect to the divisor. The next iteration is identical to the first if the new partial dividend is true. If the new partial dividend is complement, however, the divisor is added to the dividend. Again, if the result is true, a *one* quotient bit is entered; and if the result is complement, a *zero* quotient bit is entered. This can be seen from the fact that shifting the dividend left one bit with respect to the dividend is equivalent to dividing the divisor by two. Thus, Dividend−Divisor+1/2 divisor (restoring)

is equivalent to

Dividend−1/2 divisor (restoring)

The first two iterations of the example illustrate this, and it is seen that the remainder after the first two iterations is the same for both the restoring and non-restoring methods.

This simple non-restoring division algorithm may be speeded up by skipping over *zeros, and ones*. Subtractions need only to be performed in those positions in which the quotient cannot be predicted. If the divisor is bit normalized (of the form 1xxx) and a true dividend has a high order zero, then a subtraction of the divisor from the dividend would always yield a complement result with a corresponding *zero* quotient bit. Thus, in Example *b* the leading zero of the dividend could have been shifted without a subtraction and a *zero* entered as the first quotient bit. Likewise, if the dividend is complement with a high order *one* bit, the addition of a bit normalized divisor will always yield a true result with a corresponding *one* quotient bit. More than one high order bits can be shifted over if quotient bits can be predicted for each dividend bit that is shifted. For example, if a true dividend had three high order *zeros*, a shift of three bits could be taken before the subtraction, since a subtraction of a bit normalized divisor from any of the dividend positions containing *zeros* would always yield a complement result.

It is obvious that if the divisor and the dividend are close together in absolute magnitude, then a subtraction of the divisor from the dividend would yield a large number of leading partial dividend bits that can be skipped. One way to accomplish this is to generate multiples of the divisor and subtract these multiples from the dividend instead of subtracting the divisor itself. The specific multiples to subtract are chosen to give the maximum amount of shift. For example, if the dividend were 1000x . . . x and the divisor were 1111x . . . x, simple decoding would show that a greater shift would be developed if 1/2 times rather than one times the divisor were subtracted from the dividend.

All of the techniques mentioned above are aimed at increasing the average number of shifts that are developed per subtraction. To take maximum advantage of these methods, the divident must be passed through a variable shifter before each pass through the adder. The approach taken by said environmental system is to use a divide method which will guarantee at least an allowable shift of two. Under certain circumstances, the result of an addition would allow a shift of more than two to be taken, but no attempt is made to take advantage of this. Thus, a uniform shift of two bits can be taken each iteration and there is no need to pass the dividend through a variable shifter during the divide iteration.

The division method used in this environmental system will be explained in three parts. The first will be concerned with the development of a divide scheme that will allow a uniform shift of two. The second part will cover the procedure for positioning of the operands, and the third will cover divide termination.

(20.1.2) DIVISION WITH UNIFORM SHIFT OF TWO BITS

One requirement for a two-bit divide scheme is that each iteration develop at least two high order *zeros* if the result is true, or two high order *ones* if the result is complement. Thus, the result of any iteration must have an absolute value of less than 1/4. All possible combinations of the four high order bits of a true dividend are listed at the left and all possible combinations of the three high order bits of the divisor are listed across the top. Within the table (expressed in sixty-fourths) is shown the range of the result obtained when the divisor is subtracted from the dividend. For example, take a dividend whose high order four bits are 1010. This dividend can represent a value ranging from equal to or greater than 40/64 to less than 14/64 depending on the lower order bits. In like manner, a divisor whose high order three bits are 101 represents a value ranging from equal to or greater than 40/64 to less than 48/64. Thus, this dividend and a divisor can be expressed as follows:

40/64≦Dividend<44/64
40/64≦Divisor<48/64

It can be shown that the range of the result obtained by subtracting the divisor from the dividend is:

(40/64)−(48/64)<R<(44/64)−(40/64)

or

−8/64<R<+4/64

Thus, this particular dividend and divsor combination satisfies the requirement that the result be less than /1/4/. The heavy line encloses all combinations of dividend and divisor whose result lies entirely within the allowable range.

To obtain a uniform shift of two, an additional requirement must be met. For every multiple selected, it must be possible to predict at least two quitient bits. The 1/4 and 5/4 multiples are not used in the two bit divide.

If the 1 times multiple is subtracted from a true dividend and the result is true, the first quotient bit must be a *one*. The result of this subtraction is less than 1/4. The divisor is always greater or equal to 1/2, since it has been normalized. Therefore, a further subtraction of 1/2 times the divisor from the dividend would always yield a complement result, and the second quotient bit will be a *zero*. If the result is complement, the first quotient bit must be a *zero*. However, if the 1 times multiple produced a complement result, an addition of 1/2 times the divisor to that result would have returned the partial dividend true, since the result is greater than $-1/4$ and $1/2$ times the divisor is greater than $1/4$ if $$-1/4<R<0$$

and $$M<1/4$$

then $$R+M<0$$

Thus, the second quotient bit is a *one*.

By the same reasoning, it can be shown that with a true dividend, the 1/2 times multiple is only selected when the use of the 1 times multiple would have yielded a complement result. Thus, the first quotient bit is always a *zero* and the second quotient bit is a *one* if the result is true and a *zero* if the result is complement. Likewise, with a true dividend, the 3/2 multiple is only selected when the use of the 1 times multiple would have yielded a true result. Thus, the first quotient bit is a *one*. The second quotient bit is then a *one* or a *zero* depending on whether the use of the 3/2 times multiple produces a true or complement result.

The use of the 3/4 times multiple with a true dividend has been restricted to cases where the use of the 1 times multiple would have produced a complement result, and the use of the 1/2 times multiple would have produced a true result. Therefore, the first two quotient bits are 01. In addition the 3/4 times multiple produces a third quotient bit which is a *one* if the result is true and 1 *zero* if the result is complement. This third quotient bit is a valid bit and thus must be used instead of the first quotient bit developed on the next iteration.

If a zero multiple is chosen, the dividend will not change and the quotient bits will be 00 since a subtraction of either 1 times or 1/2 times the divisor from a true dividend would produce a complement result. The quotient prediction for the addition of a true multiple to a complement dividend can be developed in the same manner as above and the results are tabulated. The actual circuitry and gates used to generate the divisor multiples will be covered later.

(20.1.1.3) Divide positioning

The following general comments apply to both fixed and floating point division. The divisor (R2) is first brought into J if RX or M if RR. The divisor is then hex-normalized, and placed in K and L. 3/2 times the divisor is generated by adding K plus L shifted R1 and placed in L. The dividend (R1) is now brought into M, shifted the proper amount and swapped with K.˙ Now the dividend is in K, the divisor is in M and 3/2 times the divisor in L. The straight gates from M and L to the adder give the 1X and 3/2X multiples respectively and the right one gates from M and L give the 1/2 and 3/4 multiples. The OX multiple is obtained by gating no data to the T/C side of the adder.

The J register is used to accumulate the quotient. Every second iteration J is shifted left four bits through the RBL to provide space for new quotient bits to be inserted.

The divide method has been developed assuming a bit normalized divisor. Since the divisor has only been hex-normalized, some adjustment must be made for the high order bit zero's in the divisor. During the time that the divisor is in K, the high order 8 bits are transferred via the decimal gates to DB and DC. The high order bit zero's of the divisor are decoded from DB and the divisor and dividend bits gated into the divide decoding are adjusted accordingly. This accomplishes the same operation as bit normalizing the divisor and bit shifting the dividend the same amount. The shift counter is set to the number of iterations to be taken.

A FLP divide

An RX FLP divisor is converted to the working format in the usual manner so that the FLP operands are lined up with the high order end of the adder. The divisor exponent is transferred to the exponent register and adjusted for the divisor normalization. As the dividend is brought into M, the ER is subtracted from the dividend exponent and placed in the ER, and the ER is then adjusted for the dividend normalization. This results in the expected quotient exponent in the ER. This expected exponent may have to be adjusted by one if the dividend is larger than the divisor. This is detected in two ways. First, the hex-normalized dividend high order bit zeros are compared to the divisor high order bit zeros. If the dividend bit zeros are less, the ER is adjusted and the dividend is shifted right four bits to make the fraction smaller than the divisor. In this case the ER is adjusted by one and the number of divide iteration cycles to be taken is reduced by 2. This results not only in the correct quotient exponent but also guarantees that the quotient developed will be hex-normalized.

B FIX divide

Fixed point division is done with true operands only. Thus both the divisor and the dividend must be 2's complemented if they are negative. Both the quotient and the remainder are developed in true form and must be complemented if they are negative.

The fixed divisor is hex-normalized in the same manner as in FLP divide, except that the normalization amount is accumulated in the SC. The dividend is then hex shifted by the amount in the SC. Any 1 bit shifted off the left end of the dividend is a divide check. Fewer high order bit zeros in the dividend than the divisor is also a divide check. The first two quotient bits developed are examined. A divide check is indicated if the first quotient bit is a one, or if the second quotient bit is a one except if the quotient will be maximum negative number. This can be predicted by 2nd quotient bits=1, quotient negative, and result of the first iteration all zeros.

(20.1.1.4) Divide termination

The divide iteration for FIX and FLP is identical. At least two quotient bits are developed each cycle and inserted into the low order end of J. Every other iteration of the quotient that has been developed thus far is shifted left four bits through the RBL. This continues until the required number of iterations has been taken. If the last iteration did not involve the use of a 3/4X divisor multiple, one more quotient bit must be developed.

In FLP divide no remainder is developed, so that as soon as all quotient bits have been developed, the quotient is transferred from J to K and put away in the FLP registers. During the put away cycle, the checks are made for exponent overflow, exponent underflow, and lost significance traps. A divide check trap would have been detected early in the instruction by zero detecting the divisor.

In FIX divide a remainder must be developed. If the original dividend were negative the remainder must be 2's complemented. If the quotient is negative, it must also be 2's complemented. The remainder and quotient are swapped and the quotient is put away in R1. On the next cycle, the remainder is put away in $R1+1$.

(20.2) Fixed and floating point multiplication

(20.2.1) BINARY MULTIPLICATION

Floating Point Multiplication in said environmental system consists of the addition of exponents and the multiplication of fractions. The fractions being either single precision or double precision. Said environmental system also incorporates Fixed Point Multiplication. The integer field of a fixed point operand is either a word or a half word. For the case where a half word is specified, the half word is expanded to a full word before multiplication.

Multiplication consists of the repetitive addition of the multiplicand to itself the number of times specified by the multiplier. A partial product is obtained by using each digit of the multiplier as a separate multiplier. The partial products are offset according to the position of the multiplier digit used with respect to the total multiplier and added together to obtain the product. Binary multiplication is performed in the same manner with the multiplier digit or bit being a one or a zero. This requires an addition for each bit in the multiplier. In the method of multiply as used in said environmental system, the multiplier and the partial product are shifted four bits for each iteration; the multiplier with respect to the multiplier decoding and the partial product with respect to the multiplicand. The multiply operation is started at the low order end of the multiplier. Whether Floating Point Multiply or Fixed Point Multiply is specified, the method is the same.

Consider part of a multiplier to be:

XXXX0110010101000011XXXX

This multiplier can be separated into hexadecimal groups:

$$\begin{array}{cccc} -6 & +5 & +4 & +3 \\ \hline \end{array}$$

XXXX 0110 0101 0100 0011 XXXX

With this decoding, a product could be obtained by adding 3 times the multiplicand, shifting the partial product four positions right and adding 4 times the multiplicand, shifting this new partial product four positions right and adding 5 times the multiplicand, and then shifting this new partial product four positions right and adding six times the multiplicand. Thus, if sixteen multiples of the multiplicand were available, it would require only one addition to take care of four multiplier bits.

In the Binary number system, the 2 times, 4 times, 8 times and 16 times multiples are easily obtained by shifting the multiplicand. The digit normalized multiplicand is defined as the 16 times multiple. The 8 times multiple is therefore the 16 times multiple shifted right one. The 4 times multiple is the 16 times multiple shifted right two, and the 2 times multiple is the 16 times multiple shifted right three. If all the even multiples of the multiplicand were provided, the hexadecimal groups of the multiplier could use only the even multiples and then the one times multiple could be subtracted when an odd multiple was actually required.

Consider again, the above part of a multiplier. Through the use of only even multiples of the multiplicand and the one times multiple subtraction, a product could be obtained from four additions and two subtractions. For the +3 hexadecimal group the 4 times multiple would be added and then the one times multiple subtracted. The partial product shifted four positions right and the 4 times multiple added for the +4 hexadecimal group. This new partial product again shifted four positions right and the 6 times multiple added and then the one times multiple subtracted for the +5 hexadecimal group. Finally this new partial product shifted four positions right and the 6 times multiple added for the +6 hexadecimal group. Thus the number of multiples needed is reduced but the number of operations required to obtain a product is increased.

Consider now the hexadecimal 5 group of the multiplier in conjunction with the hexadecimal 4 group. The low order bit position in the hexadecimal 5 group is the position which determines whether or not the group hexadecimal number is odd. If this position contains a one bit, the number is odd which means that the one times multiple must be subtracted from the partial product to compensate for the higher even multiple which was used in that hexadecimal group. The one bit in this position has a one times multiple value with respect to the hexadecimal 5 group. This same bit position with respect to the hexadecimal 4 group has a 16 times multiple value. Thus subtraction of the one times multiple in the hexadecimal 5 group is the same as subtraction of the 16 times multiple in the hexadecimal 4 group. The original procedure for the hexadecimal 4 and hexadecimal 5 groups in the multiplication was to add the 4 times multiple to the partial product in the hexadecimal 4 group, shift the new partial product four positions right and add the 6 times multiple and then subtract the one times multiple. The same result is obtained by adding the 4 times multiple to the partial product and then subtracting the 16 times multiple for the hexadecimal 4 group. Then shifting the new partial product four positions right and adding the 6 times multiple for the hexadecimal 5 group; adding the 4 times multiple and then subtracting the 16 times multiple is the same as subtracting the 12 times multiple. Therefore, the same result is obtained by subtracting the 12 times multiple for the hexadecimal 4 group, shifting the new partial product four positions right, and then adding the 6 times multiple for the hexadecimal 5 group.

Correction is thus made to a partial product for an overmultiplication before the overmultiplication occurs. Consider once again the original example of part of a multiplier. It requires 5 bits to be decoded to obtain a hexadecimal group multiple. Correction before overmultiplication is possible for all hexadecimal groups of the multiplier except the lower order group. When the low order hexadecimal group contains an odd number, it is decoded as though the low order bit of the group were a zero and the one times multiple is added for that group. In all other groups, correction is taken care of automatically through the decoding of 5 bits and the resultant use of complements of the existing even multiples.

The multiplier group decoding for this method of multiply is such that five bits of multiplier are examined to determine the multiple to be used. The four low order bits of the five bit group need not be looked at again. The high order bit of this group is the low order bit of the next multiplier group.

Since in the binary number system, the 2 times, 4 times, 8 times, and 16 times multiples are easily obtained by bit shifting the multiplicand, the 6 times, 10 times, 12 times and the 14 times multiples must somehow be obtained so that all of the even multiples are available. The 12 times multiple is generated by subtracting the 4 times multiple from the 16 times multiple. The 6 times multiple is then the 12 times multiple shifted right one. When the 10 times or 14 times multiples are decoded, the 2 times or 6 times multiples are used and the iteration sequence is interrupted to allow the 8 times multiple to be added to or subtracted from the partial product. Thus, two additions or subtractions are required to handle four bits of multiplier when the 10 times or 14 times multiple is decoded.

| Multiplier | Desired Multiple | 1st Cycle | 2nd Cycle |
|---|---|---|---|
| 00000 | +0 | +0 | |
| 00001 | +1 | +2 | |
| 00010 | +2 | +2 | |
| 00011 | +3 | +4 | |
| 00100 | +4 | +4 | |
| 00101 | +5 | +6 | |
| 00110 | +6 | +6 | |
| 00111 | +7 | +8 | |
| 01000 | +8 | +8 | |
| 01001 | +9 | +2 | +8 |
| 01010 | +10 | +2 | +8 |
| 01011 | +11 | +12 | |
| 01100 | +12 | +12 | |
| 01101 | +13 | +6 | +8 |
| 01110 | +14 | +6 | +8 |
| 01111 | +15 | +16 | |

| Multiplier | Desired Multiple | 1st Cycle | 2nd Cycle |
|---|---|---|---|
| 10000 | −16+0=−16 | −16 | |
| 10001 | −16+1=−15 | −6 | −8 |
| 10010 | −16+2=−14 | −6 | −8 |
| 1011 | −16+3=−13 | −12 | |
| 10100 | −16+4=−12 | −12 | |
| 10101 | −16+5=−11 | −2 | −8 |
| 10110 | −16+6=−10 | −2 | −8 |
| 10111 | −16+7=−9 | −8 | |
| 11000 | −16+8=−8 | −8 | |
| 11001 | −16+9=−7 | −6 | |
| 11010 | −16+10=−6 | −6 | |
| 11011 | −16+11=−5 | −4 | |
| 11100 | −16+12=−4 | −4 | |
| 11101 | −16+13=−3 | −2 | |
| 11110 | −16+14=−2 | −2 | |
| 11111 | −16+15=−1 | −0 | |

After any addition or subtraction, the partial product will be either correct or the one times multiple less than the correct partial product. The one times multiple less being with respect to the multiplier group for the next addition or subtraction. When the first multiplier group is decoded, the low order bit being a one or a zero is decoded as a zero. If it is a one bit, the one times multiple is gated to the true input of the main adder instead of the partial product which at this time would be zero. Thus, for the first five bit multiplier group decoding, if the group is 0XXX0 or 0XXX1 the partial product will be correct. If the multiplier group is 1XXX0 or 1XXX1, the partial product will be the one times multiple less than the correct partial product. For multiplier group decoding other than the first time, the partial product will be correct if the group is 0XXX0 or 0XXX1. Although the multiplier group 0XXX1 is decoded as the one times multiple greater than the group multiple, the low order one bit of this group means that after the previous subtraction which resulted from this bit being the high order bit of the previous multiplier group, the partial product was the one times multiple less than the correct partial product. Thus, the partial product will now be correct. For the multiplier group 1XXX0 and not the first group decoding, the partial product is again the one times multiple less than the correct partial product. The multiplier group 1XXX1 produces a partial product that is also the one times multiple less than the correct partial product. This is because the low order one bit of this multiplier group when decoded with the previous multiplier group had produced a partial product which was the one time multiple less than the correct partial product. Now this low order one bit decodes a multiple which is the one times multiple greater than the correct multiple. However, the high order one bit of this multiplier group produces a partial product which is the one times multiple less than the correct partial product. Thus for the multiplier group 1XXX1, the partial product remains the one times multiple less than the correct partial product. The decoded multiple is either added to or subtracted from the partial product depending only on whether the high order bit of the five bit multiplier group is a zero or a one bit respectively.

(20.2.2) FIXED POINT MULTIPLY (MR–M–MH)

Fixed Point Multiply starts with the transfer of the multiplicand from the RBL to M register positions 32 to 63 for the MR and M instructions and to M register positions 0 to 31 for the MH instruction. During the first Fixed Point Multiply cycle, identified by the 1ST FXP trigger being on, the multiplicand is transferred from the M register through the main adder to K register positions 0 to 31 and to M register positions 0 to 31. Also during this cycle the multiplier is transferred from the RBL to J register positions 32 to 63 for the MR instruction. For the M instruction this cycle is held up until the J register is loaded from storage. For the case of the MH instruction, the half word from storage is expanded to a full word and placed in J register positions 0 to 31 prior to the start of Fixed Point Multiply.

The next Fixed Point Multiply cycle, identified by the Iteration preparation trigger being on, is the first preparation cycle for the multiply iterations. The 12 times multiple of the multiplicand is generated by gating M register positions 0 to 61 R2 (4 times multiple) to the T/C input of the main adder and K register positions 0 to 63 straight (16 times multiple) to the other main adder input. The MA hot one trigger is set and the T/C input selected complement. The AOB (12 times multiple) is gated to the L register. The low order group of the multiplier is gated to the multiplier decoding. The multiplier group is either J register positions 27 to 31 if the instruction is MH or M with an even address or J register positions 59 to 63 if the instruction is MR or M with an odd address. To position the multiplier for the next multiplier group the J register positions 0 to 63 are gated L4 to the RBL and then the RBL positions −4 to 55 are gated R8 back to the J register. The shift counter, used as an iteration counter, is set to 8 for the number of multiplier digits. The multiplier shifting and the iteration count for both Fixed Point Multiply and Floating Point Multiply are shown hereinbefore. Also during the first iteration preparation cycle, the J register positions 0 to 31 or 32 to 63 and the K register positions 0 to 63 are zero detected to determine if either the multiplier or the multiplicand are zero which means that a zero product will result. J register positions 0 to 31 are zero detected for the MH instruction and the M instruction with an even address. Positions 32 to 63 are zero detected for M with an odd address and for the MR instruction. If the K register (multiplicand) is zero, the Put-Away 1 trigger is turned on. During this cycle, K register positions 0 to 31 are put in the general registers and M register positions 32 to 63 are gated to T/C input positions 0 to 31 of the main adder and the AOB gated to the K register. Then the ELC (E Last cycle) trigger is set, and K register positions 0 to 31 are put in the general registers. If the J register (multiplier) is zero, the Test Cycle trigger is turned on. During this cycle, both the K register and the M register are set to zero by forcing parity to both inputs of the main adder and gating the AOB to them. Then the Put-Away 1 trigger is set and the sequence is the same as for a zero multiplicand.

When a multiplier group is gated to the multiplier decoding, an M register or L register gating trigger is set which gates the decoded multiple of the multiplicand to the T/C input of the main added during the next cycle. Whether the true or complement gate of the T/C input is selected depends on whether the high order bit of the multiplier group was a zero bit or a one bit respectively. The MA hot one trigger is also set if the complement gate is selected. The Iteration trigger being on identifies the cycle in which a decoded multiple is being added to or subtracted from the partial product. K register positions 0 to 63 (partial product) are gated R4 to the other input of the main adder and the AOB which is the new partial product is gated to the K register. The first time the iteration trigger is on, the K register contains the 16 times multiple rather than the partial product. Thus, the K register is gated R4 to the main adder during the first iteration cycle only if the low order bit of the low order multiplier group is a one bit. When a two cycle multiple is decoded, the Iteration Preparation trigger is turned off so that the next multiple is not decoded until the 2 times multiple or the 6 times multiple is added to or subtracted from the partial product. Then the Add trigger is turned on which identifies the cycle in which the 8 times multiple is added to or subtracted from the partial product. During the add cycle, M register positions 0 to 62 are gated R1 (2 times multiple) to the T/C input of the main adder and K register positions 0 to 63 are gated straight (partial product plus or minus the 2 times or 6 times multiple) to the other input of the main adder. The result (new partial product) is gated to the K register. If the multiplicand is a complement number, one bits must be inserted at the high order positions of the main adder T/C input which are vacated due to the multiple generation. If the multiplier is a complement number, the last multiplier group must be decoded as though the high order bit of the groups is a one bit.

Thus, the multiply iteration is identified by three different triggers. The Iteration trigger which identifies the cycles in which the decoded multiple is being added to or subtracted from the partial product; the Add trigger which identifies the cycles in which the 8 times multiple is being added to or subtracted from the partial product; and the Iteration Preparation trigger which identifies the cycles in which the multiplier group is being gated to the multiplier decoding; the multiplier is being shifted R4 with respect to the multiplier decoding, and the shift counter is being decremented and used as an iteration count.

(20.2.3) FIXED POINT PUT-AWAY

When the shift counter is equal to a value of one, the last multiply iteration is being executed. At the end of this cycle the partial product which is now the complete product is put into both the K register and the M register. The Put-Away 1 trigger is set and K register positions 0 to 31 are put into the general registers if the instruction is M or MR. If the instruction is MH, no put-away is done this cycle. M register positions 32 to 63 are gated to the main adder T/C input positions 0 to 31 and the AOB is gated to the K register. Then the ELC trigger is set, and K register positions 0 to 31 are put into the general registers for instructions M, MR, and MH.

(20.2.4) FLOATING POINT MULTIPLY (MER, ME, MDR, MD)

Floating Point Multiply starts with the transfer of the multiplicand from the RBL to the M register. M register positions 56 to 63 will contain the exponent. A single precision floating point fraction will be contained in M register positions 0 to 23 and a double precision floating point fraction in M register positions 0 to 55. Since a normalized product must be obtained, the multiplicand is digit prenormalized. The multiplier is not prenormalized but is decoded only until the remaining multiplier groups are zero. This produces the same result as a normalized multiplier.

(20.2.5) FLOATING POINT MULTIPLY PRENORMALIZATION

In the first FLP multiply cycle, identified by the 1ST FLP trigger being on, M register positions 0 to 55 are transferred through the main adder to both the K register and the M register. M register positions 56 to 63 are transferred through the exponent adder to the exponent register. The M norm trigger being on sets up a shift of 0, L4, or L8 depending on whether the multiplicand has 0, 1, or 2 leading zero digits. It also allows 0, 1, or 2 to be subtracted from the exponent when it is transferred from the M register through the exponent added to the exponent register. Also during the first FLP multiply cycle, the multiplier is transferred from the RBL with a right ring shift of 8 to the J register if the instruction is MER or MDR. If the instruction is ME or MD this first cycle is held up until J is loaded from storage. A single precision floating point multiplier fraction will be contained in J register positions 8 to 31 and the exponent in J register positions 0 to 7 for the MER instruction and the ME instruction with an even address. The multiplier fraction for an ME instruction with an odd address will be in J register positions 40 to 63 with its exponent in positions 32 to 39. A double precision floating point multiplier fraction will be in J register positions 8 to 63 with its exponent in positions 0 to 7.

The next FLP multiply cycle will be either another prenormalization cycle identified by the 1ST FLP trigger being on or it will be the first preparation cycle for the multiply iteration identified by the Iteration Preparation trigger being on. It will be a prenormalization cycle if the M register is not normalized. The K register positions 0 to 63 will be a zero detected to determine if the multiplicand is zero. If it is not zero, prenormalization cycles will occur until the multiplicand is normalized. If the multiplicand is zero, the Test Cycle trigger will be turned on and the exponent register will be made zero during the third cycle. Then the ELC trigger will be turned on and the zero product put into the floating point register during the fourth cycle. The product fraction from K register positions 0 to 55 and the product exponent from the exponent register.

(20.2.6) FLOATING POINT MULTIPLY FIRST ITERATION PREPARATION CYCLE

After the multiplicand is normalized, the Iteration Preparation trigger is turned on. During this cycle, the operand exponents are added together; the 12 times multiple is generated; the low order multiplier group is decoded; the multiplier is gated to the RBL and back to the J register in an effective R4 shift; the multiplier fraction in the J register is zero detected to determine if the multiplier is zero; and the shift counter is set up for use as an iteration count. The exponent sum less 64 is obtained by transferring the exponent register to the T/C input of the exponent adder and the multiplier exponent to the other input. The multiplier exponent from the J register will be positions 0 to 7 for instructions MER, MDR, MD, and ME with an even address. For an ME instruction with an odd address, the multiplier exponent will be in J register positions 32 to 39. Since the operand exponents are excess 64 numbers, the AEOB position 1 is complemented to produce the exponent sum less 64. The exponent sum is placed in the exponent register. The 12 times multiple is generated by gating the M register positions 0 to 61 R2 to the T/C input of the main adder and by gating the K register positions 0 to 63 to the other input. The MA hot one trigger is set, and the T/C input is selected complement so that the M register gated R2 (4 times multiple) is subtracted from the K register gated straight (16 times multiple). The difference (12 times multiple) is placed into L register positions 0 to 63. The low order multiplier group is gated to the multiplier decoding which selects a multiple gating trigger. The gating trigger gates the decoder multiple to the main adder the next cycle. The multiplier group is in J register positions 27 to 31 for instructions MER and ME with an even address and positions 59 to 63 for instructions ME with an odd address, MD and MDR. The low order multiplier group is decoded as though the low order bit of the group is a zero. If it is a one bit the K register positions 0 to 59 are gated R4 (1 times multiple) to the main adder the next cycle. To shift the multiplier R4 with respect to the multiplier decoding, J register positions 8 to 63 are gated L4 to the RBL for instructions ME with an even address, MD, MER, and MDR. J register positions 40 to 63 are gated to the RBL L4 for the ME instruction with an odd address. RBL register positions +4 to 55 are gated back to the J register R8. The shift counter is set to a value of 6 for a single precision multiply and to 14 for a double precision multiply. For each multiply iteration, the shift counter is decreased by one. Also during the first iteration preparation cycle, the multiplier fraction is zero detected to determine if the multiplier is zero. J register positions 8 to 31 are zero detected for the MER instruction and the ME instruction with an even address. Positions 8 to 63 for the MDR and MD instructions and positions 40 to 63 for the Me instruction with an odd address. If the multiplier is zero, a zero product will result and the Test Cycle trigger will be set. The K register and the exponent register are made zero and then the ELC trigger is turned on and the zero product put into the floating point register. If the multiplier is not zero, the Iteration Preparation trigger will be set again along with the Iteration trigger which identifies the cycle in which the first multiply iteration occurs.

(20.2.7) FLOATING POINT MULTIPLY ITERATION

The Floating Point Multiply Iteration is identical in method to the Fixed Point Multiply Iteration. The decoded multiple is gated from the M register or the L register to the T/C input of the main adder and K register positions 0 to 59 (partial product) are gated R4 to the other main adder input when the Iteration trigger is on. M register positions 0 to 63 are gated R1 (8 times multiple) to the T/C input of the main adder and K register positions 0 to 59 are gated straight (partial product plus or minus the 2 times or 6 times multiple) to the other main adder input when the ADD trigger is on. The multiplier group is gated to the multiplier decoding, the multiplier is gated from the J register to the RBL and back to the J register in an effective R4 shift, the multiplier is zero detected so that the multiplier groups are decoded only until the remaining groups are zero, and the shift counter is being decreased by one when the Iteration Preparation trigger is on.

(20.2.8) FLOATING POINT MULTIPLY PUT AWAY

During the iteration preparation cycle in which the remaining multiplier groups are detected as being zero, the last multiply iteration is taking place and either the Iteration trigger or the ADD trigger will be on along with the Iteration preparation trigger. At the end of this cycle, the partial product which is now the complete product is gated to both the K register positions 0 to 63 and the M register positions 0 to 63. The product may have one leading zero digit thus being unnormalized because the multiplicand was digit normalized but not bit normalized and the last non-zero multiplier group may have had leading zero bits. The shift counter may or may not be equal to zero. If it is not zero, it contains a value equal to the number of leading zero digits that were in the multiplier fraction since it was originally set to a value equal to the total number of multiplier digits. The Put-Away 1 trigger is set and K register positions 0 to 55 (product fraction) and the exponent register (product exponent) are put into the floating point register. However, the product is not valid if the product fraction is unnormalized or the shift counter is not equal to zero. If the fraction is unnormalized, M register positions 0 to 55 are gated to the T/C input of the main adder, the L4 shift is selected, and the AOB is gated to both the K register positions 0 to 63 and the M register positions 0 to 63. The shift counter is gated to the T/C input of the exponent adder and the exponent register (product exponent) is gated to the oher input. The T/C input is selected complement and the AE hot one trigger is set so that the shift counter is subtracted from the exponent register. The AEOB position 1 is complemented because exponents and floating point multiply shift counter values are excess 64 numbers and the result is put intot he exponent register. The AE hot one trigger is not set if the product fraction is unnormalized. This reduces the product exponent by the shift counter value plus one. The shift counter is set to zero with the next A sample. The Put-Away 1 trigger is set again with the same sample along with the ELC trigger and the product fraction and exponent are put into the floating point register.

If an exponent underflow occurs, the ELC trigger is not turned on with the Put-Away 1 trigger. The Test Cycle trigger is set which indicates that the K register (product fraction) and the exponent register (product exponent) are being set to zero. The ELC trigger is then set, and the zero product is put away.

(20.3) Multiple load executions

Multiple Load is one of the instructions that is executed simultaneously in both IE and E units. In this respect, timing becomes an extremely important criterion in designing the logic.

A storage word (bits 0–63) fetched from storage is set into the J register. From the J register, either bits 0–31 or bits 32–63 are gated through the main adder and set into the left half of the K register (0–31). Finally, the proper GR is loaded with K register bits 0–31.

Like other fixed point instructions, the first sequence trigger to be turned on in the E unit is the 1ST FXP TGR, which will stay on until the 1ST FXP LCH comes on in response to the J LOADED TGR. During the 1ST FXP cycle (or cycles), J (0–31) to MA T/C (0–31) gate is open if H bit 21 is 0 {J (32–63) to MA T/C (0–31) gate is open if H bit 21 is 1}. The next sequence trigger to be turned on will be the EM2 trigger if H bit 21 is 0 (it will be the EM1 trigger if H bit 21 is 1). Gate J (32–63) to MA T/C (0–31) is open for EM2 cycles, and gate J (0–31) to MA T/C (0–31) is open for EM1 cycles. During the process of loading the general registers, EM1 and EM2 triggers alternate. The latched outputs of the EM1 and EM2 triggers control gating AMOB to the K REG at A clock, and the following early B clock sets the data into the designated GR. The only exception is for the E last cycle. The put away trigger for this cycle is blocked. ER1 is stepped up by one every time the GR is loaded. When ER1 is equal to IR2 the compare latch will be up and the next cycle will be the E last cycle.

The following items deserve some special attention:

(1) EM1 trigger stays on for two cycles except the cycle before the E last cycle. This is because E unit has to wait for the word to come back from memory. In single cycle cases, EM1 will stay on for three cycles because I unit will not make a fetch request at the end of the IM2 cycle. EM2 trigger in all cases stays on for only one cycle and is turned off by EM2 LCH.

(2) Since J LOADED TGR is conditioned with A running clock, in cases of single cycle operation accept trigger (conditioned with A control clock) has to be used to replace the J LOADED TGR in all applications.

(3) If the cycle before the ELC is EM2 cycle, then incrementing ER1 is not blocked even after the compare latch line is up. In this case, at the end of the execution, ER1 will always be 1 greater than IR2. However, if the cycle before the ELC is the EM1 cycle, then there will be no increment for ER1. Except in the case of single cycle and loading only one register, at the end of execution, ER1 is 1 greater than IR2.

(20.3.1) TIMER UPDATE

In System 360 Model 70, the timer consists of a full (32 bits) word in the Main Storage location 80. The Initial Timer word is set by the program. The word is counted down at the rate of 50 or 60 cycles per second, depending on the line frequency. An External Interruption condition is signaled when the value of the timer word goes from positive to negative. The subtraction is done in the fixed-point arithmetic in the E unit.

The data flow path for timer updating is in the E unit. The timer word fetched from storage is set into the J register. Since the timer word is stored in the storage with even address, it always appears in the left half of the J register. At the same time as the word is transferred to the left half of the M register from the J register through the Main Adder, a ONE is forced into bit positions 53 and 55 of the M register if the line frequency is 60 c.p.s. (one is forced into bit positions 53 and 54 of the M register if the line frequency is 50 c.p.s.). The subtraction M 0–31 thru M 32–63 is done next in the Main Adder, and the result is set into the K register. From the K register, the new timer word is restored into the Main Storage location 80.

(21.0) MANUAL CONTROLS AND MAINTENANCE

The manual controls and maintenance sections of said environmental system are contained within the bus control unit which is shown in FIG. 812 through FIG. 858. The power distribution unit comprises several functional portions, a first portion being the control panel itself which includes switches and indicator lights, another section including the start and stop control circuits along with the reset circuits, another section including miscellaneous functional hardware, and a final section including the maintenance control word portion which provides functional controls and data flow for the diagnostic analysis of said system. Another main portion of the power distribution unit comprises fault locating test controls, which are now shown in detail herein, but are referred to only as a block at the top of FIG. 855.

(21.1) Control panel FIG. 812 through FIG. 820

In FIG. 812, the general layout of a control panel which may be utilized in said environmental system is shown. This has the various indicators broken down into groups, and includes three main sections of controls for engineering and fault locating tests, for operator intervention, and for operator control. As illustrated in FIG. 816, the system may also include an operator console which is remote from the CPU itself. Thus, the CPU as shown in FIG. 1 contains the control panel shown in FIG. 812, and the operator console (not shown other than in FIG. 816 herein) would have the same configuration as the operator control portion shown in the lower right-hand part of the control panel of FIG. 812. The operator console would not have the remaining functions of the control panel.

In the control panel, a plurality of switches, such as lever switches, provide certain selectable static functions by the movement thereof, and the rotary type selector switches are also utilized for static functions. In addition, a plurality of pushbuttons are provided for momentary actuation of functions which are latched elsewhere in said system.

(21.2) Pushbutton network (FIG. 821)

In FIG. 821, the normally closed normally open contacts of all of the pushbuttons are applied to a single pulse shaping circuit which provides correct pushbutton output pulses for use throughout the system. Each of the normally closed contacts is applied to an OR circuit, the output of which will reset a latch. The latch is a set dominant latch, so that the presence of a setting signal will always provide an output from the latch even though there is an output from the OR circuit 1. Each of the normally closed contacts is also applied to an inverter, such that when that switch has operated, there will be an output from the inverter to energize a respectfully corresponding AND circuit. The other input to each of the AND circuits is from a 350 nanosecond single shot which is fired by the latch. The input to the latch is a single integrating network which can be fed by any one of the normally open contacts. The sorting out of which normally open contacts has become closed is effected by means of the inverters connected to the related normally closed contacts. Therefore, the circuit of FIG. 821 provides an integrating and shaping function for all of the pushbuttons in a system with but a single integrater and a single single-shot, together with corresponding inverters and AND circuits for each of the switches.

(21.3) Indicator control network (FIG. 815)

In FIG. 815 is shown an indicator control network which provides power to light an indicator lamp, as well as to test the lamp without disturbing the logic to which the lamp is connected. The circuit of FIG. 815 is utilized by a plurality of different functions as indicated in FIG. 814. FIG. 814 is merely illustrative of a large number of indicator lights (referred to as INDS) in FIG. 812.

In FIG. 815, a pair of resistors provide voltage division from some logical function (such as PSW 14), the logical function also being applied to other areas in the system. In other words, the indicator network of FIG. 815 is connected in parallel with logical circuits which utilize the function being monitored by the indicator network. The voltage divider applies a potential of the functional line (such as PSW 14) to the cathode of a diode as well as to a lamp. The other side of the lamp may be connected to a positive voltage or to a negative voltage, and correspondingly, the anode of the diode may be connected to a positive voltage or to ground. Thus, in a quiescent state, a small amount of current is passed through the lamp so as to avoid glow-resistant shock when the lamp is actually illuminated with a larger amount of current. The diode provides voltage clamping so that the potential across the lamp can be maintained at 1 guaranteed amount. Whenever the logic line goes negative, then the voltage drop across the lamp is greater, so that an illuminating current will flow therethrough.

When a lamp is to be tested, the switch is thrown so as to connect the anode of the diode to ground and so as to connect the other side of the lamp to a minus potential. This permits flow of a test current through the lamp, which, however, is buffered from the logic line by the voltage divider.

(21.1.1.4) The starting, stopping and reset circuits (FIG. 822–FIG. 829)

In FIGS. 822 through 829 are shown signals which cause the machine to start in response to the start pushbutton, the starting of the system including the generation of a sequence of different reset signals as shown in FIG. 827. The actual start circuit, and the control for single-cycling is shown in FIG. 822. The circuit of FIG. 823 provides a signal to the main clock (in the CPU) which permits the clock to run. The circuit of FIG. 828 includes forced repeat timing, and the circuit of FIG. 829 includes special clock signals used in the PDU.

(21.5) Miscellaneous PDU circuits (FIG. 830 through FIG. 841)

Miscellaneous PDU control circuits are shown on FIG. 830 through FIG. 841. These include, among other things, signals to cause manual storage requests, fetching to the instruction buffers under manual control, displaying of registers, the enable panel key fetch control, and manual storage controls. Additionally, initial program loading controls, forced repeating, meter controls, disabling of the invalid, condition sensing, the interval timer advance, and other functions are shown herein.

(21.6) Maintenance control word and diagnose circuits (FIG. 842 through FIG. 854)

Diagnostic control over said environmental system is accomplished in part by the diagnostic circuits, which include the maintenance control word and its related circuitry, as shown in FIG. 842 through 854. A three-stage ring is shown in FIG. 842, the proceed signal is generated in FIG. 843, and diagnostic controls are generated in FIGS. 844 and 845. In FIG. 846, a plurality of controls for the maintenance control word register, incrementer, and latch are shown. These provide for setting of the diagnostic select code portion of the maintenance control word as shown in FIG. 847a, the setting and resetting of the count register, and causing the count latch to respond to the MCW counter so as to increment the setting of the register. The output of these circuits is decoded in FIG. 854 for use throughout the system.

(21.7) PDU data flow (FIG. 855–FIG. 858)

In FIG. 855, the address bus portion of the PDU data flow is shown. This permits connection of the address keys to various parts of the system, with parity bits generated therefor. The data flow also illustrates the generation of mark and other functions which cause the maintenance controls to be equivalent to a "maintenance channel."

In FIG. 856, the data bus portion of the PDU data flow is shown. This permits the data keys to be integrated and to be gated to several points in the system with correct parity bits.

In FIG. 857, the initial program loading channel selecting and unit selecting switches are applied to integraters and then selectively gated on to the unit address bus in and as channel addresses, both of which is handled in the channel portion of the IE unit.

FIG. 858 illustrates the interface between the PDU and the channel.

(22.0) Storage

Storage in said environmental system comprises essentially two main units 1a, 1b, each comprising an even and an odd half, and a storage protection hardware. Each half comprises logical portions as well as a basic operating memory, all as shown in FIG. 859. The logical portion of each of the storage units 1a, 1b comprises a certain amount of common hardware and a certain amount of hardware which relates only to the particular even or odd half thereof. This logic is shown in FIGS. 860 through 875. The basic operating memory is the term used to describe the actual core storage elements themselves and the circuitry for driving the elements and for sensing signals therein. The basic operating memory for said environmental system is illustrated in a copending application of the same assignee entitled Storage Drive Sense System Ser. No. 633,492, now Patent No. 3,413,622.

An illustration of storage protection circuitry which might be utilized in said environmental system is shown in a simplified block diagram form in FIG. 876. The basic element therein is a small core storage device, or other addressable registering device, wherein protection keys may be stored in association with portions of addresses, said portions specifying the blocks in memory which may be reached by those portions of addresses, together with other low-order portions which specify particular storage words. The storage protection feature is utilized to generate a storage address protection signal indicating that an unreachable portion of storage is being addressed.

While the improvement herein has been shown and described with respect to an illustrative embodiment thereof, it should be obvious to those skilled in the art that various innumerated changes, and other changes and omissions in the form and detail thereof, may be made therein without departing from the spirit and the scope of the invention.

What is claimed is:

1. In a data processing system, data flow apparatus, comprising:
   bit function means for a carry propagate adder;
   input means for presenting operands to said bit function means;
   arithmetic means connected to said bit function means, said arithmetic means including half sum generating means;
   shifting means connected to said bit function means and to said half sum means;
   output means connected to said shifting means and to said arithmetic means;
   and output control means for selecting either said shifting means or said arithmetic means for application to said output means.

2. In a data processing system, data flow apparatus, comprising:
   arithmetic means including bit function means and half sum generating means;
   shifting means connected to said bit function means and to said half sum generating means;
   logical control means for selecting a combination of inputs from among said bit funciton means and said half sum generating means for application to said shifting means;
   and output means for selecting the output of said shifting means or of said adder means, alternatively.

3. In a data processing system, data flow apparatus, comprising:
   arithmetic means including bit function means and half sum generating means;
   shifting means connected to said bit function means and to said half sum means;
   and logical control means for selecting a combination of inputs from among said bit function means and said half sum generating means for application to said shifting means:

4. In a data processing system, data flow apparatus, comprising:
   bit function means for a carry propagate adder;
   input means for presenting operands to said bit function means;
   arithmetic means connected to said bit function means, said arithmetic means including half sum generating means;
   shifting means connected to said bit function means and to said half sum means;
   control means for selecting a combination of inputs from among said bit function means and said half sum generating means for application to said shifting means;
   and output means for selecting the output of said shifting means or of said adder means, alternatively.

References Cited

UNITED STATES PATENTS

| | | | |
|---|---|---|---|
| 3,192,365 | 6/1965 | Stewart | 235—164 |
| 3,342,983 | 9/1967 | Pitkowsky et al. | 235—153 |

EUGENE G. BOTZ, Primary Examiner

U.S. Cl. X.R.

235—164